Aug. 30, 1927.
E. J. CREEL
1,641,121
METHOD AND APPARATUS FOR THE COMPRESSION OR EXPANSION OF A GAS
Filed Feb. 13, 1918    9 Sheets-Sheet 1
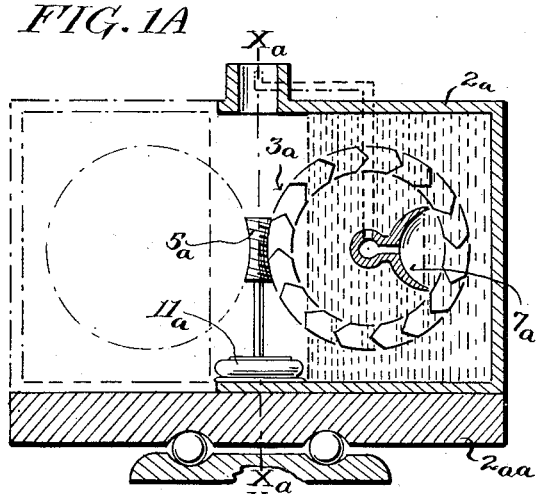
FIG. 1A
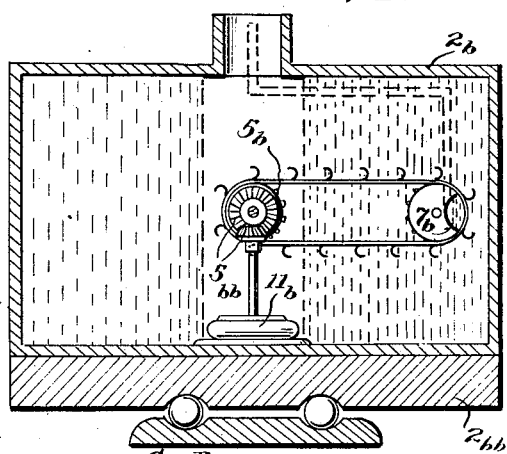
FIG. 1B
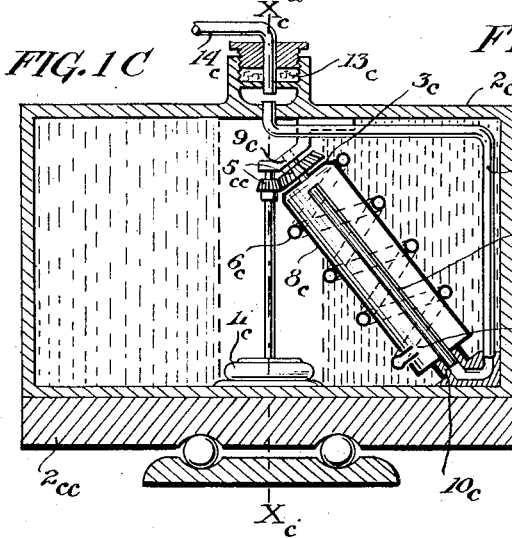
FIG. 1C
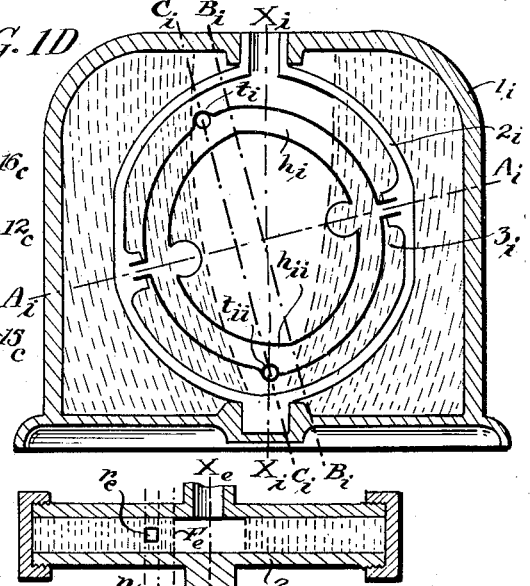
FIG. 1D
FIG. 2E
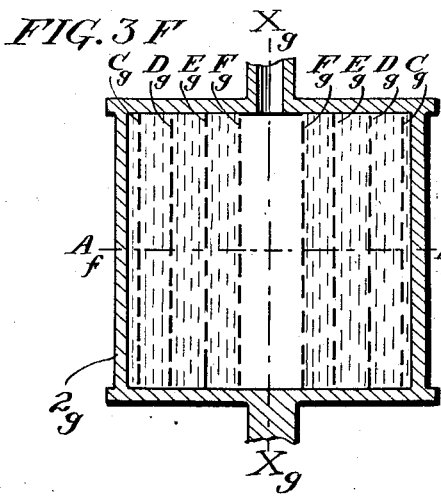
FIG. 3F
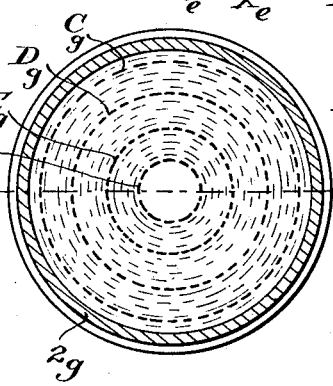
FIG. 3G
Inventor
Edwin J Creel Aug. 30, 1927.
E. J. CREEL
1,641,121
METHOD AND APPARATUS FOR THE COMPRESSION OR EXPANSION OF A GAS
Filed Feb. 13, 1918      9 Sheets-Sheet 2
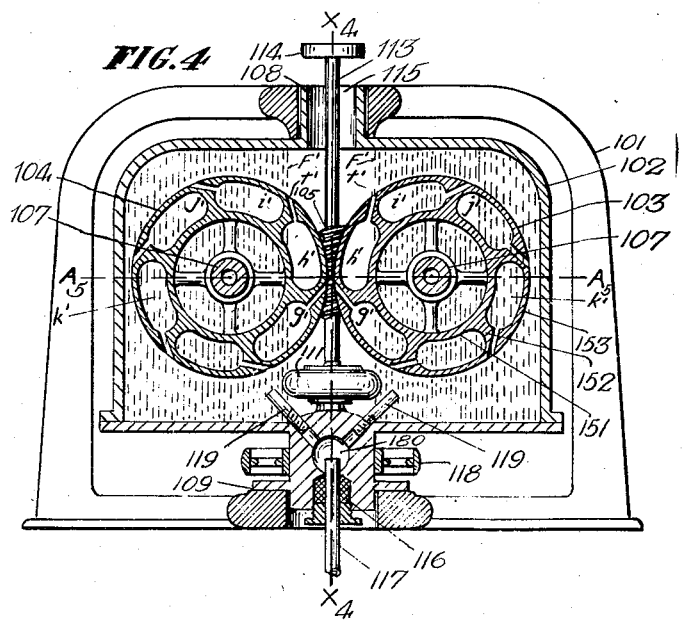
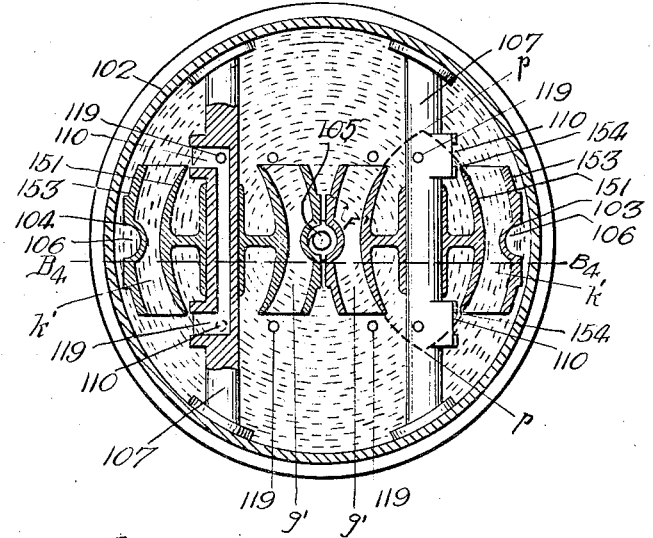
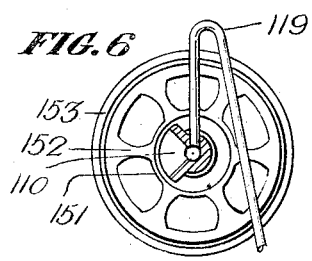
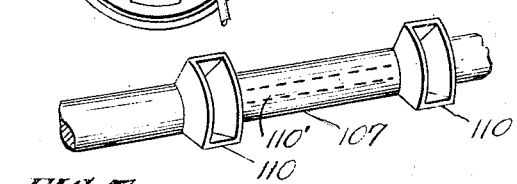

Aug. 30, 1927.
E. J. CREEL
1,641,121
METHOD AND APPARATUS FOR THE COMPRESSION OR EXPANSION OF A GAS
Filed Feb. 13, 1918     9 Sheets-Sheet 3
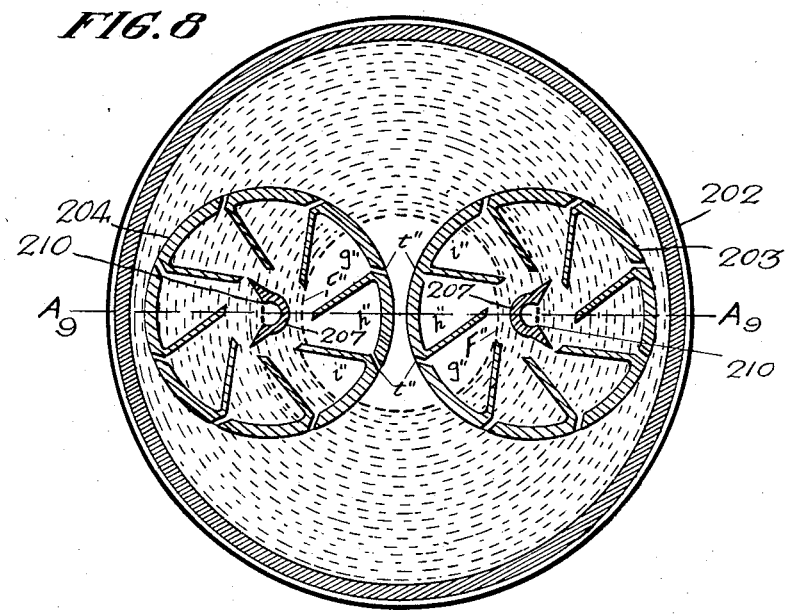
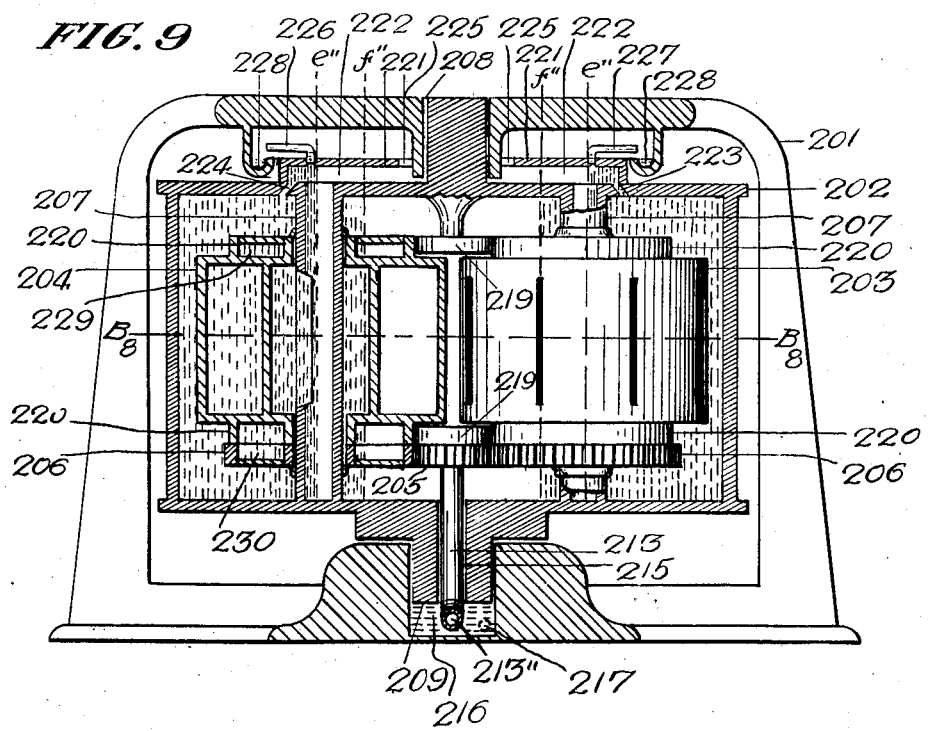

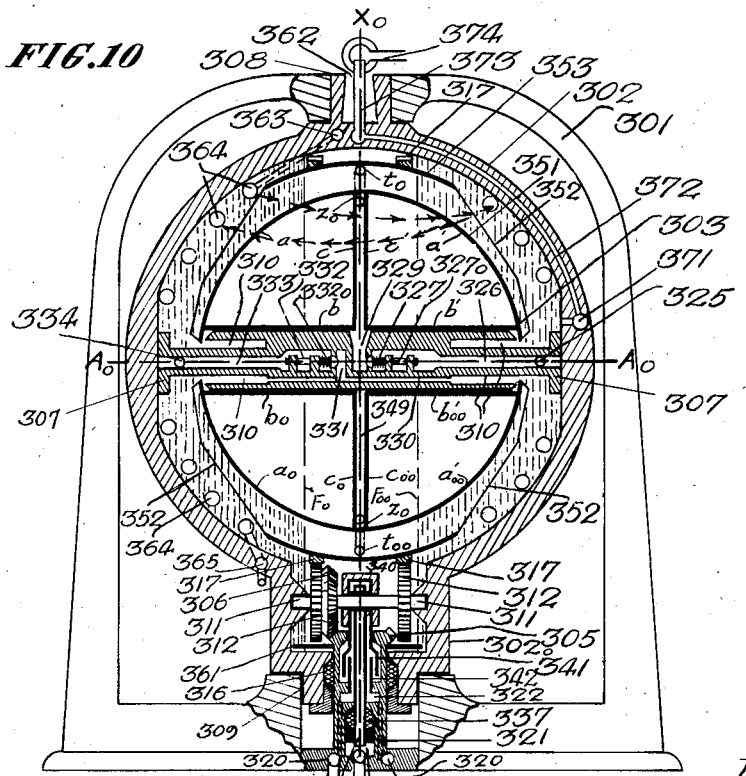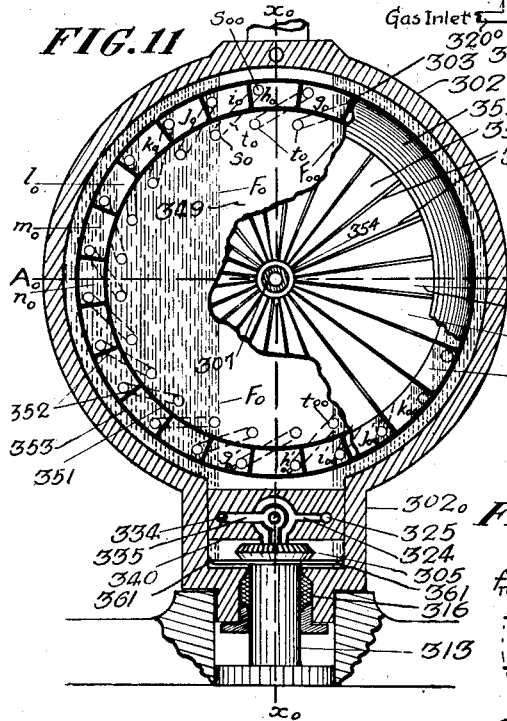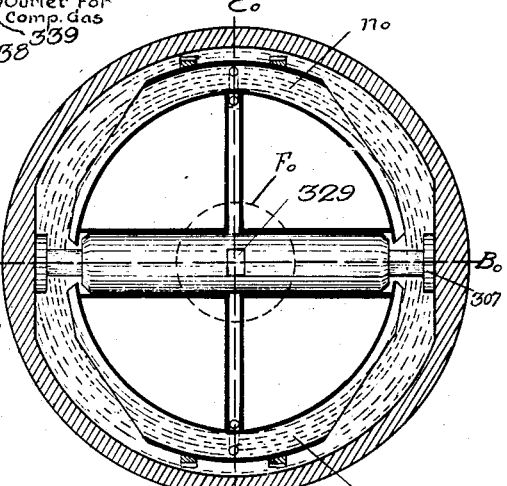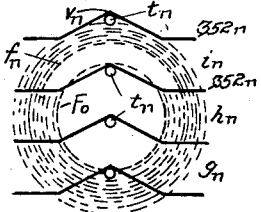

Aug. 30, 1927.
E. J. CREEL
1,641,121
METHOD AND APPARATUS FOR THE COMPRESSION OR EXPANSION OF A GAS
Filed Feb. 13, 1918 9 Sheets-Sheet 5
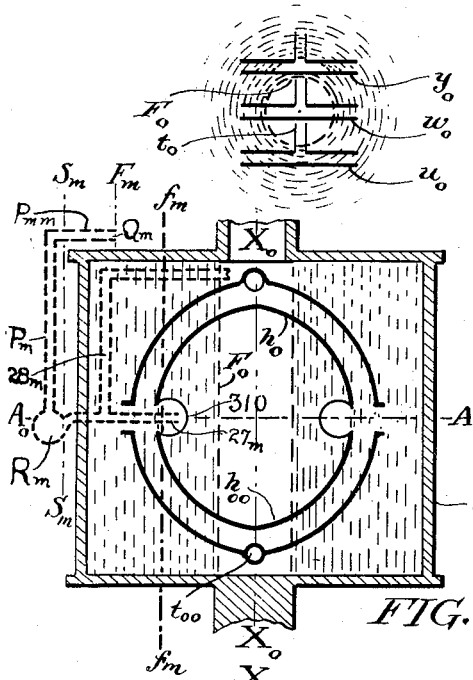
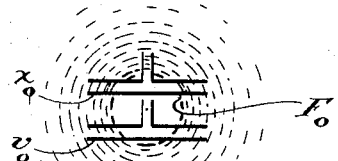
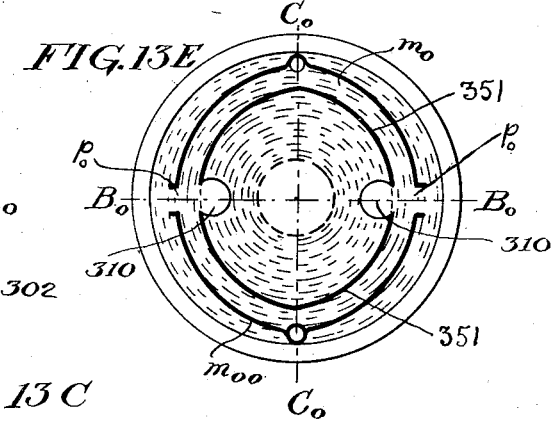
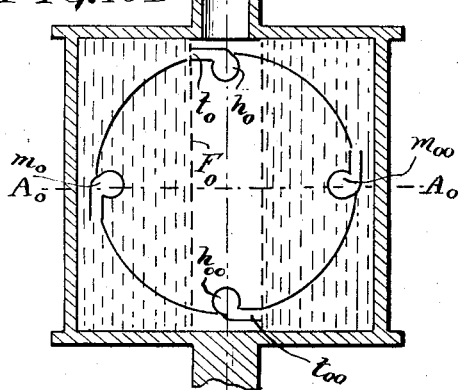
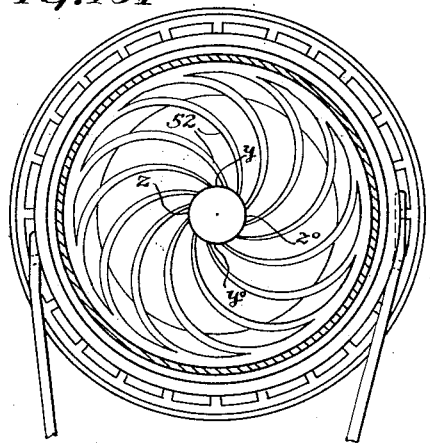
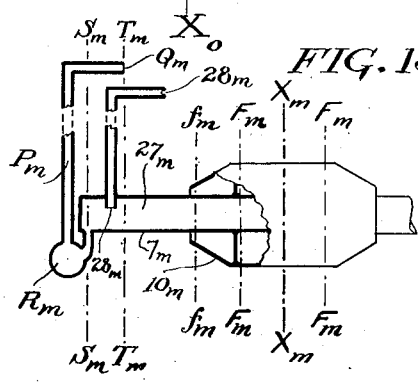
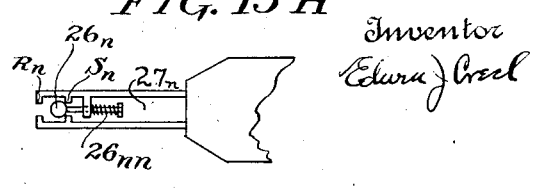

Aug. 30, 1927.

E. J. CREEL 1,641,121

METHOD AND APPARATUS FOR THE COMPRESSION OR EXPANSION OF A GAS

Filed Feb. 13, 1918    9 Sheets-Sheet 6

Edwin J. Creel
INVENTOR

Aug. 30, 1927.

E. J. CREEL 1,641,121

METHOD AND APPARATUS FOR THE COMPRESSION OR EXPANSION OF A GAS

Filed Feb. 13, 1918 — 9 Sheets-Sheet 7

Edwin J. Creel
INVENTOR

Aug. 30, 1927.
E. J. CREEL
1,641,121
METHOD AND APPARATUS FOR THE COMPRESSION OR EXPANSION OF A GAS
Filed Feb. 13, 1918      9 Sheets-Sheet 8
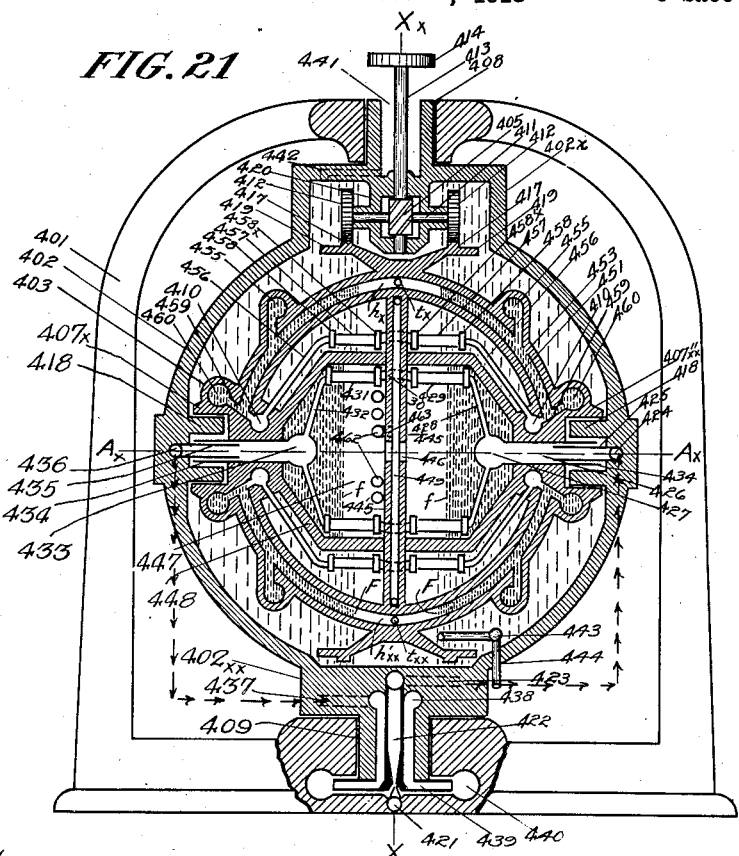
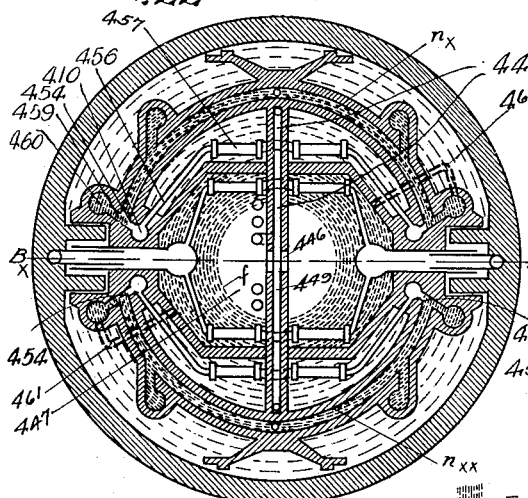
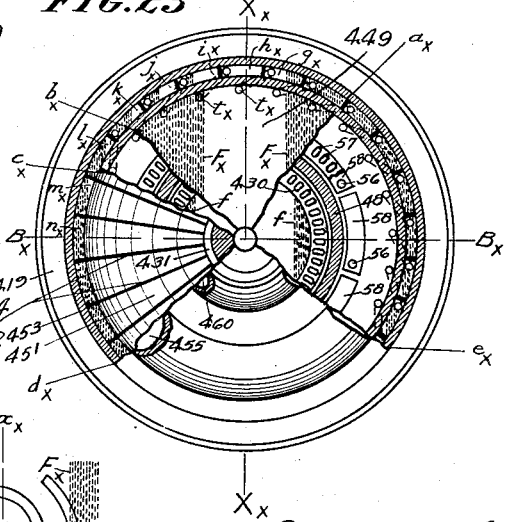
Edwin J. Creel
INVENTOR Aug. 30, 1927. 1,641,121
E. J. CREEL
METHOD AND APPARATUS FOR THE COMPRESSION OR EXPANSION OF A GAS
Filed Feb. 13, 1918  9 Sheets-Sheet 9

Edwin J. Creel
INVENTOR

Patented Aug. 30, 1927.

1,641,121

UNITED STATES PATENT OFFICE.

EDWIN J. CREEL, OF WASHINGTON, DISTRICT OF COLUMBIA.

METHOD AND APPARATUS FOR THE COMPRESSION OR EXPANSION OF A GAS.

Application filed February 13, 1918. Serial No. 217,002.

This invention is applicable as an air compressor, vacuum pump, rotary engine, motor compressor, or refrigerating machine. It may also be employed for pumping a light liquid where a suitable heavier liquid is available as a compressing medium.

The purpose of the invention is to enable such machines to be constructed of compact form, high efficiency, and of relatively low cost.

This application is in principal part a continuation of a former application No. 520,870, filed October 4, 1909, allowed March 4, 1916, and forfeited September 4, 1916. The present application was then filed February 13, 1918, as a continuation in principal part of that earlier application.

Reference may also be had to co-pending application #256,259, filed Sept. 30, 1918, in the name of Jay Grant DeRemer. That application matured into, and was issued as, Patent No. 1,594,092, dated July 27, 1926, to Edwin J. Creel as assignee of the said Jay Grant DeRemer. Reference may also be had to two patents reissued to DeRemer as Patents Nos. 15,590 and 15,591, dated May 1st 1923, as further illustrating the Archimedean screw type of the compressor of this invention.

This invention will be understood on reference to the following specification and the attached drawings, which are hereby made a part of this specification, and in which:

Figures 1A, 1B, and 1C, are more or less diagrammatic representations of various generic types of the invention. Fig. 1D is a diagram illustrating a method of compensating for the parabolic form of air space in large sized, slow speed, compressors. Figs. 2E, 3F, and 3G, are diagrams explanatory of the theory of the compressing element.

Figures 4 and 5 are, respectively, vertical and horizontal sections taken through a power driven air compressor. Figures 6 and 7 are of details.

Figures 8 and 9 are, respectively, vertical and horizontal sections of an oil packed vaccum pump.

Figures 10 and 11 are vertical sections, and Fig. 12 is a horizontal section, through what I term a polar type compressor. The polar type is the preferred form of this invention. Fig. 10 is taken on line $X_o$—$X_o$ of Fig. 11, and on the line $B_o$—$B_o$ of Fig. 12. Fig. 11 is taken on lines $X_o$—$X_o$ of Fig. 10, and $C_o$—$C_o$ of Fig. 12. Fig. 12 is a horizontal section on lines $A_o$—$A_o$ of Figs. 10 and 11.

Fig. 13 is a diagram illustrating the preferred form of air duct. Figures 13A to 13E, inclusive, are diagrams explanatory of the action of the polar type wheel.

Fig. 13F shows the preferred spiral form of compressing tubes of this invention. Figs. 13G and 13H illustrate two forms of liquid traps.

Figures 14 to 18, inclusive, are various sections through a steam driven motor compressor of the polar type. This machine is a combination of the engine and the compressor of this invention.

Figure 14:
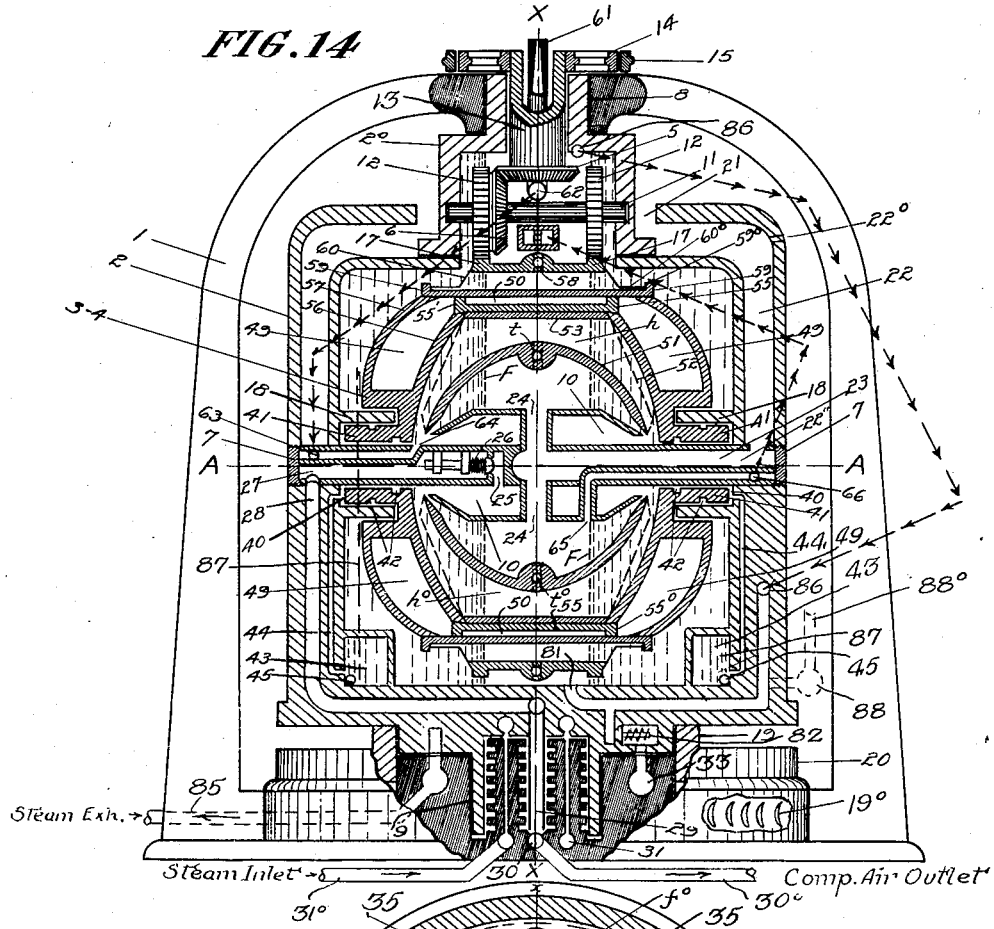
Figure 15:
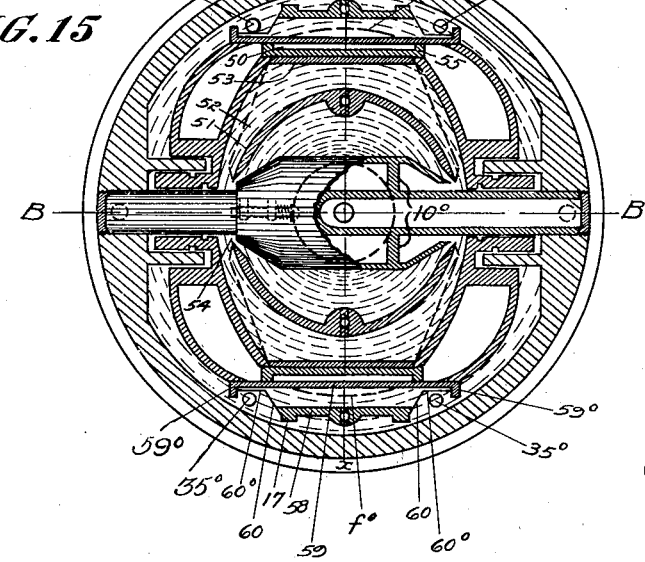
Figure 16:
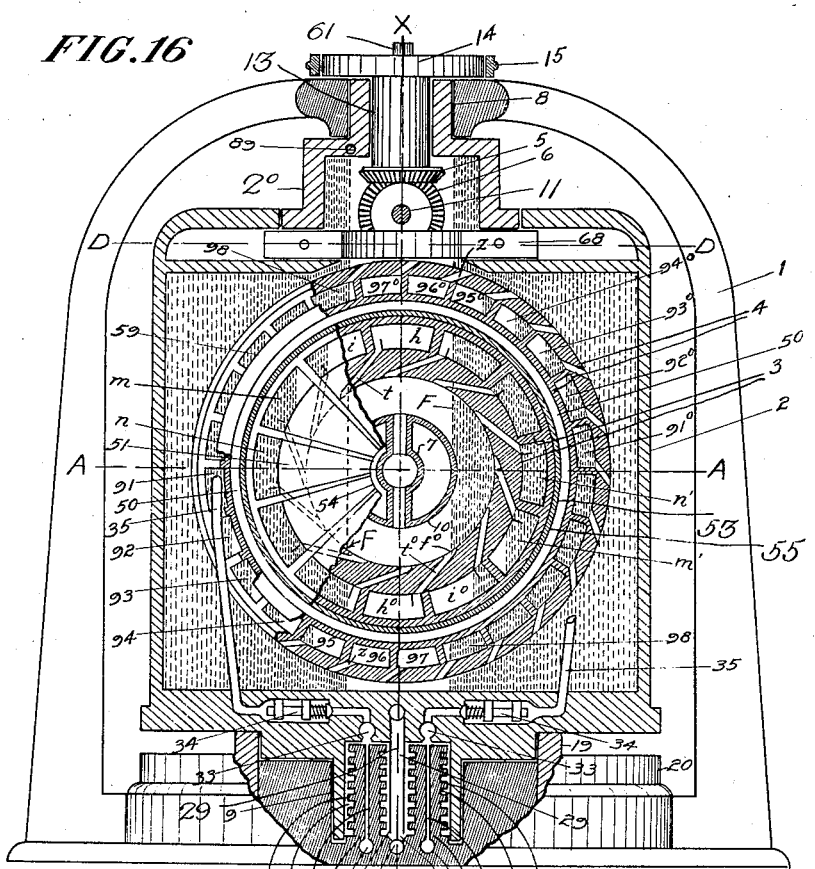

Fig. 14 is a vertical section on the line B—B of Fig. 15, and on the line X—X of Fig. 16. Fig. 15 is a horizontal section on the lines A—A of Figs. 14 and 16. Fig. 15 is rotated 90 degrees with reference to Fig. 16. Fig. 16 is a vertical section on the line X—X of Fig. 14, and on the line $x$—$x$ of Fig. 15.

Figure 17:
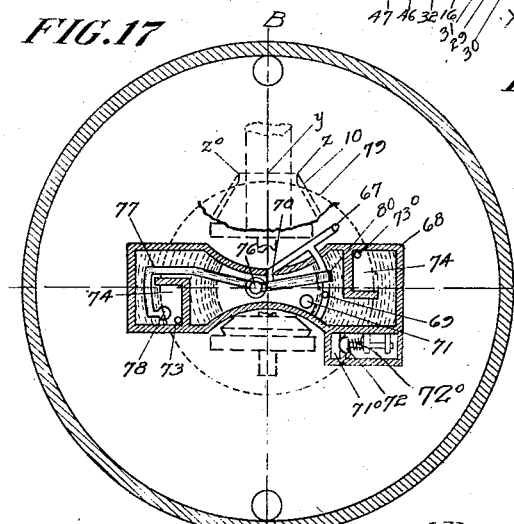

Fig. 17 is a horizontal section on the line D—D of Fig. 16.

Figure 18:
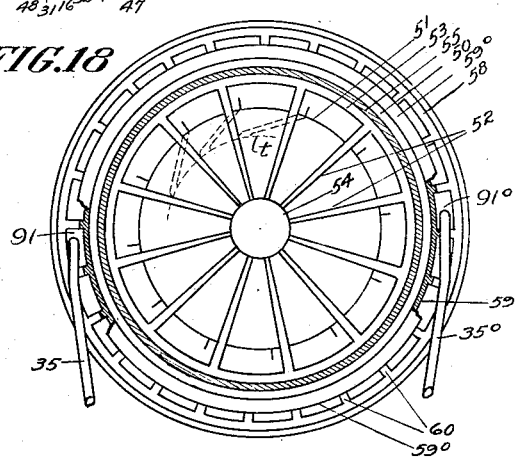

Fig. 18 is a polar view of the double bucket wheel 3—4 with the polar caps removed, as will be more fully explained later.

Figures 19, 20:
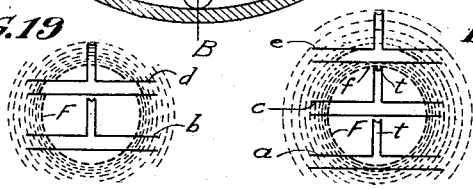

Figs. 19 and 20 are diagrams explanatory of the exhaust ducts of this machine.

Figs. 21 and 22 are, respectively, vertical and horizontal sections through a self contained refrigerating machine. Fig. 23 is a "polar" view, partly in section, of the compressing, condensing, and vaporizing, "bucket wheel" structure of this refrigerator. Fig. 24 is a diagram explanatory of a detail of the same.

Figure 25:
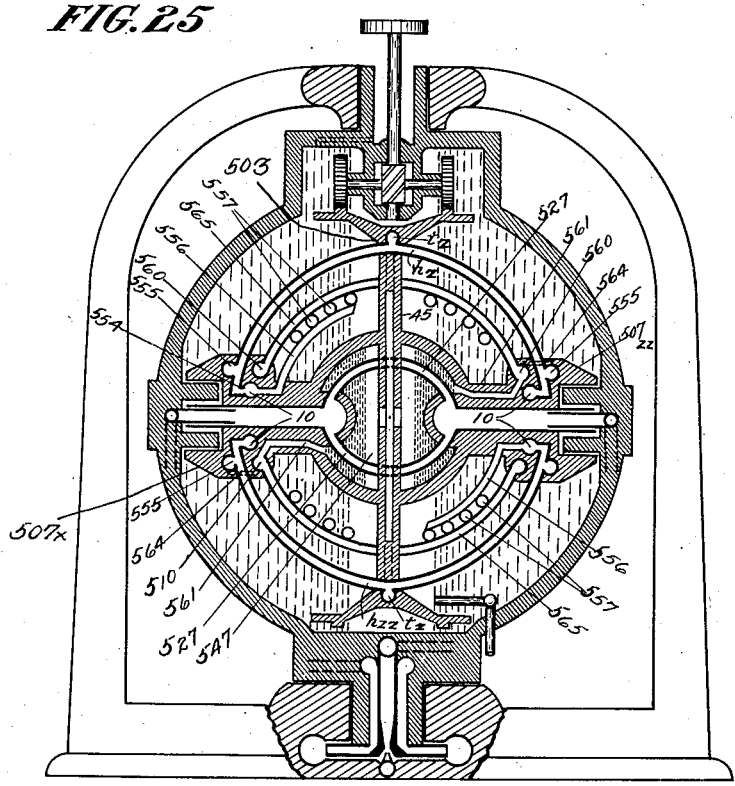
Figure 26:
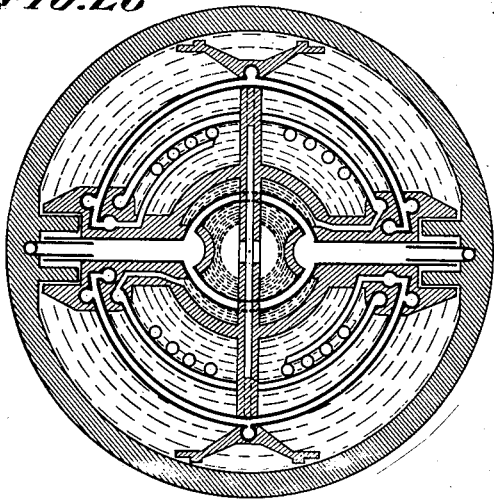
Figure 27:
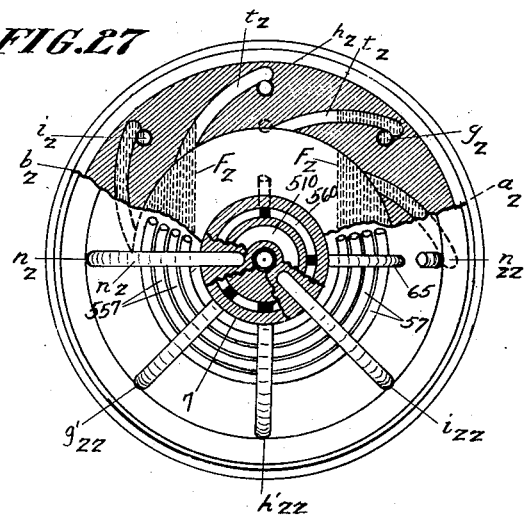

Figs. 25 and 26 are, respectively, vertical and horizontal sections through a modified form of the refrigerating machine. Fig. 27 is a "polar" view, partly in section, of the skeletonized "wheel" of this machine.

Brief outline.

This invention is based on the fact that through the action of centrifugal force, a relatively great difference in internal hydrostatic pressure may be produced between the inner and outer portions of a uniformly rotating, or revolving, body or ring of liquid.

The present invention is thus an application of the combined laws of hydrostatics and of balanced central forces. Taking a name from the characteristics of its principal element, that is, of the rotating liquid body, I accordingly denominate this a centrostatic or centro-hydrostatic engine, compressor, vacuum pump, or refrigerating machine, the term "centrostatic" meaning, or having reference, to that special branch of hydrostatics which deals with bodies of liquid, at rest, or in equilibrium, under the influence of balanced central forces.

The general features of a simple form of this invention may be seen in Figure 8, in which 202 is a rotating vessel containing liquid, which liquid, through the action of centrifugal force, has been thrown outward into the ring-like form as shown, the inner surface of the liquid body being indicated at F''—F.'' 203 and 204 are bucket wheels journaled in the vessel 202. Being journaled in the rotating vessel, these wheels must of course rotate with the vessel, and its contained liquid, about the axis of rotation of the vessel and the liquid body, but, by reason of meshing with a planetary gear arrangement, presently explained but not shown in this figure, the bucket wheels are, in addition, given a second motion, a turning movement on their own axes, whereby they are caused to trap air in the central air space and to then carry the air outward into the high-pressure areas of the liquid body, and to then discharge this air into the receivers 210.

In the centrostatic engine the compressor process is merely reversed. Steam or compressed gas is discharged into the outermost buckets of the bucket wheel, which buckets are of course located in the peripheral portions of the liquid body.

As the gas entrapped within these buckets is forced toward the center of rotation, owing to the displacing action of the heavier compressing liquid, the buoyant effect of the gas is exerted on the bucket wheel, which is thereby caused to turn and develop power. This tendency of the gas to move toward the center of rotation, under the displacing action of the heavier liquid, is what I term "centrostatic buoyancy."

It will presently be shown that the bucket wheel may be formed integrally with its containing vessel so that a single rigid wheel structure, or member, serves as both containing vessel and bucket wheel. This arrangement appears in Figure 16, which is an illustration of the steam-driven motor compressor of this invention, and in which 53—55 is the containing vessel surrounding and formed integrally with its compressor wheel 3, the two thus forming a self-enclosed type of compressor. Surrounding this compressor assembly and rigidly attached to it, though separated from it by the heat insulation 50, is the motor wheel 4.

Steam discharged into the buckets of the motor wheel 4 exerts its buoyant effect on this wheel, which is thereby caused to turn and develop power, thus overcoming the opposing buoyancy of a nearly equivalent volume of gas which is being carried out into the liquid of the interior compressing element by the buckets of the inner compressing wheel 3.

In the refrigerating machine shown in Figure 21 it may further be seen that the bucket wheel 403 may not only be combined with its containing vessel, the covering shell 453, to form a single rigid wheel structure of globe-like form, but that also this same structure is made to include a condenser 457, and vaporizer 447, so that the entire compressor-condenser-expander cycle of the ordinary refrigerating machine is carried on within a relatively simple, and hermetically sealed, steel globe which has neither pistons, valves, nor packed joints. The steel globe wheel is journaled in an external vessel 402 which is otherwise filled with oil. This oil serves merely as a cooling and lubricating means for the globe wheel but has nothing else to do with the cycle being carried on within the hermetically sealed steel globe.

Relation to prior art.

This invention is related to certain other forms in the prior art as follows:

A centrifugal impeller has heretofore been employed to inject a mass of liquid, in which bubbles of gas are mixed or entrained, into a reservoir against a pressure therein existing. Aside from the fact that such devices have an entirely different mode of operation, since, in them, compression results from absorption of the kinetic energy of the liquid, by the gas, my invention is further distinguished by the fact that my claims are limited to the use of mechanical or positive means for conveying the gas between one portion and another of the rotating liquid body.

Others have also employed what I term a converging path type, that is, a bucket wheel, and a ring of liquid which surrounds the bucket wheel, are caused to rotate together at approximately the same speed. The liquid ring, however, turns about one axis, while the bucket wheel turns about an axis that is somewhat displaced from, or eccentric to, that of the liquid ring. Because of this eccentricity, the paths of the buckets and the adjacent portions of the liquid ring alternately converge and diverge. Gas is thus drawn into the buckets and is then discharged into a suitable reservoir. Obviously, in this type, the bucket wheel and the liquid ring must move at substantially the same speed if turbulence of the liquid is to be avoided.

My invention is distinguished, among other things, by the fact that my bucket wheel or other conveying means has a double motion, that is, it not only turns about its own axis but it also turns with the liquid about the axis of the liquid body as well. The wheel may therefore be driven at whatever slow speed is suitable for the compressing action of the wheel, while the liquid body itself may, if desired, be driven at a much higher speed, thus producing a much higher compression or an equal degree of compression with a smaller machine.

This invention is further distinguished by the fact that, usually, my bucket wheel is either journaled in the containing vessel, or is instead formed integrally with its own containing vessel as a single rigid wheel structure. In this last case, this single member is given a double motion of rotation, that is, it turns about one axis, which I term the wheel axis, to produce the compressing action of the wheel. This single member also whirls about another axis, which I term the spin axis, and which second motion causes the liquid to be thrown outward into the form of the usual ring-like compressing element.

Elementary ideas.

Experience has shown that many find great difficulty in comprehending the true nature of this invention. This difficulty apparently is due to a failure to realize the falsity of certain convenient assumptions of everyday mechanics. Thus, in everyday mechanics a sharp distinction is commonly drawn between bodies of liquid "in motion" and other bodies of liquid which are assumed to be "stationary" or "at rest". The present invention compels recognition of the fact that the only condition of rest with which we are acquainted is that of uniform motion, and that thus a whirling body of liquid, so long only as it is in uniform motion, is as much at rest and subject to precisely the same laws of hydrostatics as is any so-called "stationary" body of liquid.

Attention is therefore directed to certain elementary ideas, which, if clearly understood, will materially assist in reaching an understanding of the more intricate forms of this invention.

The compressing element.

An example of the compressing element of this invention is afforded by a familiar experiment as follows:

If a bucket of liquid be attached to a string and then be whirled rapidly in a horizontal circle, the bucket tilts over until it is lying practically on its side, while the free surface of the liquid becomes a nearly vertical wall of water.

In such a whirling body of liquid I employ floats, bucket wheels, inverted siphons, and Archimedean screws, with the same certainty of operation as though the liquid were really at rest, because, with only minor modifications, and as has been stated, this whirling body of liquid answers to all the familiar laws of hydrostatics.

The compressing action.

The actual compressing action carried on within the above described compressing element is exemplified by another familiar experiment, as follows:

If a bucket be inverted and be forced in that position below the surface of a pond or lake, it will have entrapped a quantity of air which will be carried downward into the body of liquid, the air being thereby compressed to the pressure due to its depth of immersion. If this air be carried to a depth of 1,500 feet it will be compressed to a pressure of approximately 648 pounds per square inch.

It will be observed that, though the water of the pond or lake is the direct means of compressing the gas, this water in itself can furnish no part of the energy expended in the work of compression. The entire work of compression must be done indirectly in overcoming the buoyancy of the gas in the liquid.

An early day compressor, designed to operate on the above described principle, consisted of a tank of liquid in which a bucket wheel was nearly submerged and above the surface of which a bucket would appear to empty of water and then to reenter the liquid mouth downward, thereby trapping a quantity of air which was thus carried down into the liquid. As the bucket turned upward at the bottom of its travel, the air escaping upward was trapped in a suitable reservoir, from which a pipe then carried it away to the reservoir under the pressure due to its depth of immersion.

In the original machine a nine-foot bucket wheel was employed to carry air downward to a receiver located at a depth of seven feet below the surface, thereby raising the pressure to three pounds per square inch. The air from this machine was carried down into a mine and there discharged into the lower buckets of a similar submerged wheel. The buoyancy of the imprisoned air caused this wheel to turn and thereby develop power. In this early installation, by Calle, in France, in 1809 appears the exact prototype of both the motor and the compressor of my invention.

The true nature of the present invention should now be readily understood, for I have taken this hydrostatic engine and compressor and have merely substituted centrifugal force for the force of gravity as a means of producing a greatly increased internal static pressure within the body of liquid. So nearly related is the rotating centrostatic form to its prototype, the stationary hydrostatic form, that every form of one machine has its corresponding type in the other. Many obscure features of my invention are thus easily understood by translating them into their corresponding form in the stationary machine.

Imagine one of these tank compressors picked up bodily and whirled rapidly in a horizontal circle, as was the bucket in the familiar experiment aforementioned, or else mounted on a whirling platform, as indicated in Figures 1A, in which $3_a$ is the bucket wheel, while $2_a$ is a tank of liquid lying flat on its side on the whirling table $2_{aa}$. The bucket wheel $3_a$ is driven by means of power supplied by the motor $11_a$ through the worm $5_a$.

The wheel must of course rotate in the counter clockwise direction as indicated by the conformation of the buckets. It is, however, immaterial in which direction the compressor, as a whole, is rotated about the spin axis, $X_a$—$X_a$. That is, it makes no difference in which direction the whirling table $2_{aa}$ is rotated. In either case, the liquid will be thrown outward as indicated. The double motion of the bucket wheels, as herein exemplified, is the principal characteristic feature of this invention.

The free surface of the liquid in the tank may be a nearly vertical wall of water, but, because it is in uniform motion, this tank of liquid is as much at rest as it ever was. A rock will lie on the "bottom" of the tank, or a cork will float on the surface of the liquid undisturbed. The tank itself may be whirling at terrific speed, but inside the tank all is at rest, and the bucket wheel could then be driven slowly and leisurely at a rate of even one revolution per day or per week to trap air at the surface, just as it did in the so-called stationary body of liquid, and to carry that air downward, or rather outward, into the whirling body of liquid. As the buckets of the wheel reach their points of outermost travel, the air flows out of them, and then, bubbling inwardly toward the free surface, is trapped in the receiver, $7_a$, just as it was before in the "stationary" body of liquid.

*Relation to other hydrostatic forms.*

This whirling motion of the compressor, as a whole, would seem to classify this invention with the so-called centrifugal pumps, but with them, my invention has little or nothing in common. Attention should instead be directed to the slow and leisurely movement of the bucket wheels and to the extensive application of the precise laws of hydrostatics.

However, this seeming extension of the laws of hydrostatics is for many a matter of some difficulty. An explanation of an expedient which I have adopted to avoid this difficulty may therefore prove useful.

It is well known, as previously stated, that the only condition of rest with which we are acquainted is that of uniform motion. Since the tank of liquid lying flat on its side on the whirling platform is in a condition of uniform motion, it is in precisely the same condition of rest as a similar tank of liquid standing "at rest" on the floor. Both are whirling a thousand miles an hour eastward about the earth's axis. Both are whirling some 60,000 miles an hour through space in the earth's orbit about the sun. Both are thus in a condition of uniform motion, and both are equally subject to the laws of hydrostatics.

The hydrostatic problems of so-called "stationary" bodies of liquid are rendered easily understandable by taking the earth's surface as the point of observation. From this standpoint the so-called stationary bodies of liquid are actually at rest. We might adopt an equivalent idea in the case of the whirling tank of liquid by taking the interior of the tank itself as our point of reference.

An easier expedient is to almost wholly disregard the rotary motion of the liquid body and to consider that liquid body as being actually stationary or at rest, or, to consider it, that is, simply as a cross section of that body would appear in an instantaneous photograph.

We then have only to consider the motion of the bucket wheels as operating under slightly changed conditions in a "stationary" body of liquid. In other words, in the cross sections shown throughout the accompanying drawings, while we consider the bucket wheel to be in motion relative to the liquid, we consider the liquid compressing element itself, and its containing vessel, to be actually "stationary" or "at rest." We then take account of the rotary motion of the liquid body merely as a means of determining the amount, and direction, of the forces that act on the liquid body.

*Elements of the invention.*

From the foregoing preliminary description of this invention, it will be evident that it consists generally, and in all of its forms, of the following elements: (1) a rotating, or revolving, body of liquid and its container; (2) a means of transferring a gas from one point to another in the liquid body, and, (3) suitable receptacles, passages, and receivers to receive the gas at the end of its travels within the liquid. For purposes of this specification, the terms "rotating" and "revolving," as applied to the compressing element, are considered to be synonymous, since, in this specification, what might be termed "revolving" bodies of liquid are treated as being, theoretically, merely incomplete portions of a larger rotating, and cylindrical, body of liquid.

*The gas carrier or conveyor.*

As to the means for carrying or transferring the gas, hereinafter termed also the conveyor, it will be apparent that this problem of carrying a gas down, or out, into the liquid, in the hydrostatic or centrostatic compressors, is but the inverse of that of lifting water up into the air. Thus, it is that any of the ancient water lifters, chain and bucket, bucket wheel, Archimedean screw, etc., may be converted into gas carriers in my invention, with no important change being necessary in these ancient mechanisms, other than to merely submerge them in the liquid body, and to then provide suitable gas passages, receivers, etc., for handling the gas at either end of its travels.

The worms, buckets, or other receptacles, for the transfer of the gas, may be carried by non-rotary mechanism, such, for instance, as the chain and bucket wheel shown in Figure 1B, in which $2_b$ is a rotating vessel mounted on the whirling platform $2_{bb}$, the same as in Figure 1A preceding. $11_b$ is an electrical motor which drives the chain wheel $5_b$ through the gears $5_{bb}$ as shown. Gas entrapped by the buckets in the central air space is carried out into the liquid body and is then discharged into the receiver $7_b$, the same as in Figure 1A.

Non-rotary gas carriers, such as the chain and bucket, for instance, are more difficult to lubricate and to balance than the rotary forms. I have therefore given preference to the rotary conveyors such as the bucket wheel of Figure 1A or the Archimedean screw as exemplified in Figure 1C and also in the DeRemer Patents, Nos. 15,590 and 15,591, as aforementioned.

It will later be seen that in the preferred form of the invention, the polar type, the conveyor is in fact a combination of bucket wheel and Archimedean screw. In the polar type, the two forms merge so gradually, the one into the other, that it is impossible to say to which type the polar wheel belongs, because, if the compressing tubes be given their proper "bias" as presently explained, the polar type wheel then has essentially the characteristics of both the bucket wheel and the Archimedean screw.

Referring now to the plain Archimedean screw form as shown in Figure 1C, it will be observed that an Archimedean screw has merely been substituted for the bucket wheel in Figure 1A. As before, the worm wheel $3_c$ is caused to turn by reason of power supplied by electric motor $11_c$ through the gears $5_c$—$5_c$. The worm $6_c$, carried on the wheel $3_c$, then traps air in the central air space, and then "screws" the entrapped air outward and downward into the liquid body in the well known manner of the Archimedean screw.

The lower end of the worm $6_c$ turns inwardly at $15_c$ and discharges the compressed air into the inverted receiver formed by the shell $8_c$ of the worm wheel $3_c$.

The worm wheel turns on axles $9_c$ and $10_c$ as shown. Projecting through the lower axle $10_c$ is the fixed and open-ended pipe $12_c$. The open end of this pipe is thus at all times in free communication with the compressed air in the upper end of the receiver shell $8_c$. The compressed air escaping upward from the worm into this receiver can then pass through the open-ended pipe $12_c$ down through the lower bearing $10_c$, and then upwardly through pipe $16_c$ to the line of the spin axis $X_c$—$X_c$, along which it passes out through the packed joint $13_c$ to the stationary external reservoir connection $14_c$, as shown.

It will be observed that, if Sheet 1 be turned so that the right side of Figures 1A, 1B, and 1C are downward, and, if then the upper or left hand portions of these figures be not considered, these figures will then serve as diagrammatic representations of simple hydrostatic compressors. Their action may then be figured on familiar hydrostatic principles. This same procedure may, within limits, be adopted to simplify an understanding of even the more intricate forms of this invention.

*Single and double wheel forms.*

The eccentric-single-wheel form of compressor, as represented in diagrammatic form in Figures 1A and 1C, is a relatively undesirable form, owing to difficulties in balancing, and to the relatively low volumetric capacity of this eccentric single wheel type.

A considerable improvement may be made in these respects by placing another similar wheel to that of Figure 1A, on the opposite side of the spin axis, thereby producing what I term an eccentric double wheel form as shown in Figures 4 and 5; Figure 4 being a vertical section on the line $B_4$—$B_4$ of Figure 5. Figure 5 is a horizontal section on the line $A_5$—$A_5$ of Figure 4.

*The compressor of Figures 4 and 5.*

Referring to Figures 4 and 5, it will be seen that 102 is a rotating vessel which turns in bearings 108 and 109 in the fixed frame 101. Bucket wheels 103 and 104 are mounted in the vessel 102 on axles 107—107 which are rigidly attached to, and are supported by the side walls of the vessel 102, Fig. 5.

A worm gear 106 is cut in the periphery of each wheel. Both wheels thus mesh with the worm 105 which is driven by the electric motor 111. It thus results that, while the bucket wheels must move bodily with the rotating vessel 102 and contained liquid, the wheels may in addition be given a movement of rotation on their own axles 107—107, through power applied to the worm 105 by the electric motor 111. The motor 111 is of course rigidly attached to, and rotates with, the rotating vessel 102.

As shown in Fig. 4, each bucket wheel consists of a central spoked section which serves to support a peripheral ring in which the buckets $g'$, $h'$, $i'$, etc., are cored out. It may also be seen that each of these buckets has a tangential passage $t'—t'$ opening into it. These passages will hereafter be referred to as air ducts or inlet ducts.

Referring now to Fig. 5 where the bucket wheels are shown in longitudinal section, it will be seen that the bucket wheels are really barrel shaped, and that the buckets $g'$, $h'$, $i'$, etc., are really curved tubes, $g'—k'$, which extend from end to end of the barrel shaped wheels. An end view of one of these bucket wheels is shown in Fig. 6.

This barrel shaped wheel is one form of what I term a tubular type of bucket wheel. The buckets $g'$, $h'$, $i'$, etc., will hereafter be referred to as buckets or as tubes indiscriminately, or as may seem most fitting at the moment.

Suppose now that the vessel 102, being nearly filled with water, is then caused to rotate at high speed around the vertical axis $X_4—X_4$ through power applied to the belt wheel 118. The direction of rotation is immaterial. In either case, the liquid will assume the ring like form as shown, thus leaving a vertical and cylindrical air space surrounding the axis of rotation, the free surface of the liquid being at $F'—F'$ in both figures. It will be observed that a small portion of each bucket wheel projects within the central air space.

The bucket wheels are now, as stated, assumed to be rotating bodily with the containing vessel 102 and its contained liquid. If then current be applied to the motor 111, the bucket wheels will be given an additional slow turning movement on the axles 107—107, thus causing the buckets to trap air in the central air space, and to then carry this air out into the rotating body of liquid. The entrapped air is thereby compressed and is then turned into the reservoir in the manner now to be explained.

Referring now to Fig. 4, it will be seen that the middle portions of the tubes $g'—g'$ are just entering the air space, and that air is being drawn into these tubes by reason of the water within the tubes (see Fig. 5) retreating outward to the normal liquid level, that is, to the cylindrical surface F—F.

On the further rotation of the wheels, the tubes reach the position of the tubes $h'—h'$ of Fig. 4. These tubes now contain nearly the maximum amount of air, and, at this point, the air ducts $t'—t'$ are so arranged as to be just re-entering the vertical wall of water on the upper side. The air within the tubes is consequently trapped, and, on further rotation of the wheel, is carried out into the rotating body of liquid.

As the tubes pass successively through the positions of the tubes $i'$ and $j'$, the water presses into the tubes through the air ducts and through the ends of the tubes, the air being thereby compressed to the pressure due to its location in the rotating body of liquid.

Because of its relative lightness, that is, its centrostatic buoyancy, the entrapped air tends, or is forced, always towards the center of rotation. It thus always occupies a position in the tubes as close to the axis of rotation as possible.

As the tube reaches its point of outermost travel, that is, of the position of tubes $k'$ of Fig. 5, it will be seen, and as will be more fully explained later, that the inner wall of the tube $k'$ is now of greater curvature than the surfaces of equal pressure within the body of liquid at the corresponding points. In consequence of this fact, the air can now get closer to center by running lengthwise of the tube. This it does, and then, as the air drops out of the ends of the tubes, and moves toward the center of rotation, it is trapped in the receivers 110—110 which are hollowed out in the axles 107—107. An enlarged view of one of these axles with its flanged receivers 110—110 is shown in Fig. 7.

From the receivers 110—110, the air is conducted through pipes 119—119 to the chamber 120 which is situated in the axial line of the vessel 102. The compressed air is then carried away to the reservoir through a stationary pipe 117 which projects into the chamber 120 through a stuffing box 116.

*Planetary gear.*

The bucket wheels have heretofore been described as being driven by the electric motor 111. An alternate method of driving is supplied by the clutch wheel 114. If this be held stationary, and the vessel 102 be caused to turn in the proper direction, the bucket wheels will then be driven as before, and at a rate of speed depending on the gear ratio of the worm and the worm wheels.

The requisite condition for driving the bucket wheels in this manner is that a condition of relative motion should exist between the worm 105 and the containing vessel 102. It follows that the worm 105 may be held stationary as described, or it may instead be driven at any speed, and either in the same or in the opposite direction to that of the containing vessel. In a working model which I have constructed this arrangement was employed to vary the speed of the bucket wheels independently of the speed of the containing vessel. A wide range of variation in the speed of the bucket wheels was thereby provided.

*The vacuum pump of Figures 8 and 9.*

A simple form of the bucket wheel type of compressor is that shown in Figures 8 and 9; Fig. 8 being a horizontal section on the line $B_8$—$B_8$ of Fig. 9; and Fig. 9 being a vertical section on the line $A_9$—$A_9$ of Fig. 8.

In the eccentric single wheel machines shown in diagrammatic form in Figures 1A, 1B and 1C, and in the eccentric double wheel machine of Figures 4 and 5, the wheel axis has been shown at right angles to the axis of rotation of the liquid body, that is, to the spin axis. The vacuum pump of Figures 4 and 5 is an eccentric double-wheel-form, in which the wheel axis is parallel to the spin axis of the liquid body.

Referring to Figure 9, it will be seen that 202 is the container which turns on journals 208 and 209 in the fixed frame 201. Bucket wheels 203 and 204 are carried on axles 207—207 which are supported by the top and bottom walls of the vessel 202. The lower journal 209 is hollow and through this opening the stationary tube 213 projects into the interior of the vessel 202, and carries on its upper end the stationary pinion 205.

A downwardly extending flange from each bucket wheel carries the two ring gears 206—206. These gears both mesh with the stationary pinion 205, this arrangement constituting an epicyclic train or planetary gear, a variation of which was explained in connection with the worm gear arrangement of Figure 4.

Being journaled on the axles 207—207, the bucket wheels are compelled to rotate bodily with the vessel 202 and its contained liquid. Since the ring gears 206 and 206 mesh with the stationary pinion 205, the bucket wheels are, in addition, compelled to rotate slowly on their own axles 207—207. The bucket wheels thus have the usual double movement of this invention.

The bucket wheels 203 and 204 are assumed to be lighter than the liquid they displace, as would be the case for instance if the wheels were made of cast iron, and if mercury were used as the compressing medium. In the present case, however, oil is used as the compressing medium and this would require that the wheels should be made as light as possible by the inclusion of air chambers within the wheel structure.

Such air chambers are indicated at 229 and 230. These air chambers may of course be made as extensive as is required to make the wheels light enough to float in the liquid. The wheels then, being assumed to be lighter than the liquid they displace, will crowd toward the center of rotation and their thrust will be taken up on the loose pinions, 219—219, one of which is carried by an upward extension of the tube 213, and the other of which is carried by a downward extension of the rotating vessel 202. Annular flanges 220 formed on the tops and bottoms of both wheels bear in against the roller pinions 219, and the wheels are thus allowed to find their own positions of equilibrium, that is, within the limits of the lost motion of the several bearings.

In certain cases it may not seem desirable to lighten the wheels to the extent indicated. In such cases the rollers 219 may be dispensed with and the outward thrust of the bucket wheels be taken up on the axles 207—207.

Referring now to Fig. 8, it will be understood that both bucket wheels will rotate bodily with the rotating body of liquid, and also that they will both turn slowly in a clockwise direction around their axles 207—207.

The construction of the wheels will be self evident from the drawings. As these wheels turn and the buckets pass successively through the position of the buckets $g''$ and $h''$, air is drawn in through the air ducts $t''$—$t''$ and the liquid within the buckets runs outward to the normal liquid level, the cylindrical surface $F''$—$F''$. At $i''$ the inner side of the bucket has re-entered the wall of water again and the gas within the bucket is thus trapped.

With the further revolution of the wheels, the buckets move further out into the body of liquid, the gas within the buckets is thereby compressed and is then tipped into the receivers 210—210, which, as shown, are merely flanged openings into the interior of the axles 207—207. Through these hollow axles the gas escapes upward and into the atmosphere or other outlet as may be provided.

The difficult features of a vacuum pump are as to clearances and the stuffing boxes. As to clearances, this machine of course has none, and as to stuffing boxes this machine exhibits the oil packing which I contemplate using in the centrostatic vacuum pumps, and which system of packing will now be explained.

The gas to be exhausted is conducted into the interior of the vessel 202 through the inlet pipe 213″ and the stationary tube 213, which, as before stated, serves also to carry the stationary pinion 205. The exterior of the stationary tube 213 fits closely to the interior of the longitudinal passage through the lower journal, leaving, however, a narrow annular opening 215 directly into the vacuum chamber of the pump.

The lower end of the journal 209 dips into an oil well, 216, which is constantly supplied with oil. There is thus a constant seepage of oil through the passage 215 but any leakage of air through that passage is effectually prevented.

It will be observed that an annular flange 221 forms an annular recess 222 on the top of the vessel 202. This recess is merely an extension of the interior of the vessel 202, for passages 223 and 224 make direct connection between the oil within the recess and that carried within the interior of the containing vessel 202. The difference between the two chambers is this: The air space of the recess is open to the atmosphere through the central opening 225, while the air space within the containing vessel is connected to the vacuum chamber.

It thus results that the free surface of the liquid within the recess is on the lines $e''—e''$, while the free surface of the liquid within the container is on the lines $f''—f''$, the depth of liquid between the two lines compensating for the difference of the gas pressures within the two air spaces.

The excess of oil which is constantly finding its way in through the stuffing box 215, passes out through the passages 223 and 224 into the annular recess 222 where a constant level is maintained by the overflow pipes 226 and 227. The excess of oil passes out through these overflow pipes and is then caught in the annular cup 228 which is connected by a pipe, not shown, to the oil reservoir, and to the oil well below the end of the journal 209. A constant circulation of the oil is thus maintained without oil pumps of any kind.

*The laws of centrostatics as applied to the compressing element.*

Certain of the preferred forms of this invention are somewhat intricate and confusing. I have learned from experience that I can best explain these more intricate forms by first pointing out the very obvious principles of the simpler forms shown in the preceding Figures 1A, 1B, and 1C, and Figures 4 to 9 inclusive, and to then use these simpler forms as explanatory of the laws of centrostatics upon which the more intricate forms are of course likewise based. Further, this course avoids the necessity for almost endless repetition in the description of the more intricate forms which follow.

Attention is now therefore directed to a brief outline of the laws of centrostatics as they apply to the rotating liquid bodies employed as compressing elements, hereafter termed also "centrostats" in this invention.

*Types of compressing element.*

The compressing element appears in two principal forms, (1) what I term the tubular, or incompletely cylindrical form, and, (2) the cylindrical form itself.

The tubular form is exemplified in the familiar experiment of the whirling bucket of liquid aforementioned, also in the De-Remer Patents 15,590 and 15,591, and also in a balanced form, in Figure 2E, in which the container $2_e$ is a simple length of tubing with capped ends, partly filled with liquid, and caused to rotate at high speed around the vertical axis $X_e—X_e$. This is the equivalent of the whirling bucket of the familiar experiment aforementioned, except that, for balancing purposes, a similar body of liquid has been disposed on the opposite side of the axis of rotation. In this balanced form, some means should be provided for connecting and so maintaining equilibrium between the two opposing bodies of liquid. The tubular type of centrostat tends toward intricacy of design. It is therefore taken up only in the latter part of this specification where, in a modified form, it appears as the enclosed compressing element of the refrigerating machine.

*The cylindrical type of compressing element.*

A simpler form of compressing element is the cylindrical type which is shown in vertical and horizontal section in Figures 3F and 3G, respectively; Figure 3F being a vertical section on the lines $B_g—B_g$ of Figure 3G, and Fig. 3G being a horizontal section on the line $A_f—A_f$ of Fig. 3F. Throughout these drawings, the principal letters X—X are used to represent the axis of rotation, or a cutting plane passing through that axis.

*Surfaces of equal pressure within the compressing element.*

In Figures 3F and 3G, the containing vessel $2_g$ is assumed to be rotating at high speed around the vertical axis $X_g—X_g$, in consequence of which the liquid "banks up" around the sides of the containing vessel in the manner shown. In certain compressors of large size and relatively slow speed, the central air space may become sensibly parabolic in form. These will be later taken up in connection with Fig. 1D.

In the present instance the compressing element is assumed to be rotating at relatively high speed, in which case the free surface of the liquid, while really parabolic in form, may, for our purpose, be considered to be a truly vertical and cylindrical wall of water. The central air space, while really a paraboloid of revolution, may likewise be considered to be truly cylindrical. Its axis is of course identical with the axis of rotation of the liquid body.

*Calculation of internal static pressure within the compressing element.*

The internal hydrostatic pressure developed within the liquid of the compressing element, at any given distance from the axis of rotation, is easily calculated from the formula for centrifugal force. A convenient formula for slide rule calculation is as follows, $$P = \left(\frac{rs}{14}\right)^2;$$

in which $r$, in inches, is the distance of the given point from the axis of rotation, and $s$ is the speed, in hundreds of revolutions per minute. For example, at a point, that is distant ten inches from the axis of rotation in a body of water rotating 1,000 R. P. M., the pressure $$P = \left(\frac{10 \times 10}{14}\right)^2 = 51.12$$

lbs. per square inch approximately. This formula is for liquids having a specific gravity of 1.00, and for compressing elements having no central air space. If a central air space exists, the pressure corresponding to the radius of the air space must be deducted in the above formula.

Referring now to the tube $2_e$ of Fig. 2E, assume that this tube has an internal cross-section of four square inches. Assume also that it is rotating 1,500 R. P. M. around the vertical axis $X_e$—$X_e$, and that the free surface of the liquid $F_e$ is six inches from the axis.

Assume that the layer of liquid $F_e$—$O_e$ has a depth of one inch. Since the cross-sectional area of the tube is four square inches, the layer of water $F_e$—$O_e$ will have a cubic content of four cubic inches. Its center of gravity will be 6½ inches from the axis. Its centrifugal force is easily calculated to be 59.8#. Since this force must be supported on an area of four square inches, it is evident that the internal static pressure existing on the line $O_e$ must be 14.9 pounds per square inch.

Assume that the layer $F_e$—$p_e$ has a depth of two inches. Its cubic content will be eight cubic inches, its center of gravity seven inches from the axis, and its centrifugal force 128.8 pounds. The pressure on the line $p_e$ is thus found to be 32.2 pounds per square inch.

*Calculation of "centrostatic" buoyancy.*

A light body in a rotating body of liquid is forced toward the center of rotation owing to the displacing action of the heavier liquid. This tendency toward the center of rotation, owing to the displacing action of the heavier liquid, is what I term centrostatic buoyancy.

Assume that $r_e$, Fig. 2E, is a cubic float having dimensions of one inch each way, and that this float is of negligible weight and centrifugal force. The float $r_e$ is located as shown between the lines $O_e$ and $p_e$. Since the float is of negligible weight, it will have an upward buoyancy due to gravity of approximately .036 pound.

On two of its sides the pressures balance and so these sides may be neglected. On the side nearest the axis, the pressure radially outward has been calculated to be 14.9 pounds. On the opposite side of the cube, the pressure radially inward is 32.2 pounds, thus leaving an effective thrust toward center of 17.25 pounds. This however is the centrifugal force of a cubic inch of water when occupying the position in the cube $r_e$, from which it follows that the centrostatic buoyancy of a light body, that is, its tendency to move toward the center of rotation, is equal to the difference between its own centrifugal force and that of the liquid it displaces.

*Pressures within a typical compressing element.*

As an example of the intensity of the forces which act on the rotating body of liquid, the compressing element of Figures 3F and 3G together with its container $2_g$ will be assumed to be turning 1,500 R. P. M. around the vertical axis $X_g$—$X_g$. The containing vessel $2_g$ is assumed to be slightly over four feet internal diameter, so that the cylindrical surface of equal pressure indicated by the lines $C_g$—$C_g$ is 24 inches from the axis. The surface $D_g$—$D_g$ is eighteen inches from the axis, while the surfaces $E_g$—$E_g$ and $F_g$—$F_g$ are, respectively, 12 and 6 inches from the axis.

The cylindrical air space is thus 12 inches in diameter and the ring of liquid is 18 inches in depth, that is, in a horizontal direction. The compressing element is assumed to be composed of water.

Under these circumstances, the free surface of the liquid, $F_g$—$F_g$, is exposed to a pressure which is practically atmospheric, for the central air space is in free communication with the outside air through the axial opening in the top of the vessel $2_g$.

Applying the formula, it is found that one inch beyond the free surface of the liquid, that is, seven inches from the axis, the internal static pressure existing within the body of liquid is approximately 14.9 pounds per square inch above atmospheric, two inches beyond the surface it is 32.2 pounds, while on the lines $E_g$—$E_g$, six inches from the free surface, the pressure is 124.4 pounds. On the lines $D_g$—$D_g$, twelve inches from the surface, the pressure is 331 pounds. On lines $C_g$—$C_g$, eighteen inches from the free surface, and 24 inches from the axis, the internal static pressure existing within the rotating body of liquid is approximately 621 pounds per square inch.

It is thus seen that the act of carrying a bucket of air from the central air space out through this eighteen inches of water, is equivalent to carrying it to a depth of approximately 1,440 feet in a stationary body of water. Since the work to be done is the same in both cases, it is evident that the force to be overcome, the buoyancy of the gas, must be many hundred times greater in the case of my invention.

*Buoyancy of a gas within a typical centrostat.*

As has been stated, the entire work of compression in my invention must be done in overcoming the buoyancy of the gas in the liquid, and no part of this work of compression can be done in maintaining the rotation of the body of liquid. That the entire work of compression may be accounted for in this manner will be evident on consideration of the buoyancy developed by a volume of gas under the given conditions.

In ordinary water a pint of gas would have a buoyancy of approximately one pound. If this pint of gas were located on the line $E_g$—$E_g$ of Fig. 2E or 2G, it would have a buoyancy of approximately 765 pounds. On lines $D_g$—$D_g$, its buoyancy would be approximately 1,150 pounds, while on the lines $C_g$—$C_g$, 24 inches from the axis, and at the stated speed of 1,500 R. P. M., the buoyancy of the pint of gas would be approximately 1,364 pounds.

If mercury instead of water were used as the liquid of the compressing element, then, under like conditions, the buoyancy of the single pint of gas would be somewhat in excess of ten tons.

*Action of the compressed air as it is turned into the receiver.*

The action of the compressed air as it is turned into the receiver is worthy of note. Referring back to Fig. 6, for this purpose, it is seen that a pipe 119 rises upward out of the receiver 110, and then turns downward to reappear as the pipes 119—119 of Fig. 4. This pipe serves to carry the compressed air from the receivers 110 to the chamber 120.

Beginning now with the action of the compressor in an idle or stationary condition, it will be seen that the liquid within the vessel 102 cannot escape downward into the chamber 120 for the reason that the bend of the pipe 119, Fig. 6, is above the normal liquid line.

Assuming the same dimensions for the compressing element of Fig. 4 as in that of Figs. 3F and 3G, then, when the compressor of Fig. 4 is rotated 1,500 R. P. M., the same as in 3G, the central air space will be 12 inches in diameter, and the mouth of the receivers 110—110, being located 12 inches from the axis of rotation, will be under pressure of 331# per square inch.

Starting then with the compressor in a stationary condition, if then the vessel 102 be caused to rotate, the liquid assumes the ring-like form as shown. The liquid consequently extends upward around the bends of the pipe 119, and follows that pipe inwardly toward the axis until it reaches the normal liquid line which, as has been stated, is assumed to be six inches from the axis of rotation.

If the electric motor then be started, air will then be carried out and be turned into the receiver 110—110. This air bubbles inwardly through the liquid in the pipes 119 until it reaches the chamber 120 or the pipes 119 immediately adjacent thereto, the chamber 120 being of course in direct communication with the reservoir.

As the pressure builds up in the reservoir, the water within the tubes 119 retreats outward until it reaches a point where the inward pressure of the water is just equal to the outward pressure of the gas from the reservoir. Thus, from previously calculated results, if the reservoir pressure is 124 pounds per square inch, the water within the pipes 119 will retreat outward until it reaches a line approximately 12 inches from the axis of rotation.

*The preferred form of the invention.*

Assuming that the foregoing exposition of elementary ideas is now clearly understood, and also that the broader forms of the invention, as exemplified in its numerous types, have been noted; I will now pass to an explanation of the preferred form of the invention, the polar type.

It should be understood however, that, while I consider the polar type to be the best form, at least for general purposes, this judgment is based on merely practical considerations, which may change at any time. Thus, the invention of some new alloy, or a new gear system, might cause some other type to become the preferred form. Therefore, while I have directed this specification almost exclusively to the preferred form, careful note should be made of the various other types which have been described, and which may at any time become the preferred form, at least for special purposes.

*Brief outline of the polar type.*

The preferred form of this invention is what I term a non-eccentric single-wheel machine of the polar type.

To form such a machine from the compressor of Figures 4 and 5, it is necessary to discard one wheel, and to then move the remaining one into the center of the containing vessel. In such case, if the compressing tubes be correctly formed for the proper discharge of the compressed gas, the compressing wheel becomes an oblate spheroid, that is, flattened at the poles, instead of being prolate, or barrel-shaped, as in the compressor of Figures 4 and 5.

The general features of such arrangement may be seen in Figures 10, 11, and 12, of which Fig. 10 is a vertical section on the line $X_o$—$X_o$ of Fig. 11, and on the line $B_o$—$B_o$ of Fig. 12. Figure 11 is a vertical section on the line $X_o$—$X_o$ of Fig. 10, and on the line $C_o$—$C_o$ of Fig. 12. Figure 12 is a horizontal section on the line $A_o$—$A_o$ of Figs. 10 and 11. Fig. 12 is of course rotated ninety degrees with reference to Fig. 11.

Referring now to Fig. 11, the containing vessel 302 is assumed to be rotating at high speed about the vertical axis $X_o$—$X_o$. The vessel 302 is approximately spherical in form and is but little larger than the compressing wheel. It will be observed that the compressing liquid has been thrown outward into a ring-like form, thus leaving the usual central air space surrounding the axis of rotation, the inner surface of the compressing liquid being indicated at $F_o$—$F_{oo}$.

As previously stated, the bucket wheel 303 is approximately spherical in shape but flattened at the poles. In Fig. 11 we are looking directly at one of the polar caps, a portion of the inner shell having been broken away to show part of the compressing tubes in equatorial section.

The principal structural member of the globe wheel, 303 (Figs. 10 and 11), is an inner shell, 351, known hereafter as the spheroidal shell. Rigidly attached to the surface of the shell 351 (Fig. 10), or cast integrally therewith, are what I term the meridian ribs 352, which, as might be inferred, arch across the surface of the spheroidal shell, 351, from one polar cap to the other.

The middle or equatorial sections of the meridian ribs, 352, are enclosed by what I term the "covering shell", 353, to form the meridian compressing tubes previously referred to.

It will presently be explained that as the entrapped gas approaches the polar ends of the meridian tubes, the entrapped gas then has no tendency to escape over the outer edges of the meridian ribs, and thus, in Fig. 11, the cover 353 encloses only the equatorial sections of the compressing tubes. The polar ends of these tubes are merely troughs formed by the meridian ribs 352 and the spheroidal shell 351. However, in the explanatory diagrams presently to be described, it will be noted that these tubes are represented as being completely enclosed from one polar cap to the other.

Referring to Fig. 10, it will be seen that the bucket wheel 303 is journaled on the axle 307, which in turn is supported by the sidewalls of the vessel 302. Annular orifices are cored out within the ends of an enlarged central section of the axle 307 to form the receivers, 310, for the compressed gas. The bucket wheel 303 is driven by a modified form of the planetary gear previously explained.

Taking up now, in preliminary fashion, the operation of the polar type wheel, it will be assumed that the vessel 302, Fig. 11, is rotating, as stated, at high speed around the vertical axis $X_o$—$X_o$. The direction of rotation, so far as the liquid only, is concerned, is immaterial. In either case the liquid will be thrown outward as indicated, its inner surface being indicated at $F_o$—$F_{oo}$. The bucket wheel however must rotate in a counter clockwise direction because of the arrangement of the air ducts $t_o$—$t_{oo}$.

Assuming then that the bucket wheel is being driven, by means of a planetary gear, in a counter clockwise direction, it will be seen that the compressing tube $g_o$ is just entering the central air space. The liquid within it has retreated outward both ways from the central portion of the tube, and air is being drawn in through air duct $t_o$. As the tube reaches the position of tube $h_o$, it lies directly across the central air space, and thus holds the maximum volume of air. At this point the air duct is so arranged that its inner end $s_o$ is entering the further wall of compressed liquid. The air contained within the middle portion of the tube is thereby entrapped, and, on further rotation of the wheel, the entrapped gas is then carried out into the liquid body.

As the wheel continues its rotation, and as the tube $h_o$ passes successively through the positions $i_o$, $j_o$, $k_o$, and $l_o$, the compressed liquid crowds in on the entrapped air, through the air ducts, and through the open ends of the compressing tube. The entrapped air is thereby compressed to the pressure due to its position in the liquid body.

As the tube $h_o$ reaches the position of the tube $m_o$, the entrapped gas has then been carried out into the liquid to a point that is further from the axis of rotation than is the polar cap itself. Therefore, in consequence of the flattening of the poles, as previously referred to, the entrapped air can then get closer to the axis of rotation by flowing lengthwise of the tube to the polar caps. The entrapped air then reaches the polar caps by flowing over the spheroidal shell 351, and between the ribs 352, and then drops over what I term the "polar edge", 354, of the spheroidal shell 351, and is thus discharged into the open-mouthed receiver 310, Fig. 10. From the receivers 310, the compressed gas is carried out through internal passages within the axle 307, to a sidewall connection, from which it passes through a packed joint at the bottom to a reservoir connection, as presently explained.

The action of the polar type wheel, as thus briefly outlined, is the basis of the preferred forms of this invention. The action of this wheel will now therefore be taken up in detail in Figures 13A to 13E inclusive.

Action of the polar wheel.

From the foregoing preliminary description of the polar type wheel, it may be seen that the polar ends of the compressing tubes, remain always at the polar caps, in what I term an "intermediate" high pressure area of the liquid body. The middle portions of the tubes, however, alternate between the low pressure area in the central air space, and a high pressure area, which is still further from the axis of rotation, than are the polar caps themselves. The middle portions of the tubes thus entrap air in the central air space, and then, on further rotation of the wheel, carry this air out into the high pressure area aforesaid, and from which high pressure area the entrapped air can then flow of its own accord to the receivers for compressed gas located in the relatively lower—or intermediate—pressure areas existing at the polar caps.

Referring to Figures 13A and 13B, where the entrapping action of the compressing tubes and air ducts are shown in detail, it will be seen that $F_o$—$F_o$ is the inner surface of an incompletely shown rotating body of liquid. We are consequently assuming to be looking down on a cross-section of a central air space. In these figures $u_o$, $v_o$, $w_o$, $x_o$, and $y_o$ represent successive positions of a tube such as tube $h_o$ of Fig. 11, as that tube approaches and crosses the central air space.

It should be understood that both the air ducts and compressing tubes in diagrams 13A to 13E inclusive are represented in merely diagrammatic form, and of such various sizes as best lend themselves to a clear representation in the different diagrams.

Referring to Figure 13A, it will be seen that the tube $u_o$ is just entering the central air space. The water within the tube $u_o$ has retreated outward to the normal liquid line, and a small quantity of air has been drawn into the air duct $t_o$.

At $v_o$, Fig. 13B, the tube has passed further into the air space and more air has been drawn into the tube. At $w_o$, Fig. 13A, the tube lies directly across the middle portion of the air space, and the tube thus contains the maximum amount of air. At this point, the air duct $t_o$ is so designed that it is just reentering the wall of water at $F_o$, and the air within the tube is consequently trapped.

As the tube passes successively through the positions of tube $x_o$, of Fig. 13B, and of tube $y_o$, of Fig. 13A, the compressing liquid presses in through the ends of the tubes, and through the air ducts, thereby compressing the entrapped air to the pressure due to its position in the liquid body, as is indicated in tube $y_o$ by the lesser volume of air in that tube than in tube $w_o$. It may also be noted that the free surface of the air within the tube $y_o$ is bounded by a cylindrical surface of equal pressure drawn about the axis of rotation of the liquid body.

Referring now to Figs. 13C, 13D, and 13E, which correspond with Figs. 10, 11, and 12, respectively, it will be seen that Fig. 13C is a vertical section on the line $X_o$—$X_o$ of Fig. 13D, and on the line $B_o$—$B_o$ of Fig. 13E. Fig. 13D is a vertical section on the line $X_o$—$X_o$ of Fig. 13C, and on the line $C_o$—$C_o$ of Fig. 13E.

Referring now to Fig. 13C, which, as stated, is a diagrammatic form corresponding to the vertical section shown in Fig. 10, it will be seen that 302 represents the containing vessel rotating at high speed about the axis $X_o$—$X_o$, the inner surface of the liquid ring being shown at $F_o$—$F_o$. The bucket wheel 303 is here represented by the pair of oppositely disposed compressing tubes $h_o$ and $h_{oo}$. The middle portions of tubes $h_o$ and $h_{oo}$ lie directly across the middle portion of the central air space. The liquid within these tubes has thus retreated outward both ways towards the polar caps, and air has been drawn into the middle portions of each tube, as indicated.

Referring now to Fig. 13D, which, as stated, is a diagrammatic representation of the vertical section shown in Fig. 11, it will be seen that the tube $h_o$ is here seen in end section, and that its air duct $t_o$ is just entering the inner surface of the liquid body $F_o$. The air in this tube is thereby trapped, and is then carried out into the liquid body in the manner explained in connection with Figs. 13A and 13B. Then, when this tube $h_o$, of Figs. 13E and 13C, has turned with the wheel through ninety degrees, it will have reached the position of tube $m_o$, of Fig. 13E.

Referring to Fig. 13E, it will be seen that, by reason of the flattening at the poles, as heretofore referred to, the inner wall 351 of the tube $m_o$ is now of greater curvature than the corresponding surfaces of equal pressure within the rotating liquid body. In consequence of this difference in curvature, the air entrapped within the tube $m_o$ can now get closer to the axis of rotation, by running lengthwise of the tube $m_o$, and then dropping into the open-mouthed receivers 310—310 located in the polar caps, as shown.

The tube $m_o$, of Fig. 13E, having discharged its gas into the receivers 310—310, as just indicated, is now completely filled with compressing liquid. This condition continues, until the air duct and the middle portion of that tube enter the lower portion of the central air space, as indicated by tube $h_{oo}$ of Fig. 13C. As may be seen, the compressing liquid in tube $h_{oo}$, Fig. 13C, has retreated outward to the normal liquid line, and air has been drawn in through the air duct $t_{oo}$ to replace it.

Referring again to Fig. 13D, the air duct $t_{oo}$ of tube $h_{oo}$ is again entering the wall of compressing liquid on the further side, and the air contained within the middle portion of this tube is again entrapped. As the tube $h_{oo}$ turns through ninety degrees, and reaches the position of tube $m_{oo}$ of Fig. 13D, it will have then reached the position indicated by tube $m_{oo}$ shown in the horizontal section, Fig. 13E. The inner wall, 351, of the compressing tube $m_{oo}$ is again of greater curvature than the corresponding surfaces of equal pressure within the rotating liquid body. The air therefore again runs lengthwise of the tube, both ways, to the receivers 310—310 located in the polar caps.

The tube $m_{oo}$, being now completely filled with compressing liquid, turns with the wheel through another ninety degrees. It then enters the upper portion of the central air space, and reaches the position of tube $h_o$, as indicated in Fig. 13E, thus completing the tube cycle of the wheel.

It will thus be seen that the tubes of the polar type compressing wheel are double-acting, that is, the middle portion of each compressing tube entraps a volume of air in the upper portion of the central air space; then turns through one-quarter revolution, and discharges its entrapped air into the receivers located in the polar caps, the tube then being completely filled with compressor liquid, turns through another quarter revolution, and then enters and crosses the lower portion of the central air space where air is again entrapped, then again carried through ninety degrees to the horizontal diameter where again it flows both ways to the receivers in the polar caps. The tube then being once more completely filled with compressing liquid, turns through another quarter revolution, and again reaches its initial position in the upper portion of the central air space, thus completing the cycle of the wheel.

Elements of design of polar type wheels.

In order to avoid repetition in a detailed description of the preferred forms which follow, it seems advisable at this point, to give a brief statement of the principal factors which determine the design of the various elements of the polar type wheel.

Double motion of the bucket wheels.

It has been pointed out that the bucket wheels of this invention have a double movement, that is, they move substantially in unison and at relatively high speed, in common with their containing vessel and its liquid compressing element, about the axis of rotation of the containing vessel, that is, about the spin axis of the compressing element. The bucket wheels have, in addition, a generally slower turning movement on their own axles, the wheel axis of the compressor.

These two movements are practically independent of each other and serve entirely different purposes. The bucket wheels are essentially slow speed mechanisms and they are driven at such speed as will permit them to function properly. The rotating vessel, on the other hand, is driven at whatever speed may be necessary to produce the required internal static pressure within the body of liquid.

In the design of the machine, however, due regard must of course be had to keep the rotary speed of the containing vessel within such limits as the conditions of balancing, vibration, structural strength, etc., may permit.

In a working model which I have constructed, the bucket wheels functioned best at 60 R. P. M. They were consequently driven at this speed regardless of the speed of the containing vessel which was driven at speeds varying from 1,500 to 2,200 R. P. M.

In actual practice the containing vessels will probably be driven at speeds ranging from 200 to 3,500 R. P. M., or higher, the more usual speeds probably being in the neighborhood of 600 to 900 R. P. M. The bucket wheels will probably be driven at speeds varying from 10 to 400 R. P. M., the upper limit being set by the ability of the buckets to function properly at the higher speeds. With each type of bucket wheels it will simply be a question of determining at what speed the wheel functions best, and to then arrange the gearing to drive the wheel at that speed.

Function of the air space.

The air space in a centrostatic compressor serves practically as an inlet valve, and the size of the air space is what determines very largely the amount of air that is entrapped in the individual buckets. It will presently be seen that I employ a variation in the diameter of the air space as a means of governing, or controlling the output of the compressor.

Doubling the diameter of the air space will, generally, approximately double the free air capacity of the compressor, at the cost of a slight lessening in the resultant degree of compression, owing to the lessening of the depth of water which presses in on the compressed air.

It will be apparent that the liquid lying close to the axis is of little value for the purpose of producing the required internal static pressure within the rotating body of liquid. By sacrificing this innerlying layer of liquid, a relatively enormous gain may be made in the volumetric capacity. For this reason, as will presently be explained, I contemplate employing air spaces which are relatively great, and compressing elements consisting of thin rings of liquid having depths of perhaps only two or three inches. In the design of each compressor, however, it will be necessary to choose such dimension of air space, and depth of liquid ring, as seem best to meet the required conditions.

Functions of the air duct.

Within limits which have just been discussed, the air space is kept as small as possible, as thereby the rotary speed of the containing vessel is kept at a minimum.

This entails then that the air duct shall re-enter the wall of water at such time as will entrap the largest possible quantity of air within the bucket. This will usually or always occur at the time when the bucket is nearest to the center of rotation. It is for this reason that the air ducts $t_o$, $t_{oo}$, of Fig. 11, are extended out in advance of the buckets.

Design of the buckets.

The function of the buckets may properly be divided into the three stages of intake, carrying, and discharge.

Of the intake features, it is required that, as the bucket enters the air space, it shall permit of the easy retreat of the liquid outward to the normal liquid line, and of the free access of the air to the interior of the bucket. In this respect, the perfect action of the tubes and air ducts of the polar type wheel is apparent.

Of the carrying features, the bucket should be so arranged (in a compressor only) that the entrapped gas is quickly spread out into thin sheets and over new surfaces, so that the compressed gas is thus quickly deprived of its heat of compression. The resulting compression may thus be made isothermal, or nearly so, and thereby effect a saving of perhaps 25% to 50% in power costs.

It will be apparent that in Fig. 11, as the tubes pass successively through the positions of tubes $h_o$, $i_o$, $j_o$, $k_o$, $l_o$, and $m_o$, the air extends lengthwise in the tubes and thus fulfills the above requirement.

It is to be observed that in some cases, this sliding action of the gas within the bucket requires attention to assure that the gas does not begin to discharge prematurely. The air ducts must of course be so designed that the air cannot wrongly escape back through them at any point in the travel of the bucket.

Of the discharge features, the bucket should be so arranged as to discharge easily by a progressive sliding action, as distinguished from what might be described as an abrupt dumping action. Fig. 11 illustrates this sliding discharge; the vacuum pump of Fig. 8 illustrates the dumping action.

It will be observed that, in Fig. 11, as the tubes pass successively through $i_o$, $j_o$, $k_o$, and $l_o$, the air within the tubes extends lengthwise of the tubes at a rapidly increasing rate. With a normal volume of entrapped air, the air would perhaps begin to discharge into the receiver when the tube reached the position of the tube $l_o$. By the time the tube had reached the horizontal diameter, line $A_o$—$A_o$, the gas would all have slid lengthwise out of the ends of the tube $m_o$, and been trapped in the receivers 310—310. This sliding discharge is one of the principal reasons why the polar type is considered to be the ultimate form of this invention.

Inclination of the tubes.

The tubes of any tubular or polar type wheel will have what I term inclination. This inclination has to do only with the discharge of the gas. It is therefore measured only at the point of discharge, that is, in the positions of tubes $m_o$—$m_{oo}$ of Figs. 11 and 12.

Referring to Fig. 12, it will be seen that the middle portions of the inner wall of tubes $m_o$—$m_{oo}$ are further from the axis of rotation than are the ends of those tubes. The amount to which the ends of the tubes approach the axis of rotation is what I term the inclination of the tube. A tube with one inch inclination would thus be one whose ends, at the point of reference, were one inch closer to the axis than was the middle portion of the tube.

"Two-in-one" compressing tubes.

From previous description, it will be noted that, except for a sharing of the common air duct, each half of the compressing tubes $h_o$, $h_{oo}$, etc., is, in reality, a complete compressing tube in itself. Thus, it may be seen that any entrapped air within the compressing tubes, divides at midlength of the tubes, and flows both ways from that point, to the receivers 310 located in the two polar caps. It follows, that the tubes may then be divided at their midlength, and that the two portions of the tube, if provided with separate air ducts, will then operate independently of each other. Such a division of the tubes permits of the wheels being built up, or cast, in separate or independent hemispherical sections, and thereby permits of easier manufacturing methods.

Bias of the tubes.

Aside from their inclination, it will be seen that the tubes of Fig. 11 run parallel to the axis of the bucket wheel. They may, in addition, be given a spiral form as in an Archimedean screw. Beginning with the middle portion of the tube, if the ends of the tube extend forward in the direction of rotation, the tube has what I term advancing bias. If the ends progress, from the middle outwards, in a direction contrary to the direction of rotation of the wheel, the tubes then have what I term receding bias.

As will presently be explained in connection with Fig. 18, the biased tube form of bucket wheel is really the preferred form of the polar type wheel. Owing to difficulty in illustration, the unbiased form is shown throughout this specification. From the explanation accompanying Fig. 18 however, it is thought that no difficulty will be found in understanding the preferred form.

For the present then, only the tubes of zero bias need be considered.

Design of the receivers.

An unavoidable loss in the centrostatic compressor is what I term drop, that is, it is necessary to carry the gas out beyond the receivers, and then to allow the gas to flow back, or drop back, into the receivers. This entails a positive loss in that the air must first be compressed to an excess pressure and then be allowed to drop back to a lower pressure without doing any useful work.

This drop should then be kept as low as possible, and this entails that the air within the receiver should be kept as near to the point of overflow as possible, without actually allowing the overflow to take place. It will presently be seen, in connection with the motor compressor of Figs. 14 to 18, how this point is provided for by the governing mechanism that is applied to the compressor.

Volumetric capacity of a centrostatic compressor.

The volumetric capacity of a centrostatic compressor may be calculated from the volumetric capacity of the individual buckets, and of the number of buckets which pass through the air space in a given time. An easier method of approximation is, instead, to consider the buckets as an endless chain of diaphragms, or pistons, which sweep through, or generate, a certain volume in a given time.

The buckets may thus be considered to be traveling in a circle at the velocity attained by their middle portions. The circumference of such a circle is what I term the pitch circle. Thus, in Fig. 11, assume that the bucket wheel 303 is approximately four feet in diameter, and that the compressing tubes $h_o$, $h_{oo}$, etc., have a radial depth of three inches, also that the wheel rotates 60 revolutions per minute, and that the air space is 16 inches in diameter. The circumference of the pitch circle may then be figured to be 11.7 feet. The velocity at the pitch circle is then 60 times this, or 702 feet per minute. Since the buckets act twice during each revolution, the "effective" velocity at the pitch circle may be taken as 1,404 feet per minute. The area swept out is then 1.25 times this, or 1,755 square feet per minute. Multiplying this by the height of the bucket gives us 438 cubic feet as the volume swept out. Deducting 10% for space taken up by meridian ribs, etc., leaves 398 cubic feet per minute as the approximate volumetric capacity of this compressor under the stated conditions.

The ammonia compressor of Figures 10–11–12.

Figures 10, 11, and 12 represent an oil packed and power driven compressor of the polar type. Merely as an application of the preceding theory, this machine has been designed as a 50-ton ammonia compressor, that is, one having an intake capacity of 200 cubic feet per minute.

It should be understood, that these dimensions and speeds are merely by way of explanation. It will be apparent that, since the bucket wheel of the polar type has a double motion of rotation, it will be subjected to a gyroscopic force tending to bring the two axes of rotation into alignment with each other, that is, one end of the axle 307 will tend to rise, while the other will tend to move downward. It will also be understood that the action of the buckets of the compressor wheel, in picking up uneven volumes of gas during the operation of starting up, or shutting down, may produce severe unbalances in an otherwise well balanced wheel.

For these reasons, the speed herein indicated by way of explanation, might result in excessive vibration and noise. In such case, such refrigerants must be chosen as have characteristics corresponding to the allowable range of speeds and consequent pressures.

For machines of relatively high speed, that is, of perhaps 800 R. P. M. and above, some further forms of balancing than are explained in this specification will probably be found necessary. For such cases, reference may be had to co-pending application No. 256,259, which, as stated, was issued to Edwin J. Creel, as assignee of Jay Grant DeRemer, as Patent No. 1,594,092, dated July 27, 1926. It will of course be understood that machines of relatively lower rotating speed will require no special balancing devices other than such as are hereinafter explained.

It should be understood that the balancing methods explained and covered in this other application form no part of this invention, nor are they considered necessary, or desirable, to the use of this invention in machines of relatively low rotative speeds. Reference is therefore made to them here merely by way of convenience, and in connection with machines of relatively high speed, that is, of perhaps 800 R. P. M., or higher.

For purposes of explanation then, it will be assumed that in the compressor of Figures 10, 11, and 12, a single polar type wheel 48 inches in diameter is employed. This wheel will be assumed to rotate 60 R. P. M., while the containing vessel, which is about five feet in diameter, will be assumed to rotate 1,000 R. P. M. Ammonia gas will be assumed to be taken in at 30 pounds to the square inch, absolute, and is turned into the receivers at 180 pounds absolute.

The air space is assumed to be 16.5 inches in diameter, while the effective depth of the liquid ring is approximately 11 inches. 24 compressing tubes are employed, each of which has a radial depth of about two inches. The tubes have an inclination of one inch and are of approximately zero bias. Oil is employed as the liquid of the compressing element, and this oil is assumed to have a specific gravity of 1.00. If oil of lower density is employed, either an increased depth of the liquid ring, or an increase of rotary speed would be necessary to produce the required pressures.

Referring to Fig. 10, 302 is a containing vessel which turns on journals 308 and 309 in the fixed frame 301.

The side walls of the vessel 302 support an axle 307 which is shown in longitudinal section in Fig. 10, and in full view in Fig. 12. The middle portion of the axle 307 is enlarged to form a bearing for the polar wheel 303, and annular recesses 310—310 are cored out in the ends of the enlarged portion to form receivers for the compressed gas.

Longitudinal passages 326 and 333 are cored out in the axle 307 to serve as intake and discharge passages for the gas. While the machine is standing still these passages are held closed by the centrifugally operated valves 327 and 332 which are held shut by light springs $327_o$ and $332_o$. When the vessel 302 is placed in rotation, however, the centrifugal force of the valve stems overcomes the tension of the springs and thus a clear passage into and out of the machine is thereby provided. These centrifugal valves serve no other purpose than to prevent the escape of the compressing medium into the gas passages while the machine is standing still.

The polar type bucket wheel 303 turns freely on the enlarged portion of the axle 307. The interior of the spheroidal shell of this wheel is employed also as a float chamber, thereby providing for the balancing of this machine in the manner heretofore explained. The construction of this wheel will be understood from a description of the methods which I propose to employ in its manufacture.

The first step is to provide two hemispherical steel cups, $a_o$—$a_{oo}$, Fig. 10. Sleeves $b_o$—$b_{oo}$ which are to serve as bearings for the wheel 303 are then welded into the hemispherical cups. Discs of sheet steel, $c_o$—$c_{oo}$, are next welded onto the rims of the cups, and onto the inner ends of the sleeves $b_o$—$b_{oo}$, thus forming two hemispherical steel floats, the interior of which may be filled with compressed air to maintain the rigidity of the float.

The two steel floats are next welded together at $z_o$, thus forming an approximately spherical steel float, which, however, is more or less oblate for reasons previously explained.

This float is the spheroidal shell on the surface of which the compressing tubes are to be arranged. For this purpose, curved pieces of sheet steel are next welded onto the spheroidal shell 351, to form the meridian ribs, an edge of one of these ribs being indicated by the full line 352. Then, to complete the tube section, the cover 353 is welded onto the outside of the 24 meridian ribs.

It will be understood that the purpose of the cover 353 is merely to prevent the escape of the entrapped gas over the tops of the meridian ribs. The extent of cover necessary to prevent such escape can only be calculated from the characteristics of the individual wheel.

Thus, in Fig. 10, the air space is assumed to be 16.5 inches in diameter, and, in view of the compression ratio, the cover as shown is probably adequate. If, however, the diameter of the air space should be increased, or if the speed of the containing vessel should be reduced, then the extent of the cover would probably have to be increased.

Welded onto the cover 353 are the two ring gears 317—317 which mesh with gears 312—312 carried on the countershaft 311 which is journaled in the sidewalls of the chamber $302_o$, this chamber being merely a downward extension of the vessel 302.

The countershaft 311 carries also the bevel gear 306 which meshes with the stationary pinion 305 which is carried on the stationary pedestal 313 which projects up into the chamber $302_o$ through the packed joint 316, Fig. 11.

The side walls of the chamber $302_o$ support the cross-bar 340 which extends across the chamber $302_o$ in a direction at right angles to that of the axle 311. As shown in Fig. 10, the cross-bar 340 supports the discharge tube 336 which projects downwardly through a packed joint 337 into the discharge chamber 338 which is cored out in the base of the pedestal 313, and which is in communication with the reservoir or condenser through the passage 339.

Cross-bar 340 supports also the petticoat pipe 341 which extends only part way down into the pedestal 313. The lower end of petticoat 341 is flared out and is inserted into the annular cap 342 which serves, as will presently be explained, to prevent the escape of the oil from the vessel 302 while the machine is standing still. The annular passage between petticoat 341 and the discharge tube 336 serves as the intake passage for the gas.

The gas passages through this compressor are somewhat intricate owing to the fact that it is intended for the compression of ammonia gas. It is consequently so arranged that, if the high pressure ammonia line should leak, this leak could take place only into the suction side of the machine. The suction side cannot leak for the reason that it is oil sealed.

When the machine is standing still, only oil would have access to the packed joint 316 for the reason that any ammonia in the container would promptly rise into the upper portion of the vessel 302. While the machine is running, access of ammonia to the packed joint 316 is prevented by the flange 361 which is carried on the pedestal 313.

It will be seen, Figures 10 and 11, that the stationary flange 361 projects slightly on all sides into the liquid of the compressing element, the free surface of which is indicated at $F_o$—$F_o$ in both figures. It is thus impossible for any ammonia to reach the packed joint 316 while the machine is running.

Taking up the operation of this machine, it will be considered first in its stationary condition, in which case the centrifugal valves 327 and 332 will both be closed. Any oil within the intake or discharge passages, 326 or 333, will have consequently been drained away to the chambers 338 and 320 in the base of the pedestal 313, and from thence to two separate oil reservoirs, not shown.

It will be observed that the petticoat pipe 341 forms, together with the cup 342, an air trap which prevents the oil of the compressing element from escaping downward into the intake passage 322. Of course some oil may escape in this manner, but the escape will cease as soon as the pressure within the air space of the containing vessel 302 has dropped to a pound or so below that which exists within the inlet pipe. This difference in pressure will be due to the hydrostatic head of the oil above the petticoat opening.

Suppose now that the containing vessel 302 is caused to rotate through power applied to the vessel, either by a belt applied to the surface of the chamber $302_o$, or on a belt wheel attached to that surface.

Being journaled on the axle 307, the wheel 303 of course turns bodily with the vessel 302 and its contained liquid. In addition, the wheel 303 is caused to turn slowly on the axle 307 because of the ring gears 317—317 meshing with the countershaft gears 312—312, which are in turn driven by the planetary bevel gear 306. The bevel gear 306 rotates, because, being journaled in the chamber $302_o$, it must revolve planetary wise around the stationary pinion 305 with which it meshes. This arrangement is of course merely a variation of the planetary gear as previously described. Its particular purpose is to avoid the employment of bevel gears of large diameter. It is also more symmetrical than the simple gear.

With increasing speed, the oil runs away from the central air passages of the wheel 303 and the axle 307, and the central air space is thus formed as shown, lines $F_o$—$F_{oo}$, Figures 10 and 11. Then at some predetermined speed, the centrifugal valves 327 and 332 open against the tension of their springs.

It will be apparent that any oil that may exist within the passages 326 or 333, or the pipes leading thereto, will seek the outermost parts of those passages which would naturally be the ends of the axle passages 326 and 333. If the amount of oil thus trapped should be sufficient to cover inlet and outlet pipes 325 and 334, it is evident that the oil pocket so formed would interfere with the proper operation of the compressor.

For this reason careful attention must be given to the proper drainage of these passages when the machine is standing still. Furthermore, a centrifugally operated oil trap may be provided for the release of the entrapped oil, or, instead, the pockets for the entrapped oil may be greatly increased in size. Suitable oil traps will later be explained in connection with Figures 13G and 13H.

With the passages open as described, the ammonia to be compressed has free access to the central air space by way of pipe $322°$, and annular passage 320, in the base of the pedestal 313. Then by dotted passages 321 to the chamber 322, through the opening between the petticoat 341 and discharge tube 336 to the cross bar passage 324, Fig. 11, thence through sidewall passage 325 which reappears as the outlet 325 in the axial passage 326, past the centrifugal valve 327 to the outlet chamber 329, and so directly into the central air space of the compressor.

It will be observed that the terms air space and air ducts are used regardless of the nature of the gas to be compressed.

Referring to Fig. 10 for a further brief review of the compressing action of the wheel, the tubes $h_o$—$h_{oo}$ are shown lying directly across the central air space, and gas has thus been drawn into the compressing tubes through the air ducts $t_o$—$t_{oo}$.

Referring to Fig. 11, it will be seen that the air ducts, $t_o$—$t_{oo}$, of tubes $h_o$ and $h_{oo}$, are extended out in advance of the tubes, and that the forward ends of these ducts are just re-entering the vertical wall of water $F_o$—$F_{oo}$. The air within the tubes is thus trapped in the manner heretofore explained.

It will be apparent that the bucket wheel 303 of Fig. 11 rotates in a counter-clockwise direction. As the compressing tubes pass through the positions of the tubes $h_o$, $i_o$, $j_o$, $k_o$, etc., the air within them is compressed by the incrowding water, as indicated by the decreasing volume of the gas within these tubes.

As a matter of fact, the gas is not only being compressed but it is also extending lengthwise of the tubes as has previously been explained. The gas thus rapidly disappears from the equatorial section of the tubes as here shown.

As the wheel turns through 90 degrees around the axle 307, the tubes $h_o$ and $h_{oo}$ approach the horizontal diameter, line $A_o$—$A_o$ of Fig. 11.

The former tubes $h_o$ and $h_{oo}$ will now occupy the positions of the tubes $n_o$ and $n_{oo}$ of Figures 11 and 12. Referring to Fig. 12, it will be seen that the inner surface of the tubes $n_o$ and $n_{oo}$ are now of greater curvature than the free surfaces of the liquid within those tubes. The air within those tubes thus runs lengthwise of the tubes and then drops into the receivers 310—310 which are cored out in the ends of the enlarged central portion of the axle 307, Fig. 10.

From the receivers 310—310, Fig. 10, an equalizing passage 330 leads into a central chamber 331. The compressed gas then passes through the centrifugal valve 332, axial passage 333, sidewall passage 334, cross-bar passage 335, (Fig. 11), discharge tube 336, Fig. 10, to the chamber 338 from which the passage 339 carries the compressed gas away to the condenser.

The lubrication of this machine is provided for owing to the fact that oil is used as the compressing medium. This oil may be cooled in any convenient way, a suitable arrangement being indicated in Fig. 12, in which a spiral of pipes 364—364 is arranged on the inner surface of the walls of the containing vessel 302. Cooling water is circulated through these pipes by pouring it into the chamber 362 which is hollowed out in the upper journal 308. The sides of the chamber 362 are tapered to prevent the upward escape of the water.

The cooling water passes out of the chamber 362 through the passage 363. It then circulates through the spiral of pipes 364 and is finally discharged out of the outlet 365.

Some means should be provided to maintain the oil level at the desired point in this compressor. Many arrangements might be used, one of which is shown in tentative form in connection with Fig. 10.

371 is a passage which is in free communication with the oil of the compressing element. 371 connects by sidewall passage 372 with the pipe 373 which projects upward through the chamber 362, and there makes connection, through a packed joint or otherwise, with the oil reservoir connection 374.

This curved passage 372 is one leg of an inverted siphon, the other leg of which is provided by the interior of the container 302. The two legs will be in equilibrium only when the sum of the gas pressure within the central air space, plus the radial outward pressure of the compressing element, is equal to the radial outward pressure of the column of liquid in the passage 372, plus any hydrostatic pressure which may exist within the pipes 373 and 374. It follows then that the diameter of the air space in this machine, and consequently its output, can be varied at will, within certain limits, merely by varying the pressure of the oil within the passage 374.

Assume that a pressure of 35 pounds absolute exists on the suction side of this compressor, and also within the central air space of the container 302. Assume also that the passages 373 and 374 are filled with oil which is likewise under the same pressure of 35 pounds per square inch.

In such case it is evident that the oil will flow into the vessel 302 through the oil pipes 372 until the vessel 302 is filled with oil, the central air space has ceased to exist, and the compressor is turning without compressing any gas.

Again suppose that the same pressure of 35 pounds per square inch still exists within the air space, while in the oil reservoir and its connecting pipe 374, the pressure has been reduced practically to zero. In such case, the inner surface of the compressing element will move outward until the combined pressure of the gas, and of the liquid of the compressing element, is equal to the radial outward pressure of the column of liquid in the passage 372.

Under the stated conditions, that is, at a rotary speed of 1,000 R. P. M., and with an oil having a specific gravity of 1.00, equilibrium would be reached when the air space has a diameter of 16.5 inches. This, it will be remembered, was the calculated diameter of the air space to be employed in this compressor.

It will be seen, Fig. 11, that I have represented the air ducts in merely diagrammatic form that is by dotted lines. Taking the air duct, $t_o$, of the tube $h_o$, for instance, it will be evident that its sole requisites are that the inner end should be situated in the upper and forward part of the tube, as is indicated at $s_{oo}$. The forward end of the tube should be at $s_o$ as shown.

The preferred form of air duct, since it requires more or less "biasing" of the compressing tubes, does not lend itself readily to clear representation. The other form of duct is therefore shown throughout this specification. The preferred form of duct is shown in diagrammatic form in Fig. 13 in which we are assumed to be looking down on a cross section of the central air space. Here it may be seen that the middle portion of the meridian ribs $352_n$ are bent forward to form the obtuse angle $v_n$. The air duct in this case is merely a hole bored down through the spheriodal shell in the forward angle of the $v_n$.

Referring to Fig. 13, it may be seen that the tube $g_n$ has re-entered the air space, and air is being drawn in through the air duct $t_n$ as usual. It will also be seen that the air duct $t_n$ of tube $h_n$ is just reentering the wall of water on the further side, as indicated by circle $F_o$. The air within the tube is consequently trapped. It will further be seen that at this point the tube $h_n$ contains the maximum amount of air, this being the primary object of air duct design.

Tube $i_n$ shows the condition of the entrapped air as the tube passes on into the liquid. Its air duct $t_n$ is safely beyond the free surface of the liquid within that tube, line $f_n$, and so any escape of the air back through the duct is impossible.

This condition does not necessarily hold true, however, as the tube nears the horizontal diameter, and so it will usually be found advisable to raise the tube end of the air duct slightly above the surface of the spheroidal shell. The extent to which the inner end must be raised above the floor of the tube can only be determined from a study of the individual case.

The restricted air space.

For reasons of future reference, it should be noted that this machine employs what I term a restricted and enclosed air space.

Referring to Fig. 10, it will be seen that the major portion of what would otherwise be the cylindrical air space between the lines $F_o$—$F_{oo}$, is blocked out by walls of the float chambers of the wheel 303. This leaves the air space but a thin segment of the cylindrical space it would otherwise occupy. The remaining free surface of the liquid of course occupies precisely the same position as though the float chambers were absent.

Another way of considering this point is instructive. It will be seen that the space between the discs $c_o$—$c_{oo}$ is a narrow circular chamber which is in free communication with the liquid of the compressing element through the air ducts, $t_o$—$t_{oo}$, etc., and then through the open ends of the compressing tubes.

With a given diameter of air space, the total amount of liquid within the circular chamber 349 remains always the same. This liquid is divided into two thin bodies which take the form of oppositely disposed sectors of a circular disc, the middle portion of the disc being occupied by the central air space.

Referring now to Fig. 11, it will be seen that, as the wheel turns, the two thin bodies of liquid flow around within the chamber 349, thus maintaining always their proper position relative to the vertical axis, the line $X_o$—$X_o$. The air ducts $t_o$, $t_{oo}$, etc., of course pass through these thin bodies of liquid in such fashion as to trap the air in the usual manner.

The steam driven motor-compressor of Figures 14 to 18.

It has previously been explained that the entire work of compression in the centrostatic compressor must be done in overcoming the buoyancy of the gas in the liquid, and, further, that the operation may be reversed, and the gas be made to do work by allowing it to exert its buoyant force on a proper mechanism.

In the present machine, two concentric bucket wheels are combined into one integral wheel structure. The outer one is employed as a motor wheel and the power generated on it, through the expansion of the steam, is continuously absorbed by the inner wheel in the compression of the air. In other words, the centrostatic buoyancy of the steam overcomes the opposing buoyancy of the compressed air. We are thus, in effect, trading a given volume of steam for a lesser volume of compressed air.

Referring to Fig. 16 for an introductory view of this motor compressor, it is seen that 2 is the container which turns in journals 8 and 9 in the fixed frame 1. 3 and 4 are concentric bucket wheels which are here shown largely in equatorial section, this section corresponding exactly with that of Fig. 11 previously described. The polar edge of the inner wheel is shown at 54, while the axle 7 and the receiver 10 are shown in cross section.

Of the two wheels, 3, the inner one, is the compressor wheel. It is separated from the motor wheel 4 by the air space 50 which serves as heat insulation between the two wheels.

The action of the compressor wheel 3 will be self evident as it is merely the duplicate of the wheel 3 of Fig. 11. Here however it will be observed that only 12 tubes are employed instead of 24 as in the preceding case.

It will be seen that the tube $h$ entraps air in the central air space. As the tube passes through $i$ and $m$ and approaches the position of tube $n$ on the horizontal diameter, line A—A, the air entrapped within the tube $n$ flows over the spheroidal surface 51, drops over the polar edge 54, and is trapped in the receiver 10 in the manner previously explained.

The motor wheel 4 of course rotates in the same counter clockwise direction as the wheel 3, for the two are rigidly connected together to form a single wheel structure. Heat insulation, of which the air space 50 is a portion, is of course provided between the two wheels.

*Action of the motor wheel.*

The lower journal 9 is hollow and into it projects the stationary pedestal 16 in which is cored out the annular passage 32, Fig. 14. Steam from the boiler passes through pipe 31° (Fig. 14) into the passage 31 in the base of pedestal 16. This steam passes through annular passage 32, Fig. 15, to the annular recess 33 in the base of the vessel 2. From there it passes through centrifugal valves 34 to the pipes 35 which discharge it onto the steam wheel 4. The centrifugal valves are merely for the purpose of preventing the escape of the centrostatic medium while the machine is standing still.

The steam from the discharge pipes 35 is turned into the buckets 91—91° of the wheel 4, that is, approximately on the line A—A. The point at which the discharge pipes 35—35° will discharge steam into the buckets is a matter that will depend considerably on the speed of rotation of the bucket wheel. As these tubes pass successively through the positions of tubes 92—93—96 and 92°—93°—96°, the gas within the motor tubes expands and does work on the wheel 4. As the motor tubes cross the central air space, the steam within them is exhausted in the following manner.

Referring to Figures 19 and 20, $e$, $d$, $c$, $b$, $a$, represent successive positions of a motor tube as it approaches and passes through the central air space, the action being merely the reverse of that of the air ducts of the compressor tubes as previously described.

Referring to Fig. 20, $e$ is a motor tube which is approaching the central air space and which contains a volume of steam or other motive fluid. At $d$, Fig. 19, the middle portion of the tube has entered the central air space and the gas within the tube has expanded nearly to the possible maximum.

At $c$, Fig. 20, the position of maximum expansion has been reached. At this point, the exhaust duct is so arranged that it is just entering the central air space at $f$, and it thereby permits of the escape of the steam into the air space.

At $b$, Fig. 19, the tube is nearing the opposite side of the air space and liquid is crowding into the tube while the steam is passing out through the exhaust duct.

At $a$, Fig. 20, the expulsion of the exhaust steam is practically complete and soon the tube will be entirely filled with water. This condition will then continue until the tube reaches the horizontal diameter where steam will then again be injected into it.

Tracing now the complete cycle of the motor tubes of wheel 4, Fig. 16, it will be seen that steam is being turned into the tube 91 by the discharge pipe 35 near the horizontal diameter, line A—A. As the tube passes through the positions of the tubes 92—96, the gas expands and does work on the wheel 4. At 97 the gas is being exhausted into the lower air space. The steam thus discharged into the lower exhaust space passes downward through passage 81 to a centrifugally operated check valve 82 which serves merely to prevent escape of the oil while the machine is standing still. With the machine in rotation, this valve opens and the exhaust steam then passes through valve 82, thence downward into annular passage 83 in the lower pedestal bearing 84. From annular passage 84 the exhaust escapes to atmosphere or condenser by way of pipe 85 or other convenient outlet.

At 98 the tube is practically filled with water and this condition continues until the tube reaches the position of the tube 91° near the horizontal diameter, line A—A.

At 91°, steam from the pipe 35° is then turned into the tube. Expanding from 92° to 96° this steam is then exhausted at 97°. From 98° to 91 the tube is filled with water and this completes the cycle of the motor tubes. Steam exhausted from the upper portion of the wheel passes to the exhaust by way of sidewall passage 86 and centrifugal valve 82.

It is thus seen that the motor tubes take in, expand, and then exhaust, a bucketful of motive fluid twice during each revolution of the wheel.

Referring to Fig. 14, it will be seen that the axle 7 is supported by the side walls of the vessel 2, and carries on its middle portion the receiver 10 which is a simple cylindrical vessel with conical ends. Both the receiver 10 and the axle 8 may be seen partly in full view in Fig. 15. The receiver 10 is supported by ribs 10° from the axle 7.

The function of the axle 7 is merely to provide an inlet and outlet path for the air to and from the compressor wheel 3. The bearings for the bucket wheel are provided by the annular flanges 18 which extend inwardly from the side walls of the vessel 2.

The construction of the double wheel will be understood from the following description of the methods which I propose to employ in its manufacture. It should be understood, however, that these methods are merely tentative. The preferred form of construction has already been shown in connection with Fig. 11.

Referring to Fig. 14, it will be seen that the bucket wheel 3 consists of a die cast member which comprises the following parts: (1) the spheroidal shell 51; (2) the 12 meridian ribs 52 which are here indicated by the dotted lines, and, (3) the cover 53 which, for ease of casting, is here made truly cylindrical instead of being more or less spherical as in the machines heretofore illustrated.

An end view of this bucketwheel is shown in Fig. 18 in which 51 is the spheroidal shell, 52—52 are the meridian ribs, 54 is the polar edge, and 53 is the cylindrical cover.

Referring now to Fig. 14, 55 is a steel ring which is shrunk onto the outside of the cylindrical cover 53. This ring serves to add strength to the die cast wheel 3. It serves also to clamp into place the slightly beveled edges of the inner walls 56 of the end caps in which the float chambers 49 are cored out.

Annular ribs 55° are formed on the outside of the steel ring 55. These ribs, together with the outer walls 57 of the end caps, serve as supporting surfaces for the steel ring 59 in which the motor tubes are cored out. The ring 59 is supposed to be made of steel, built up or pressed, and is to be shrunk into place on the outside of the ring 55, and the edges 57 of the end caps. The entire wheel is thus locked rigidly together with a minimum of metallic heat conductivity between the motor and the compressor sections.

The float chambers 49 and the air space 50 serve as heat insulation between the two sections of the wheel. This heat insulation may of course be made as extensive as conditions may warrant. That here shown is merely by way of illustration.

This machine employs two independent centrostats. The exterior centrostat is composed of heated oil and is contained in the vessel 2. It of course governs the expansion of the gas in the motor wheel 4. The heated oil serves also for the lubrication of the various gears.

The interior centrostat is employed as the compressing element of the wheel 3. This compressing element is composed of water or chemical solution. It is kept cool by reason of a stream of cold water or solution that is constantly poured into the pipe 61 which reappears as pipe 62 below the planetary pinion 5 of Fig. 14. As indicated by the arrows line, this pipe then passes out of this section to reappear as the axle passage 63 which discharges into the interior of the bucket wheel at 64. It will be observed that this is an example of an inverted siphon.

The warmed liquid of the compressing element moves toward the center of rotation and the excess flows away through the outlet passage 65. This outlet passage leaves this section at 66 and then reappears as the pipe 67, of Fig. 17, which discharges into the governor case 68 through a branched pipe as shown. The normal outlet from the governor case 68 is through the outlet 71 and then through the centrifugal valve 72 which is held shut by the spring 72°. It thus results that, when the machine is standing still, or at low speeds, the outlet passage is closed by the centrifugal valve 72, and thus the entire interior portion of the bucket wheel may be practically filled with water. The central air space in the compressing element would thus disappear and the bucket wheel 3 could turn without compressing any air.

The oil of the exterior centrostat and the liquid of the compressing element are kept separate by packing rings 42—42, Fig. 14, on the flanges 41 which project into the bearing sleeves 18—18. The separation of the two elements is further secured by the mercury cups 43—43 as will presently be explained.

The further details of this machine will be understood from the following description of its general operation.

Referring to Fig. 2, the first problem is to cause a rapid rotation of the containing vessel 2. Without such preliminary rotation the motor wheels are of course incapable of any useful effect. For this reason it is necessary that some means should be provided for causing this preliminary rotation.

Where other power is available, nothing more will be required than the application of a suitable belt wheel. For isolated units however, and aside from purely obvious solutions, I contemplate some such arrangement as is indicated in Fig. 14.

Here 19 is a downwardly projecting flange from the vessel 2. This flange carries an impeller wheel, 19°, which rotates in the turbine case 20. This turbine may be operated either by live or exhaust steam. If the latter, it may be kept in continuous operation to assist in the compression of the air by the operation of the compressor wheel 3.

Prior to starting the machine, the oil of the exterior centrostat is to be heated by blowing steam through it or otherwise. The interior of the bucket wheel is likewise to be filled with water in the manner previously explained. The bucket wheel 3 can thus turn freely without compressing any air. The band clutch 15 is also to be released and thereby the vessel 2 is enabled to turn freely under no greater power than that required to overcome the friction in the bearings, etc.

The impeller 19° is now operated, thus setting the vessel 2 into rapid rotation though not necessarily bringing it up to its normal operating speed.

Steam is then turned into the buckets of the motor wheel 4 through the pipes 35—35°, Figs. 15 and 16, in the manner previously explained. The steam thus discharged into the motor tubes may not cause the rotation of the bucket wheel as this would depend on several factors presently to be explained.

In any case, however, the rotation of the bucket wheel may be started by applying the band clutch 15, thus holding stationary the clutch wheel 14 which carries the planetary pinion 5, Fig. 14.

Being journaled on the countershaft 11 in the chamber 2°, Fig. 14, the bevel gear 6 must revolve bodily with the containing vessel 2 around the vertical axis X—X. Since the planetary gear 6 meshes with the stationary pinion 5, the gear 6 is thus given a movement of rotation on its own axis. It thus drives the gears 12—12 through the countershaft 11. The gears 12 mesh with the ring gears 17 on the wheel 3—4, and thus the wheel 3—4 is caused to rotate slowly on its bearings on the sleeves 18.

As soon as the wheel is caused to rotate, the motor tubes fill properly with steam, and the operation of the impeller 19 may then be discontinued. The motor wheel 4 will then continue to drive the vessel 2 through the planetary gear train in a manner the reverse of that which has just been described.

Since the motor wheel possesses great power, and its only work, for the present, is to overcome the friction losses of the machine, it soon brings the containing vessel 2 to its proper speed.

Meanwhile, the centrifugal valve 72, Fig. 17, has opened. The excess of water within the bucketwheel flows away through outlets 65 and 66, Fig. 14, to the pipe 67, Fig. 17, which discharges it into the governor case 68, and from which it flows away through outlet 71, by a passage not shown, to the chamber 71° from which it passes through centrifugal valve 72 to a final discharge passage, not shown.

The excess of water having flowed away through outlet 65, the central air space, within the bucket wheel 3, is reformed within the lines F—F as shown. Then, since the wheel 3 is being rotated by the motor wheel 4, the wheel 3 traps air in the central air space, carries it out into the rotating body of liquid, and then turns it into the receivers 10—10 in the manner previously explained.

This compressed air bubbles in through the ring of liquid at the mouth of the receiver 10, and then passes through the centrifugal valve 26 into axle passage 27 from which it passes through dotted side wall passage 28 to the delivery tube 29 which projects down into a central wall in the pedestal 16. The compressed air is thus discharged into the outlet 30 which is in direct communication with the reservoir through pipe 30°.

If the demand for air is less than the output of the compressor, the pressure accumulates in the main reservoir and thus the excess would soon begin to overflow the edges of the receiver 10—10. This overflow is prevented in the following manner.

*Action of the governor.*

In the operation of this machine, a constant stream of cold water is poured into the pipe 62 and is thus introduced into the compressing chamber, that is, the interior of the bucket wheel. The excess flowing away through the outlet 65 maintains the diameter of the air space at a point corresponding to the maximum capacity of the compressor. The excess flowing into governor case 68, Fig. 17, maintains there a normal liquid level which is controlled ordinarily by the position of the outlet 71.

Referring to Fig. 17, it will be seen that in each end of the governor case 68, a pocket 74 is formed, these pockets being connected with receiver 10—10 through gas passages 73—73°. The free surface of the liquid within these pockets is thus maintained at the same point as is the free surface of the liquid in the receiver 10—10 below.

The position of the governor case relative to the receiver 10 is indicated by the dotted receiver 10. The normal level of the air entrapped within the receiver is indicated by the dotted circle 79. It will be seen that this circle defines also the free surface of the liquid within the pockets 74. The pockets 74 are thus dummy duplicates of the receiver 10—10, the reason for their inclusion being that it is not convenient, in this case, to apply the governing mechanism directly to the receiver 10—10 itself.

A tubular arm 77 is mounted on a pivot 76 which is eccentric to the axis of rotation of the containing vessel. One end of arm 77 bends around the side of the cup 73, and carries on its inwardly projecting end, a float 78. The other end of arm 77 carries a sleeve which can slide over and close the outlet 69 of the curved branch of the pipe 67.

Suppose now that the demand for compressed air ceases, and thus the pressure accumulates in the main reservoir and in the receiver 10. The circle 79, Fig. 17, will expand or move outward, and the air within the receiver 10 will thus tend to overflow the edges of that receiver.

At the same time, however, the free surface of the liquid within the pocket 74 has retreated outward correspondingly to the increase of pressure, and thus a larger portion of the float 78 is uncovered.

The weight of the arm is so adjusted that it is in equilibrium only when the float projects a certain distance into the air space within the pocket 74. Owing to the recession of the liquid level, the arm 77 is now out of equilibrium, and this equilibrium can be regained only if the arm moves in a clockwise direction, until the float again reaches its normal degree of submergence. Since the degree of eccentricity is very slight, the arm will make a very large angular movement for only a small outward movement of the liquid surface within the cup 74.

In making this angular movement, the sleeve 80 closed the outlet 69 from the curved branch of the pipe 67, and thus the water within the pipe 67 can escape into the governor case only through the outlet 70, which, as will be seen, is very close to the central axis.

The constant stream of water which is pouring into the compressing chamber through the pipe 62 (Fig. 14), can now escape only through the straight branch of pipe 67, the outlet 70, and thus the incoming water fills up the central air space as before. The wheel 3 now operates in dead water and can no longer trap air in a central air space which has practically ceased to exist.

This action however is not so simple as it may appear. As the liquid fills up the central air space within the wheel 3, it of course increases the depth of liquid which presses in on the air that is entrapped within the receiver 10. This action does not affect the free surface of the liquid within the pockets 74, for the free surface of the liquid within the governor case 68 is determined by the position of the outlet 71.

It thus results that, with increase of reservoir pressure, the free surface of the liquid within the pocket 74 moves out to a point corresponding exactly to the increase in pressure, and there remains, thus maintaining the closure of the outlet 69.

Closing this outlet fills up the central air space in the bucket wheel 3 and thus increases the depth of liquid which presses in on the air within the receiver 10. The air within the receiver 10 is thus pressed far back from the point of overflow and the chance of an intermittent overflow with slight variation in the rate of speed is thereby removed.

If a demand is then made for compressed air, thereby lowering the pressure within the reservoir, the free surface of the liquid within the pocket 74 moves inward, the arm 77 moves again counter clockwise, and the outlet 69 is thus more or less uncovered.

If the outlet 69 is only partly uncovered, the free surface of the liquid within the compressing chamber will occupy some intermediate point between the lines F—F, Fig. 14, and the vertical axis. The governor can thus accurately adjust the output to the demand simply by varying the diameter of the air space within the compressing chamber.

It will be understood that the governor cuts the compressor entirely out of action when the pressure in the reservoir reaches a predetermined figure. This cutting out of the load would cause racing of the motor wheel 4, and consequently of the containing vessel 2, were it not that, with increase of speed, the internal static pressure of the exterior centrostat increases with great rapidity.

A speed is soon reached at which the pressure existing at the outlet of the discharge pipes 35—35° is greater than the pressure of the incoming steam, and so further discharge of the steam on the wheel is prevented. Equilibrium will be reached when the escape of the steam from the discharge pipes 35—35° is just sufficient to maintain the proper speed of the containing vessel.

The machine is thus accurately self governed at a speed which depends largely on the pressure of the motive fluid supplied for its operation.

A second factor which determines the ultimate speed is the depth of oil which presses in on the outlet of the discharge pipes 35—35°, Fig. 16.

The oil level of the exterior centrostat is thus of some importance. I propose to govern this oil level in the same fashion as that of the water level of the interior compressing element, that is, oil is to be poured into the annular opening between the sleeve 13 and the water pipe 61. The excess of oil thus poured in flows away through the outlet 89 in the upper portion of the chamber 2°, Fig. 16, and thus maintains the oil level of the exterior centrostat at the desired point.

*Details of construction of the motor compressor.*

It is evident that steam may be discharged into the motor tubes in innumerable ways. The particular method adopted here is that shown in Fig. 15, in which it may be seen that 58 is the cover of the motor tubes, 59 is what serves here as the spheroidal shell, 60—60 are the meridian ribs, 60°—60° are low extensions of the meridian ribs, and 59°—59° are annular ribs which serve to limit the straying of the motive fluid when it is discharged onto the wheel 4.

It will be seen that the motor tubes are simply short straight sections of tubing parallel to the axis of the wheel. Being in a curved body of liquid, however, these tubes are, in effect, given an inclination the opposite of that of the compressor tubes, that is, any gas that is turned into them on the horizontal diameter, will seek the center of the tube, instead of flowing both ways from the center as in the compressor tubes.

For this reason, as the gas is discharged from the discharge pipes 35—35°, and as that gas moves toward the center of rotation, it drops onto the extension of the shell 59. Annular flanges 59° prevent any outward straying of the gas, and the low lying ribs 60° prevent any circumferential movement of the gas around the wheel. Then, because of the inclination of the straight tubes, the gas flows inwardly between the low ribs 60° to the center of the tubes. The free surface of the entrapped motive fluid is then shown at $f°$, Fig. 15.

Referring to Fig. 16, it will be noted that the discharge pipes 35—35° are given an outward inclination, this being for the purpose of permitting of the ready outward retreat of the water that is within those pipes when the steam is turned into them.

The method of packing adopted in this machine is what is known as labyrinth packing as used in steam turbines, formulas for the calculation of which are available in various books of reference. This form of packing is of course represented here in merely diagrammatic form.

This packing consists simply of alternate grooves and flanges 46 and 47, thus constituting a labyrinth which reduces the leakage loss to a very low value. There is however a chance for leakage between the compressed air and the steam, the direction of which will depend on the relative pressures of the two gases.

Leakage of steam into the compressed air could not ordinarily be permitted. If necessary such leakage may be prevented by dividing the intervening labyrinth into two sections with an exhaust duct leading out from between the two sections. If the pressure within the exhaust duct is then kept but a few pounds below the pressures of the compressed air, the leakage of the compressed air will then be practically eliminated.

This machine is balanced in the manner previously explained. The bucket wheel is made as light as possible and has its buoyancy further increased by the addition of the floats 49, Fig. 14, which are formed in the wheel structure.

For balancing purposes, a bucket wheel should be free to move in two directions, that is, longitudinally along the axle 7, and, laterally, in a horizontal plane at right angles to the axle 7. Any motion in a vertical plane is of course unnecessary.

In this machine the bucket wheel is assumed to float, that is, to be lighter than the liquid it displaces. As will presently be seen, however, this statement requires considerable modification owing to the nature of the laws of centrostatic buoyancy.

Assuming the bucket wheel then to float in the liquid, it is permitted to find its own position of equilibrium in a direction at right angles to axle 7, by moving within the limits of lost motion on the bearing sleeves 18.

The bucket wheel can balance itself longitudinally by sliding lengthwise along the axle 7. This longitudinal balance is further assisted by the mercury cups 43—43.

Referring to Fig. 14, 43—43 are oppositely disposed cups which serve as mercury reservoirs in the bottom of the containing vessel 2. These pockets may extend entirely around the internal circumference of the vessel 2, or, instead, they may be connected by equilibrating pipes 45—45 which serve to maintain equilibrium between the two otherwise separated bodies of liquid.

The pockets 43—43 are connected by sidewall passages 44—44 with cups 40—40 which are formed between the sleeves 18 and the axle 7. Into these cups projects the float sleeves 41—41 which may or may not form a portion of the bearing for the wheel 3—4.

When the machine is standing still, the mercury accumulates under the action of gravity in the pockets 43—43. As soon however as the machine is placed in motion, the mercury rises through the sidewall passages 44—44 and fills the pockets 40 to a point past the ends of the sleeves 41. The ends of sleeves 41 thus dip into mercury pools and each of them is thus pressed toward center. The opposing buoyancies are in equilibrium only when the bucket wheel is in the exact center of the containing vessel. Dotted lines 87—87 indicate the level of the mercury while the machine is running.

The weight of wheel which a given mercury cup is capable of counterbalancing longitudinally is given by the formula: $W = 0.98\ Ar$ in which W is the weight of the wheel in pounds which a given mercury cup can balance when the end of the sleeve which dips into the mercury has a cross-sectional area of A square inches, and $r_1$ is the normal distance in inches of the end surface of the sleeve from the axis of rotation. This formula neglects the longitudinal balancing effect of any liquid other than that of the mercury cup. The formula also assumes that the opposing sleeve is still immersed in the mercury of the opposing cup. A somewhat curious fact is that if the opposing sleeve passes out of the mercury of the opposing cup, the balancing effect drops to approximately 50% of its normal value.

The calculation of the buoyancy of a bucket wheel in the liquid of the centrostat, aside from the action of the mercury cup, is an exceedingly difficult problem which must be solved separately for the individual case. Such calculations afford some surprising results. Thus in the formula just given, it will be noted that the counterbalancing effect of the mercury is independent of the depth of mercury in the cups.

The lubrication of this machine will depend largely on its size and other characteristics. Wherever permissible, oil will naturally be employed as the liquid of the exterior centrostat. In such case the various lubricating problems will be provided for.

On account of balancing however, I prefer to use a heavy chemical solution as the liquid of the exterior centrostat. For this reason it will be noted that the sleeves 18 are arranged to project into a recess in the bucket wheel 3—4. This cup opens outwardly and therefore may be filled with oil of less density than the liquid with which it is surrounded, the oil being thereby trapped in the cup and thus assuring lubrication for the sleeves 18.

The lubrication of the planetary gears is provided for by floating a layer of oil on the inner surface of the chemical solution. This layer of oil, which may have a depth of perhaps two or three inches, would thus form a portion of the exterior centrostat.

*Combination of the bucket wheel with its container.*

In this machine appears a principle which is the basis for the refrigerating machine presently to be described. It should therefore be noted that the bucket wheel 3 of Fig. 14 is combined with its containing vessel. This container is formed by the cover 53 of the tube section, and the inner walls 56 of the end caps. The container thus rotates bodily with its bucket wheel. The motor wheel, 4, on the other hand, is independent of its container as in the machines previously described.

It will be noted that a liberal passage is left over the ends of the dotted meridian ribs, 52, for the interchange of liquid between the various compressing tubes. This space serves, as will presently be explained, as an equalizing passage, and thereby obviates the need of an independent compressing element. The compressing element in this case is thus confined practically to the volumn of liquid that is contained within the compressing tubes themselves.

It is further evident that, with only slight changes in the gas connections, the receivers 10—10 could also be combined with the bucket wheel and its containing vessel. The three of them would thus rotate bodily together, and this is the arrangement of the refrigerating machine presently to be described.

*Design of receivers.*

Only one type of receiver seems to be worthy of attention, and that is, one consisting essentially of what amounts to a simple open-mouthed vessel facing outward and away from the axis of rotation.

The polar edges of these receivers will ordinarily be symmetrical relative to the wheel axis of the compressor. The compressed air within these receivers however is bounded by a free surface which is drawn about the spin axis of the liquid body. This results in making the polar edge, in effect, of uneven "height" at different portions of its circumference. The compressed air may thus be overflowing at one point of the polar edge of the receiver, while at some other point in the receiver, it is still at an appreciable distance from the point of overflow. Obviously then, the point of discharge of the meridian compressing tubes should be at one of these "low" points, instead of being at a "high" point of the polar edge, where of necessity, the wasteful "drop" of the compressed gas into the receivers must be of greater amount.

This will be understood on further reference to Fig. 17, where, in addition to the governor case, the position of the receiver 10 is indicated in dotted lines, and in which the circle 79 defines the normal free surface of the liquid within the dotted receiver 10. It will be seen that, as the circle 79 expands, or moves outward under increase of pressure, the compressed air would begin to overflow the receiver at the point $y$, since this is, in effect, a low point of the polar edge. It will also be understood that the air is discharged into the receiver on the horizontal diameter, that is, the points $z$—$z^0$. It follows then that, to prevent the premature overflow at the point $y$, the mouth of the receiver on both the top and bottom portions might profitably be closed, thus leaving only the two side openings at $z$—$z^0$.

The same object may be achieved in another way, however, and that is by biasing the tubes and leaving the receiver unchanged. Referring again to Fig. 17, it will be seen that the air would have less drop (see preceding explanation) if it were discharged into the receiver at $y$ instead of at $z$—$z^0$.

Where exaggerated air spaces are employed, this drop is a matter of considerable importance. In such case the tubes may be made to discharge into the receiver at $y$ by merely twisting their ends backwards one fourth revolution, that is, by giving them a receding bias of one fourth turn. The tubes will then take a spiral course around the spheroidal shell, somewhat after the fashion of an archimedean screw.

*The preferred form of biased compressing tubes, as shown in Figure 13F.*

Such an arrangement of biased tubes is indicated in Figure 13F, which shows the motor compressor wheel, of Figure 18, with biased tubes, instead of having tubes of zero bias, as shown in Figure 18 itself. Referring then to Figure 13F, it will be seen that the meridian ribs 52 now take a spiral course over the spheroidal shell 51, and so discharge their gas into the reservoir at a point 90° from the point of discharge shown in Figure 18.

Since this wheel is assumed to rotate in a counter clockwise direction, it will be seen that these compressing tubes have been given a receding bias of one-fourth turn. Thus, as explained in the preceding paragraphs, the air is discharged into the receiver 10 at the point $y$, which is a "low" point on the polar edge, instead of the points $z$, $z^o$, as before, which are relatively "high" points in the polar edge.

This biased form of compressing tube is the preferred form of the polar type wheel, but, as has previously been explained, it does not lend itself readily to clear representation. The unbiased form of tube has therefore been shown throughout this specification. From this explanation, however, and the diagrammatic representation of Figure 13F, it is believed that no difficulty will be found in understanding the preferred form of tube.

The wheel of Figure 13F, as stated, is assumed to be rotating in a counter clockwise direction, which makes these tubes of receding bias, as previously explained. If this wheel, however, is rotated in a clockwise direction, then these same tubes would be considered to have an advancing bias of one quarter turn, or 90°. The same tubes of zero bias have, of course, been shown in the original Figure 18.

*Liquid traps of Figures 13G and 13H.*

Referring back to Figure 14, it will be understood that when the machine is in a stationary condition, the escape of compressing liquid into the axial passage 27 is prevented by reason of the seating of the centrifugal valve 26. As the machine is started up, the liquid of the compressing element moves outward into its usual ringlike form with its inner surface between the lines F—F. Then, at some predetermined speed, the centrifugal valve 26 opens and thus permits a free passage of any compressed gas from the receiver 10 to the side outlet passage 28.

If properly designed, very little if any compressing liquid should have escaped into the axial passage 27. To take care of such liquid as may, however, accumulate in these passages, some such arrangement as shown in Figures 13G or 13H may be employed.

Figure 13H illustrates a double seated valve which keeps the passage $27_n$ clear of liquid owing to the fact that it is open at an intermediate speed of the rotating vessel. When the machine is standing still, the valve $26_n$ closes against the inner seat $S_n$ and so prevents any escape of the compressing medium in that condition.

At an intermediate speed as the machine is started up, the valve opens and permits the escape of any liquid that may be in the passage $27_n$. At normal operating speeds the valve $26_n$ closes against the seat $R_n$, and so permits the pressure to build up in the reservoir.

A liquid trap employing a centrifugally operated liquid seal and operating on the principle of an inverted siphon, is shown in Figure 13G. The details of this figure are likewise borrowed from the compressor of Figure 14.

It will be seen that $10_m$ is the receiver; $7_m$ is the axle; $27_m$ is an axle passage which is to be drained of liquid; $28_m$ is the outlet passage for compressed gas, and which passage must be kept clear of compressing liquid; $R_m$ is a priming reservoir; and $P_m$ is a vertical pipe which extends above the normal liquid line when the machine is standing still. Pipe $P_m$ therefore prevents any escape of the compressing medium while the machine is stationary; $P_{mm}$ is a balancing leg which extends inwardly toward the axis of rotation, line $X_m$—$X_m$.

When the machine is placed in operation, any liquid that may be in the passage $27_m$ flows outward through the priming reservoir $R_m$ and the pipes $P_m$ and $P_{mm}$ and is then discharged from the end of the pipe $P_{mm}$ at $Q_m$.

The inner surface of the compressing element is on the line $F_m$—$F_m$, while the inner surface of the liquid within the receiver $10_m$ is indicated by the line $f_m$—$f_m$. It will be understood then that the pressure to which the air in the receiver is subjected is that due to the column of liquid between the lines $F_m$ and $f_m$. This same pressure will balance the equal pressure of the column of liquid between lines $S_m$ and $T_m$ in the pipe $P_{mm}$. It follows then that any stray liquid in the passage $27_m$ will retreat outward until it reaches the line $S_m$—$S_m$ and there it will be in equilibrium.

This arrangement is further indicated in dotted lines at the left of Figure 13C, from which it may be seen that compressed gas in the receiver 310 at the left can then pass outward through the open end of pipe $27_m$ to the sidewall passage $28_m$ through which it returns to the axial line $X_o$—$X_o$ and thence out through a packed joint in the axial line not shown in this diagram.

Any liquid within the pipe $27_m$ escapes outward to the priming reservoir $R_m$, thence upward through pipe $P_m$ and inwardly through the balancing arm $P_{mm}$ and finally escapes through the open end of the pipe $Q_m$.

The compressed gas within the receiver 310 is exposed to the pressure of the column of liquid $F_o$—$f_m$. The liquid within the passage $27_m$ therefore retreats outward until it reaches the line $S_m$, at which point the column of liquid $S_m$—$T_m$ in pipe $P_{mm}$ just balances the pressure due to the column of liquid $F_o$—$f_m$. It should be observed that the column $S_m$—$T_m$ need ordinarily be only about half as long as the column $F_o$—$f_m$ because of the greater distance of column $S_m$—$T_m$ from the axis of rotation.

The liquid trap of Fig. 13G may likewise be employed to keep passages free of liquid as is indicated in Fig. 14 where it will be seen that any liquid entrapped within sidewall passage 87 passes outward to reservoir 88 and then escapes through the riser pipe 88° as heretofore explained.

*Stationary containing vessels, and parabolicity of central air space.*

As has been previously stated, the containing vessels of this invention are usually arranged to rotate with the compressing element. However, in machines of large size and of relatively low speed, I contemplate employing stationary containing vessels, and to then permit the liquid ring to rotate within this stationary container.

The central air space has heretofore been considered as being substantially cylindrical in form. However, in machines of large size and low speed, as just described, it may be found that the actually parabolic form of the central air space may be a disturbing factor, that is, the diameter of the air space may be appreciably greater at the top than at the bottom.

With a symmetrically disposed polar type wheel, this would result in unequal volumes of gas being taken in at the two intake points, and might thus produce a serious unbalance in the wheel.

This possible difficulty may be remedied by first displacing the air ducts to one side of their normal central, or equatorial position, in the compressing tubes. Then, by tilting downward that end of the axle toward which the air ducts have been displaced, the other end of the axle of course rising correspondingly, the compressing tubes at top and bottom may thus be made to entrap substantially equal volumes of gas.

Such an arrangement is shown in Fig. 1D, in which $1_1$ is a stationary containing vessel, $2_1$ is a rotating framework, which carries the polar type bucket wheel 3, the wheel axis $A_1$—$A_1$ of which intersects the spin axis $X_1$—$X_1$ at a lesser angle than the right-angled, or 90°, form as heretofore described.

The line $B_1$—$B_1$ corresponds to the middle, or equatorial, circumference of the wheel. It will be observed that the air ducts $T_1$—$T_1$ have been displaced to the left, to the line $C_1$—$C_1$. Then by tilting downward the left end of the wheel axis, the air duct $T_{11}$ has been brought back to a mid-position in the central air space, while, at the same time, the air duct, $t_1$, at the top, occupies a side position in the upper portion of the central air space. Thus, when the forward end of the duct, $t_1$, enters the curved wall of water in advance, its compressing tube, $h_1$, will then contain substantially the same volume of entrapped air as the opposing tube, $h_{11}$, in the lower portion of the central air space.

In other words, by displacing the air ducts to one side, and then tilting the wheel axis in the manner indicated, we have thereby so arranged matters that the lower air duct, $t_{11}$, enters the further wall of liquid while its compressing tube, $h_{11}$, lies directly across the central air space, and so contains the maximum possible volume of air.

On the other hand, the air duct, $t_1$, is now so disposed that it now enters the further wall of compressing liquid before its compressing tube, $h_1$, has reached the mid-position in the central air space. The upper tube does not therefore entrap its maximum possible volume of air, but is instead calculated to entrap substantially the same volume as does the tube $h_{11}$ in the lesser diameter of air space at the bottom.

*The refrigerating machine of Figures 21, 22, and 23.*

Figures 21, 22, and 23, represent a power driven refrigerating machine. Fig. 21 is a vertical section on the line $B_x$—$B_x$ of Fig. 22. Fig. 22 is a horizontal section on the line $A_x$—$A_x$ of Fig. 21. Fig. 23 is a partly sectionalized polar view of the bucket wheel of this machine.

Referring to Fig. 21, 403 is a bucket wheel journaled on sleeves 418 projecting inwardly from the side walls of the vessel 402 which turns on the vertical axis $X_x$—$X_x$ in the fixed frame 401. The vessel 402 contains a dummy compressing element which may consist of one or more liquids such as oil, water, or mercury, the function of which is to balance, cool and lubricate, the bucket wheel and its various gears.

The bucket wheel 403 consists largely of a closed network of tubing which has neither valves nor stuffing boxes, nor outlets, nor inlets, of any kind. On the interior of the network is a fixed quantity of oil or other compressing medium, and a fixed quantity of refrigerant, such as sulphur dioxide, ammonia, or carbonic acid gas. Neither the oil nor the refrigerant can escape or change in any way.

Under the influence of centrifugal force, the oil flows around in the network of tubing in such fashion that the gas is, in turn, entrapped, compressed, condensed, and then vaporized, and is then turned back into the inlet chamber of the network, thus to continue endlessly through the cycle as long the the machine is operated.

In the central portion of the bucket wheel, Fig. 21, is a refrigerating chamber 447 partly filled with liquid refrigerant which is constantly boiling away owing to the absorption of heat from the refrigerating tubes, 429 and 431, through which brine is constantly circulating. On the outside of the chamber 447 is another collection of tubes 457—457 which acts as a condenser, these tubes being surrounded by cooling water which is constantly passing through the vessel 402.

Cooling water for this machine is poured into chamber 441 in the upper journal 408. Thence it passes by way of passage 442 to the interior of the containing vessel 402.

This cooling water passes through the outside shell of the wheel 403 by way of passages not shown, and thus has access to the banks of condenser tubes which are located immediately outside of the refrigerating chamber 447.

As this water becomes warm, it moves toward the center of rotation, the excess flowing away through the outlet 444 and the centrifugal valve 443.

The lower journal 409 is hollow and extetnding up through it is the brine intake pipe 422 into which the brine to be cooled is injected by the nozzle 421. Under the action of centrifugal force, the brine passes upward through sidewall passage 423, to the outlet 424, from which a tube 425 carries the brine into passage 426 which ends in a header 427 projecting into the refrigerating chamber 447.

The brine passes through refrigerator tubes 429, and 431 to another similar header, from which the cooled brine then passes by way of tube 435 to outlet 436, then through dotted sidewall passage 437, and annular passage 438, to the centrifugal pump 430, which discharges into outlet chamber 440, from which the cooled brine then flows away to the refrigerating rooms.

Advantage is taken of these additional figures to show a modified form of the planetary gear. From the top member of the chamber $402_x$, a downward extension forms the gear case, 420, in which is mounted the worm or spiral gear, 405, which drives the countershaft, 411, through a corresponding worm or spiral gear, 406, not shown.

The worm 405 is carried on the vertical shaft, 413, which carries on its upper end, the clutch wheel, 414, which, as previously explained, may be held stationary by a band clutch, or may instead be driven at any speed desired, either in the same or in a direction contrary to that of the containing vessel 402.

The vertical shaft 413 must of course be placed in the axial line of the containing vessel. This necessitates that the countershaft, 411, should be displaced from its normal position, which would naturally be with its axial line intersecting that of the containing vessel 402. The unbalance due to this displacement is of negligible effect and may be easily counterbalanced.

Assuming that the worm 405 is held stationary while the vessel 402 is caused to rotate, the worm gear 406, not shown, will revolve planetarywise around the worm 405, and will thus drive the countershaft 411, and its gears 412—412, which mesh with the ring gears 417—417, on the flange 419 of the bucket wheel 403. The bucket wheel is thus given the usual double movement of this invention.

The wheel 403 comprises an axial member 407 having the hubs $407_x$ and $407_{xx}$, which turns on sleeves, 418—418, projecting inwardly from the side walls of the vessel 402. The middle portion of the axle 407 is enlarged to form the vaporizing chamber, 447, the walls of which, 448, join to the central web, 445, in the interior of which, is formed the restricted inlet chamber, 449, from which the vapor to be compressed is drawn, through air ducts $t_x$—$t_{xx}$, into the compressing tubes $h_x$—$h_{xx}$, which are cored out in the outer shell of the wheel 403.

This outer shell of the bucket wheel is composed of the spheroidal shell, 451, meridian ribs, 452, not shown in this figure, and the cover 453, which, in this case, completely encloses the tube section of the wheel. The polar edge of the wheel is at 454, Fig. 22.

Annular equalizing passages, 455—455, are cored out in the cover, 453, to serve in lieu of an exterior compressing element, as will presently be explained.

All compressing tubes, $h_x$—$h_{xx}$, etc., discharge into annular or cylindrical passages, 459—459, which are enlarged on their inner ends to form the receivers, 410—410, and on their outer ends to form the annular collecting chambers 460—460. From the outermost portions of the collecting chambers, 460, a delivery tube, 461, as indicated by the dotted lines, Fig. 22, leads inwardly to the vaporizing chamber 447.

Distributing tubes, 456, lead inwardly from receivers, 410—410, to the cylindrical banks of condenser tubes, 457—457, which are composed of curved headers, 458—458$_x$, and the condenser tubes proper, 457, which are merely short lengths of flattened tubing.

Certain aspects of this machine can be explained only by a numerical example. It has consequently been designed as a "ten ton" refrigerating machine, employing sulphur dioxide as the refrigerant, and allowing ten cubic feet of intake capacity per minute per ton of refrigerating effect. The machine will thus have an intake capacity of 100 cubic feet per minute. Temperature range is 0 to 75 degrees F. Pressure range 10 to 54 pounds absolute, thus requiring an effective compression of 44 pounds per square inch. Oil having a specific gravity of 1.00 is assumed to be employed as the compressing medium.

Diameter of air space is 12 inches. Rotary speed of container, 550 R. P. M. This entails an effective depth of oil in the compressing element of 12 inches, thus making the polar edges 454, Fig. 22, somewhat over 18 inches from the vertical axis. Allowing two inches for the inclination of the tubes gives an equatorial diameter of the spheroidal shell of 40 inches. The overall diameter of the bucket wheel would then be about 48 inches.

The circumference of the pitch circle of this wheel may be taken as 128 inches. Deducting eight inches for space occupied by the meridian ribs gives a pitch circle circumference of ten feet. Allowing 60 R. P. M. of the wheel gives 600 feet per minute as the linear velocity of the pitch circle. Since the buckets operate twice during each revolution, the effective velocity of the pitch circle may be taken as 1200 feet per minute.

Since the diameter of the air space is 12 inches, the effective area generated by the tube belt may be taken as 1200 square feet per minute. Since the machine is to have an intake capacity of 100 cubic feet per minute, the tubes must have a depth of $\frac{1}{12}$ foot, or one inch. These figures are of course merely approximations. The wheel for instance might turn only 30 R. P. M. in which case the tubes should have a depth of two inches.

Taking up now the operation of this machine, it will be assumed that the vessel 402 is being driven at the rate of 550 R. P. M. through power applied on a belt wheel, not shown, or by an electric motor, the armature of which is formed on the surface 402$_{xx}$. Cooling water is being poured in a constant stream through the openings 441, the excess flowing away through the outlet 444. Brine is likewise being circulated through the machine in the manner previously explained. The bucket wheel is assumed to be rotating 60 R. P. M. on its own axis by reason of the clutch wheel 414 being held stationary, or otherwise operated as previously explained.

Tubes $h_x$ and $h_{xx}$, Fig. 21, lie directly across the central air space. The liquid within those tubes has consequently retreated outward to the lines $F_x$—$F_x$, and vapor has been drawn into those tubes through the air ducts $t_x$—$t_{xx}$. As the wheel turns through one fourth revolution, the tubes $h_x$—$h_{xx}$, reach the horizontal diameter and the position of tubes $n_x$—$n_{xx}$, of Fig. 22.

The gas now runs lengthwise of the tubes $n_x$—$n_{xx}$ to the annular passages 459 and the receivers 410—410. From these receivers the gas passes through distributing tubes 456, to the condenser tubes, 457, where the compressed gas is spread into thin sheets, in flattened tubes which are surrounded by the cooling water.

The compressed gas is thus liquefied and it then has a specific gravity of 1.49. It consequently flows outward again under the action of centrifugal force to the receivers 410—410 and the innular passage 459. Then, being heavier than the oil of the compressing medium, the liquid sulphur dioxide passes through the layer of oil and accumulates in the annular collecting chambers 460—460.

From the outermost portions of collecting chambers 460, the liquid sulphur dioxide passes inwardly through delivery tubes 461, as indicated by the dotted lines in Fig. 22, to the vaporizing chamber 447, where the liquid is constantly vaporizing owing to the abstraction of heat from the brine in the refrigerating tubes 429 and 431.

This vapor passes through the central opening 446 into the narrow circular chamber, 449, which is cored out in the interior of the central web 445, and from which chamber the gas is being constantly drawn through air ducts $t_x$—$t_{xx}$ into the compressing tubes $h_x$—$h_{xx}$. This completes the cycle of the wheel. Certain perhaps obscure features of its operation will now, however, be taken up in detail.

This machine employs the restricted air space, the action of which has already been explained in connection with Figures 10, 11, and 12. Referring to Fig. 23 which is a partly sectionalized polar view of the wheel 403, it will be seen that, from $a_x$ to $b_x$, the outer shell of the wheel, together with one of the central webs, has been broken away to show the interior of the restricted inlet chamber 449, which, it will be remembered, is a narrow circular chamber formed in the interior of the central web 445. $F_x$—$F_x$ represents the free surfaces of the two thin bodies of liquid which flow around in that chamber, and thus maintain always their proper position relative to the vertical axis.

The air ducts, $t_x$—$t_x$, are shown in diagrammatic form. Their preferred form is that shown in Fig. 13. Referring to Fig. 23, it will be seen that these air ducts pass across the central air space, and then through the two thin bodies of liquid, in such fashion as to trap vapor within the compressing tubes, $g_x$—$h_x$, in the usual manner.

From $b_x$ to $c_x$, and again from $e_x$ to $a_x$, the section is taken outside of the central web, and thus the curved wall, 448, of the vaporizing chamber 447 is shown in cross section.

On the outside of the wall 448 is the curved bank of condenser tubes, a part of these tubes, 457, being shown in end section. It will be seen that the condenser tubes are divided into sections, with one distributor tube, 456, to each section. This division is for the purpose of keeping those tubes clear of liquid, as will presently be explained.

From $c_x$ to $d_x$, only the cover has been broken away thus leaving the spheroidal shell in full view. The meridian ribs are shown in section in solid black. 451 is the spheroidal shell, 452 the meridian ribs, 453 the cover, and 419 is the flange which carries the gears 417. The tubes $m_x$ and $n_x$ may be seen running to and discharging into the annular passage 431.

From $d_x$ to $e_x$, the cover 453 is shown intact, while running across it may be seen the enlargements for the equalizing passage 455, and the collecting chamber 460.

It has been stated that the equalizing passages 455 serve in lieu of an exterior or independent compressing element. The compressing element is thus confined simply to the volume of liquid that is contained within the compressing tubes themselves. The reason why this may be true is best shown in connection with Figures 13C and 13E.

Referring to Fig. 13C, the tubes $h_o$—$h_{oo}$ contain a certain volume of entrapped air. One fourth revolution later the tubes occupy the position of tubes $m_o$—$m_{oo}$ of Fig. 13E, and are now solidly filled with liquid. Neglecting the air ducts $t_o$—$t_{oo}$ for the moment, the additional volume of liquid has flowed in through the polar openings $p_o$—$p_o$.

With another quarter revolution of the wheel, the tubes again contain another volume of entrapped air. The same volume of liquid must then have flowed outward through the polar openings $p_o$—$p_o$.

Twice during each revolution of the wheel there will thus be a flow of liquid into and then out of each of the compressing tubes. In practice, however, many tubes will be operating at once, and in various stages of the cycle. The outflow from one tube will then supply the inflow to another tube in a different portion of the cycle. The resultant intermittent flow through the polar openings $p_o$ will thus be brought to a very low value or may disappear altogether. The polar openings may then be entirely closed and an equalizing passage, such as 455 of Fig. 21, be substituted in lieu thereof. One form of this arrangement was seen in Fig. 14, an equalizing passage being left over the tops of the meridian ribs of the bucket wheel 3.

In Fig. 21, it will be observed, the equalizing passages, 455, in connection with the annular passages 459, obviate the necessity for an external compressing element, and thus permit of an entirely closed network employed in the wheel 403.

No difficulty should be found with the action of the condenser system, for the condenser is merely an inward extension of the receivers 410—410. Connecting passages, as indicated by the curved dotted lines, serve to connect the two circular banks of condensers, and thus to maintain equality of gas conditions in the opposing halves of the wheel.

It is also to be observed that many passages, not shown, will be provided through the outer shell of the wheel to permit free ingress of the cooling water to the curved banks of condenser tubes. These passages may run inwardly through enlarged portions of the meridian ribs, or, instead, a system of tubes may be run directly through the compressing tubes, thus assisting in keeping the gas cool as it is being compressed.

It will be readily understood how, as the vapor liquefies in the condenser, it flows outward to the receivers 410—410, and then through the layer of oil to the collecting chambers 460. As a matter of fact, the drawings have been distorted to simplify an understanding of this action.

There may still, however, be a slight tendency for the liquefied dioxide to accumulate in the condenser tubes on the horizontal diameter, as shown in Fig. 22. This might be a troublesome feature and therefore the condensers are arranged to be self clearing by what I term an elbow pumping action.

For this purpose, the passage of the gas from the polar edge, 454, to the condenser, 457, is given an elbow shape, the elbow being formed by the intersection of the receivers 410—410 with the distributing tubes 456. The only other modification required is that the condensers should be made in several sections, each with its own distributing tube, as is seen in Fig. 23.

Referring now to Fig. 21, it will be seen that any liquid that might be in the condenser sections as represented in this figure would flow outward trough the distributor tube of that section to the receiver 410—410. The elbow in the passage does not interfere in the least with this outward flow, and, in fact, the elbow might be very greatly accentuated and still permit of the ready outward flow of the liquid.

Referring now to Fig. 22, where the condenser sections on the horizontal diameter are shown, and where the liquid might have a tendency to flow back into the condenser, it will be seen that the elbow is inside of the liquid line within the receivers 410—410, and thus the escape of the liquid back into the condenser is prevented. The elbow thus acts as a trap which permits of the outward flow of the liquid on the vertical diameter of the wheel, but prevents any return of the liquid on the horizontal diameter. The condenser sections thus clear themselves rapidly of any liquid that may be within them. The compressed vapor can of course pass freely into the condenser at any time.

In the interests of simplicity, the condensers are shown on the interior of the bucket wheel. In actual practice these condensers will probably be placed outside of the wheel, that is, immediately under the flange 419. In such case the distributor tubes 456 would pass through or between the compressing tubes. The elbow pumping action would be employed to keep the condenser clear of liquid.

Since liquid sulphur dioxide has a specific gravity of 1.49, it is probably heavier than any oil that might be employed as the compressing medium. It will therefore be readily understood that the dioxide will flow out through the layer of oil and will accumulate in the collecting chambers 460. This accumulation of dioxide covers the opening of the delivery tubes 461 and thus prevents the oil of the compressing medium from passing inwardly through the delivery tubes.

The sulphur dioxide then passes inwardly through delivery tubes 461 to the vaporizing chamber 447, and fills this chamber to a depth depending on the relative densities of the dioxide and of the oil of the compressing medium.

Thus, in Fig. 21, suppose the diameter of the air space is 12 inches, and that the juncture of the oil with the liquid dioxide is 19 inches from the vertical axis, thus leaving a column of oil having a depth of 13 inches. The oil would thus extend out to a point one inch beyond the polar edge 454.

At 550 R. P. M., and assuming that the oil of the compressing element has a specific gravity of 1.00, this would produce an internal pressure at the point of juncture of approximately 50 pounds per square inch.

A column of sulphur dioxide to produce the required pressure of 50 pounds per square inch under the given conditions, need have a depth of only seven inches. It is thus seen that, when the free surface of the oil is six inches from the axis, the free surface of the dioxide in the vaporizing chamber 447 will be 12 inches from the axis. This is another example of the inverted siphon, but with liquids of different densities in the two legs.

These figures are of course only approximate, and they will change with every change in the relative densities of the two fluids. It will further be observed that, in respect of the oil, Figures 21, 22, and 23, are not drawn to scale. The vaporizing chamber 447 should be made larger than as there shown. The condensers should be moved outward as far as possible, and would probably be placed on the exterior of the wheel. The conditions as shown would obtain only if oil of perhaps 1.25 specific gravity were employed as the compressing medium.

This explanation will probably remove any difficulty as to the normal operation of the wheel. There yet remains a problem as to placing the machine in condition for such normal operation.

In the manufacture of the wheel a calculated quantity of oil and of sulphur dioxide is confined in the interior of its network of tubing. The remaining space in the interior of the network will be filled with sulphur dioxide vapor of a pressure corresponding to its temperature. Of course, while the machine is standing still, either the oil, or the liquid refrigerant, or the vapor, may be in any or all of the various chambers of the wheel. The manner in which these different fluids find their proper places is as follows:

On putting the wheel into motion, the three fluids arrange themselves in the order of their density. It will therefore be assumed that, in the compressor tubes, in the condensers, and in the vaporizing chamber, there is first of all a volume of vapor surrounding the vertical axis, next a layer of oil, and then an outer layer of liquid sulphur dioxide.

As the wheel turns, the compressor tubes trap vapor in the central air space, and then carry it out and turn it into the receivers 410—410 and the condensers 457. The action of the wheel at this time results in lowering the vapor pressure in the central air space while at the same time increasing it in the condenser. The net result is that, with increasing pressure, the free surface of the liquid within the condenser retreats outward until it reaches its normal position of approximately 18 inches from the vertical axis. The oil displaced from the condenser will then have taken its proper place in the compressing tubes. The liquid sulphur dioxide will of course have retreated outward to the collecting chambers 460.

It is thus seen that the compressing tubes and the condensers are self maintaining in so far as keeping the fluids in their proper places is concerned. There remains then but the oil in the interior of the refrigerating chamber 447, which will of course be floating as a layer inside of the sulphur dioxide which alone belongs there.

This oil has no ready means of escape and therefore an Archimedean screw is arranged on the side of the web 445. The principle of this screw is shown in diagrammatic form in Fig. 24, in which, $F_x$—$F_x$ is the free surface of a rotating body of liquid which turns around the vertical axis, $X_x$—$X_x$, 462 is a spiral tube which turns around the center $O_x$ and in addition rotates bodily with the containing vessel around the vertical axis $x$—$x$.

The outer end of the spiral dips alternately into the two vertical walls of liquid, each time taking in a small quantity of liquid which is carried inward in the well known manner of the Archimedean screw. The liquid is then discharged from the inner end of the spiral in the manner presently to be explained.

Referring now to Fig. 21, the spiral 462 is shown in cross section on the side of the central web 445. The inner end of the spiral passes through the sidewall of the web 445 and discharges into the restricted inlet chamber, 449, at 463.

It is thus seen that, as the wheel begins to turn, the spiral 462 will skim the oil from the surface of the sulphur dioxide, and will then discharge this oil into the restricted inlet chamber where it properly belongs. The spiral however will still continue to trap liquid after all the oil has been taken out of the vaporizing chamber. This might entail a small loss which is probably negligible. In any case it may be prevented by surrounding the spiral with the brine to be cooled. Any liquid sulphur dioxide would thus be vaporized before it could be turned into the central inlet chamber.

It will thus be understood that, regardless of their original positions, the three fluids will reach their proper positions in the wheel shortly after the machine is placed in operation.

It should be understood also that the refrigerating tubes 429 and 431 are really shown in merely diagrammatic form. In practice it will be necessary to take cognizance of the coefficient of expansion of the brine or other medium at the particular temperature at which it is to operate. It may then be found that the path of the brine, as it is cooled in the vaporizing chamber, should either be radially inward or radially outward, instead of being merely transverse as I have shown it.

As to the lubrication of this machine, bearing sleeves 418 project into outward opening cups that are formed between the sleeves 434 and the inner surfaces of the hubs $7_x$—$7_{xx}$.

Oil for the lubrication of the bearing is trapped in the cup in the manner previously explained.

Flanges 419 divide the central air space of the dummy compressing element into three portions. It follows that oil for the lubrication of gears 412 and 417 may be poured into the upper portion of this dummy air space. This oil will float as an inner layer on the inner surface of the liquid of the dummy compressing element. The escape of the oil from this compartment is prevented by the flanges 419.

*The refrigerating machine of Figures 25, 26, and 27.*

Figures 25, 26, and 27, represent a modified form of the refrigerating machine, the bucket wheel being adapted to the use of a refrigerant, the liquid of which is of less density than that of the compressing element.

Referring to Fig. 25, it will be seen that the bucket wheel 503 is built in skeleton form, the compressing tubes, $h_x$—$h_{xx}$, etc., being merely curved pipes which arch from the central web 545 to the hubs $507_x$—$507_{xx}$.

The equalizing passages 555 have been moved into the hubs as shown. Because of the lesser density of the liquid refrigerant, the collecting passages 560 have been moved to a position inside of the polar edges.

Another change is that of the distributor tubes 556 which now act as traps for the compressed vapor. They, and the receivers 510—510 are made purposely small so as to prevent any condensation of vapor within them. The vapor is thus hurried through them toward the axis, and it is then allowed to move outward again into the condensers 557—557. Here the vapor condenses and then flows outward through collecting tubes 565 to the collecting chambers 560, from which delivery tubes 561 then lead inwardly to the vaporizing chamber 547. The brine refrigerating tubes 527—527 are merely curved tubes which arch from header to header through the vaporizing chamber 547.

Referring to Fig. 27, from $a_z$ to $b_z$, the wheel 503 is shown in a section taken through the restricted inlet chamber. Air ducts $t_z$—$t_z$ are cored out in the peripheral portion of the central web 545 which is here thickened so that the air ducts may enter the compressing tubes from the outer side.

Taking up the operation of this wheel, it is seen that the air duct $t_x$ of the tube $g_x$ Fig. 27, has entered the central air space of the restricted inlet chamber. The liquid within the air duct has retreated outward to the normal liquid line $F_x$—$F_x$.

At $h_x$ the duct has entered the opposite wall of liquid and the vapor within the duct and within the tube $h_x$ is thus trapped. At $i_x$ the gas is being compressed.

At $n_z$ the compressed vapor flows through the arching tube $n_x$ to the hub 507 where it drops into the annular passage, 510, from which it then passes by distributor tubes, 556, not shown in this figure, to the curved banks of condenser tubes, 557. Here the gas condenses and then flows through the collector tubes 565 to the annular collecting chamber 560, from which delivery tubes 561, Fig. 25, then carry the liquid inward to the vaporizing chamber 547.

The operation of this machine will probably be clear enough, as, in general, it is merely the duplicate of that of the machine previously described. In starting operating, however, a slight modification is required.

When the machine is placed in operation, the three fluids seek their proper places, as their various densities would dictate. It will therefore be supposed that in each of the compartments of the wheel, there will be first a volume of vapor surrounding the vertical axis; next, a layer of liquid refrigerant, and, finally, an outer layer of oil or other compressing medium.

The oil in the compressing tubes is of course in its proper place, and it there remains. Any oil that may be in either the condensers 557 or the vaporizing chamber 547, immediately flows outward through collecting chamber 560, and dotted passages 564, Fig. 25, to the main body of oil in the equalizing passages 555.

The fluids will all thus have found their proper places with the possible exception of a layer of liquid refrigerant in the central inlet chamber, in the compressing tubes, and in the receivers 510—510. This stray liquid will all be vaporized and will then be handled in the normal manner as follows.

The liquid refrigerant in the inlet chamber will partly vaporize. The remainder will be trapped by the air ducts in a manner similar to that of the Archimedean screw previously described. This liquid then passes with its vapor into the compressing tubes.

The liquid refrigerant thus turned into the compressing tubes is lighter than the oil of the compressing element. It is therefore handled precisely the same as the vapor, that is, it is discharged into the receivers 510—510. Here it collects as no means are provided for its escape.

The machine however, continues to compress. The relatively hot vapor bubbles through the layer of liquid refrigerant and vaporizes a portion of it, the whole then passing inwardly to the condenser. This continues until the entire amount of stray liquid has been vaporized and passed into the condenser. The machine then takes up its normal operation.

Variations in design.

In the preceding pages I have shown the principal variations in design of the centrostatic machines. I will now review briefly these various forms and explain why of them the polar type is perhaps the ultimate form of this invention.

Variations in the compressing element.

As has been explained, the liquid compressing element must, of course, rotate while the container or tank itself may be either stationary or movable with the liquid. The axis of rotation of the compressing element may, of course, be either vertical or horizontal. For the refrigerating machines, it is possible that the horizontal arrangement may prove best.

The kind of liquid to be employed as the centrostatic or compressing medium will depend almost wholly on other factors of the design. Oil or glycerine will probably be employed in the motor compartments, while oil, water or chemical solutions will be employed in the compressors.

Chemical solutions, such as that of carbonate of potassium, sulphate of zinc, the chlorides of calcium, iron, and zinc, or the nitrates of potassium, sodium, etc., may be useful on account of their high specific gravity, which serves to simplify the problem of balance and to increase the pressure range of the compressor. Care must, of course be exercised to see that such chemical solutions are employed only with such materials of construction as to which they are not seriously corrosive.

Variation in design of the gas conveyor.

A broad division may be made as to whether the receptacles for the transfer of gas are valve controlled, or are what I term the tipping bucket type, this tipping bucket form being one in which the motion of the receptacle itself effects the intake and discharge of the gas. The tipping bucket type is the preferred form, and under this heading I classify the Archimedean screw machines.

It should be observed that, owing to the "curved" nature of the compressing elements of this invention, a "receptacle", in a centrostatic compressor, may have quite a different form than those commonly associated with that term in ordinary hydrostatic devices. Thus, in Fig. 15 it may be seen that the simple open ended motor tubes 91—91ᵃ are perfect centrostatic receptacles. The term "receptacle", as herein employed, therefore, means any worm, bucket, trough, or other device which may, under the somewhat peculiar laws of centrostatics, be adapted to hold, receive, retain or restrain a volume of gas or other fluid.

Rotary or non-rotary conveyors.

As a further division, the receptacles for the transfer of the gas may be carried by non-rotary mechanism, such, for instance, as the chain and bucket of Fig. 1B. All non-rotary types are complicated and are difficult to lubricate and to balance. I have therefore eliminated them in favor of rotary types, the bucket wheel or the Archimedean screw, or the combination of the two, as exemplified in the biased polar type wheel of Fig. 13F.

Separate or integral container vessels.

A further division may be made as to whether the containing vessel for the compressing element is separate from the compressor wheel, as in Figs. 10 and 11, or whether instead it forms a single member with its containing vessel, as in the compressor wheel of Fig. 14 and in the refrigerating machine of Fig. 21.

Angularity of the wheel axis

The axis of the wheels may be parallel, at right angles, or at any other angle, to the axis of rotation of the compressing element. The parallel arrangement was shown in Figs. 8 and 9, the right angled one in Figs. 4, 10 and 14. An intermediate angle is shown in Fig. 1D.

Of these, the angular forms are considered best because the noncoincident curvature of the bucket wheel and of the compressing element gives greater flexibility of design.

Eccentric single, and multi-wheel, forms.

As previously explained, the eccentric single wheel form lacks volumetric capacity and is difficult to balance. Of the eccentric types, the multi-wheel form is therefore preferred. Though practical machines may be made of the eccentric multi-wheel form, particularly for special purposes, such as the vacuum pump of Figs. 8 and 9, in general they are subject to rather severe centrifugal strains. For this and other reasons the non-eccentric type is preferred.

All eccentric bucket wheels have a further disadvantage in that, being eccentric to the central air space, any variation in the diameter of the air space would tend to cause severe unbalances in an otherwise balanced wheel.

Non-eccentric single wheel types.

For these and other reasons, I prefer the non-eccentric type of single wheel machine, that is, one in which the axis of rotation of the compressing element passes through the center of mass of the wheel. The wheel is then in a condition of equilibrium, at least to begin with. If the wheel is made light enough to float in the liquid, it will then tend toward a condition of stable equilibrium, for, if allowed so to do, it will then find and retain its own position of equilibrium in the liquid.

Receptacles for the non-eccentric single wheel type.

The valveless receptacles carried by this single wheel may likewise be made in many forms. Of these, I prefer the tubular type of receptacle, as, because of its side outlet, it permits of the ready outward flow of the liquid during the intake of the gas.

Short or long tubular receptacles.

Of the tubular types, the tubes may be either short or long. If short, they tend to discharge too quickly. This fault may be remedied by giving these tubes an advancing bias, that is, bending the ends of the tubes forward in the direction of rotation of the wheel. The short tubes have a further disadvantage in that either the allowable time of discharge must be very limited, or else the drop into the receivers must become somewhat excessive.

Long tubes of the polar type.

If long tubes are employed, the polar type wheel is produced, and many important advantages are thereby gained. Because of the length and the curved form of these tubes, the gas to be compressed is quickly spread into thin sheets and over new surfaces. The heat of compression is quickly absorbed, and thus the compression may be made practically isothermal.

The polar type of wheel also permits of great latitude in the point of discharge of the gas, and its secures this latitude without increase of drop into the receivers. The polar type is also easily lubricated. Variations in the diameter of the air space do not affect its running balance. With an enlarged air space it has enormous volumetric capactiy. The generally spherical shape of its gas conveyor provides a rigid and relatively cheap production type. In addition, it possesses an extraordinary flxibility of design.

For these and other reasons heretofore pointed out, the polar type is considered to be the ultimate form of this invention.

In an apparatus of the class described, I claim:

1. In combination, a vessel adapted to contain a rotating or revolving body of liquid, and mechanical means for transferring a fluid of different density, than said liquid, between one portion and another of the said liquid body, the said mechanical means being constrained to turn, substantially in unison with said liquid, about the axis of rotation or revolution of said liquid body.

2. In combination, a rotating or revolving vessel containing liquid, and mechanical means for transferring a less dense fluid between one poriton and another of the said contained liquid, the said mechanical means being constrained to turn about the axis of rotation or revolution of the said vessel.

3. In combination, a vessel adapted to contain a rotating or revolving body of liquid, and receptacles for transferring a fluid of different density, than said liquid, between one portion and another of the said liquid body, the said receptacles being constrained to turn, substantially in unison with the said liquid, about the axis of rotation or revolution of the said liquid body.

4. In combination, a rotating or revolving vessel containing liquid, and receptacles for transferring a less dense fluid between one portion and another of the said contained liquid, the said receptacles being constrained to turn, substantially in unison with said vessel, about the axis of rotation or revolution of the said vessel.

5. In combination, a rotating or revolving body of liquid and its container, and rotary conveying means for transferring a fluid of different density, than said liquid, between one portion and another of the said liquid body, the said rotary conveying means being constrained to turn about the axis of rotation or revolution of said liquid body.

6. In combination, a rotating or revolving vessel containing liquid, and a rotary conveyor for transferring a fluid of different density, than said liquid, between one portion and another of the said contained liquid, the said rotary conveying means being constrained to turn about the axis of rotation or revolution of said vessel.

7. In combination, a vessel adapted to contain a rotating or revolving body of liquid, and mechanical means for transferring a less dense fluid between one portion and another of the said liquid body, the said mechanical means being constrained to turn substantially in unison with said liquid but having also an additional movement relative to said liquid.

8. In combnation, a vessel adapted to contain a rotating or revolving body of liquid, and receptacles for transferring a fluid of different density, than said liquid, between one portion and another of the said liquid body, the said receptacles being constrained to move substantially in unison with said liquid but having also an additional movement relative to said liquid.

9. In combination, a vessel adapted to contain a rotating or revolving body of liquid, and rotary conveying means for transferring a fluid of different density, than said liquid, between one portion and another of the said liquid body, the said rotary conveying means being constrained to turn substantially in unison with said liquid, but having also an additional movement relative to said liquid.

10. In combination, a rotating or revolving vessel containing liquid, and mechanical means for transferring a fluid of different density, than said liquid, between one portion and another of the said contained liquid, the said mechanical means being constrained to turn substantially in unison with said vessel but having also an additional movement relative to the said vessel.

11. In combination, a rotating or revolving vessel containing liquid, and receptacles for transferring a fluid of different density than said liquid, between one portion and another of the said contained liquid, the said receptacles being constrained to turn substantially in unison with said vessel but having also an additional movement relative to the said vessel.

12. In combination, a rotating or revolving vessel containing liquid, and rotary conveying means for transferring a fluid of different density than said liquid, between one portion and another of the said contained liquid, the said rotary conveying means being constrained to turn substantially in unison with said vessel but having also an additional movement relative to said vessel.

13. In combination, a rotating or revolving body of liquid and its container, and mechanical means for transferring a less dense fluid between one portion and another of the said rotating or revolving body of liquid, the said mechanical means being constrained to move substantially in unison and at relatively high speed in common with said liquid, the said mechanical means having also and additional and slower movement relative to the said liquid.

14. In combination, a vessel adapted to contain a rotating or revolving body of liquid, and receptacles for transferring a fluid of different density than said liquid between one portion and another of the said liquid body, the said receptacles being constrained to move at relatively high speed and substantially in unison with said liquid, the said receptacles having also an additional and slower movement relative to the said liquid.

15. In combination, a vessel adapted to contain a rotating or revolving body of liquid, and rotary conveying means for transferring a fluid of different density than said liquid between one portion and another of the said liquid body, the said rotary conveying means being constrained to move at relatively high speed substantially in unison with said liquid, the said rotary conveying means having also an additional and slower movement relative to the said liquid.

16. In combination, a rotating or revolving vessel containing liquid, and mechanical means for transferring a fluid of different density than said liquid between one portion and another of the said contained liquid, the said mechanical means being constrained to move at relatively high speed substantially in unison with said vessel, the said mechanical means having also an additional and slower movement relative to the said vessel.

17. In combination, a rotating or revolving vessel containing liquid, and receptacles for transferring a less dense fluid between one portion and another of the said contained liquid, the said receptacles being constrained to move at a relatively high speed in common with said vessel, the said receptacles having also an additional and slower movement relative to the said vessel.

18. In combination, a rotating or revolving vessel containing liquid, and rotary conveying means for transferring a less dense fluid between one portion and another of the said contained liquid, the said rotary conveying means being constrained to move at a relatively high speed substantially in unison with the said vessel, the said rotary conveying means having also an additional and slower movement relative to the said vessel.

19. In combination, a rotating or revolving vessel containing liquid, and a rotary conveying means journaled in the said vessel, the said rotary conveying means being adapted to transfer a less dense fluid between one portion and another of the said contained liquid.

20. In combination, a rotating or revolving vessel containing liquid, and rotary conveying means journaled in and carried by the said vessel, the said rotary conveying means being adapted to transfer a fluid of different density than said liquid between one portion and another of the said contained liquid.

21. In combination, a rotating or revolving vessel containing liquid, and receptacles for transferring a fluid of different density than said liquid, between one portion and another of the said contained liquid, the said receptacles being carried in and by the said vessel.

22. In combination, a rotating or revolving vessel containing liquid, and a bucket wheel journaled in and carried by the said vessel, the said bucket wheel being adapted to transfer a less dense fluid between one portion and another of the said contained liquid.

23. In combination, a rotating or revolving vessel containing liquid, an inlet for a less dense fluid in the central portion of the said vessel, and receptacles for transferring the said fluid to a point in said liquid more distant from the center of rotation or revolution, and a receiver for the said fluid at the more distant point, the said receptacles, and the said receiver, being carried in and by the said rotating or revolving vessel.

24. In combination, a rotating or revolving vessel containing liquid, an inlet for a less dense fluid in the central portion of the said vessel, and rotary conveying means for transferring said fluid to a point in said liquid more distant from the axis of rotation or revolution of the said vessel, a receiver for the said fluid at the more distant point, the said receiver and the said rotary conveying means being carried in and by the said vessel.

25. In combination, a rotating or revolving vessel containing liquid, an inlet for a less dense fluid in the central portion of said vessel, a bucket wheel for transferring said fluid to a point in said liquid more distant from the center of rotation or revolution of the said vessel, a receiver for the said fluid at the more distant point, the said receiver, and the said bucket wheel, being carried in, and by, the said vessel.

26. In combination, a vessel adapted to contain a rotating or revolving body of liquid, and mechanical means for transferring a less dense fluid from one point in said contained liquid to another point in said liquid less distant from the axis of rotation or revolution of the said liquid.

27. In combination, a vessel adapted to contain a rotating or revolving body of liquid, and receptacles for transferring a less dense fluid from one point in said contained liquid to another point in said liquid less distant from the axis of rotation or revolution of said liquid.

28. In combination, a vessel adapted to contain a rotating or revolving body of liquid, and rotary conveying means for transferring a less dense fluid from one point in said contained liquid to another point in said liquid less distant from the axis of rotation or revolution of the said liquid.

29. In combination, a vessel adapted to contain a rotating or revolving body of liquid, and a bucket wheel for transferring a less dense fluid from one point in said contained liquid to another point in said liquid less distant from the axis of rotation or revolution of the said liquid.

30. In combination, a rotating or revolving vessel containing liquid, and mechanical means for carrying a less dense fluid from one point in said liquid to another point in said liquid less distant from the axis of rotation or revolution of the said vessel.

31. In combination, a rotating or revolving vessel containing liquid, and receptacles for transferring a less dense fluid from one point in said contained liquid to another point in said liquid less distant from the axis of rotation of the said vessel.

32. In combination, a rotating or revolving vessel containing liquid, and rotary conveying means for transferring a less dense fluid from one point in said contained liquid to another point in said liquid less distant from the axis of rotation or revolution of the said vessel.

33. In combination, a rotating or revolving vessel containing liquid, and a bucket wheel for transferring a less dense fluid from one point in said contained liquid to another point in said liquid less distant from the axis of rotation or revolution of the said vessel.

34. In combination, a vessel adapted to contain a rotating or revolving body of liquid, an inlet for motive fluid in an outer portion of the said contained liquid, and mechanical means for transferring the said motive fluid toward the axis of rotation or revolution of the said liquid.

35. In combination, a vessel adapted to contain a rotating or revolving body of liquid, an inlet for motive fluid in an outer portion of the said contained liquid, and receptacles for conveying the said motive fluid toward the axis of rotation or revolution of the said liquid body.

36. In combination, a vessel adapted to contain a rotating or revolving body of liquid, an inlet for motive fluid in an outer portion of the said contained liquid, and rotary conveying means for transferring the said motive fluid toward the axis of rotation or revolution of the said liquid.

37. In combination, a rotating vessel containing liquid, and mechanical means for transferring a less dense fluid from one portion to another of the said contained liquid, a motor member carried by the said vessel, the said motor member being operatively connected with the said means for carrying the said fluid.

38. In combination, a rotating or revolving vessel containing liquid, and receptacles for transferring a less dense fluid between one portion and another of the said contained liquid, a motor member carried by the said vessel, the said motor member being operatively connected with the said receptacles.

39. In combination, a rotating or revolving vessel containing liquid, rotary conveying means for transferring a less dense fluid between one portion and another of the said contained liquid, and a motor member carried by the said vessel, the said motor member being operatively connected with the said rotary conveying means.

40. In combination, a rotating or revolving vessel containing liquid, mechanical means for transferring a less dense fluid between one portion and another of the said contained liquid, a motor member carried by the said vessel and operatively connected with the said mechanical means, a receiver for the said fluid in an outer portion of the said contained liquid, and an outlet for said fluid through the axial line of said vessel.

41. In combination, a rotating or revolving vessel containing liquid, receptacles for transferring a less dense fluid from one portion to another of the said contained liquid, a motor member carried by the said vessel and operatively connected with said receptacles, a receiver for the said fluid in the peripheral portion of the said contained liquid, and an outlet for said fluid through the axial line of said vessel.

42. In combination, a rotating or revolving vessel containing liquid, rotary conveying means for transferring a less dense fluid from one portion to another of the said contained liquid, a motor member carried by the said vessel and operatively connected with said rotary conveying means, a receiver for the said fluid in the peripheral portion of said vessel, and an outlet for said fluid through the axial line of said vessel.

43. In combination, a vessel adapted to contain a rotating or revolving body of liquid, means for transferring a motive fluid of less density from on outer to a more central portion of the said contained liquid, means for transferring a fluid to be compressed from a central point in said contained liquid to another point in said liquid body more distant from the axis of rotation or revolution, the said means for transferring the motive fluid being operatively connected with the means for transferring the fluid to be compressed.

44. In combination, a vessel adapted to contain a rotating or revolving body of liquid, receptacles for transferring a motive fluid to less density from an outer to a more central portion of the said contained liquid, and receptacles for transferring a fluid to be compressed from a central portion of the said contained liquid body to another point in said liquid body more distant from the axis of rotation or revolution of said liquid, the said receptacles for transferring the motive fluid being operatively connected with the receptacles for transferring the fluid to be compressed.

45. In combination, a rotating or revolving vessel containing liquid, rotary conveying means adapted to transfer a motive fluid of less density from an outer to a more central portion of the said contained liquid, and a rotary conveying means adapted to transfer a fluid to be compressed from a central portion of said liquid body to a point more distant from the axis of rotation or revolution of said liquid, the said conveying means for transferring the motive fluid being operatively connected with the means for transferring the fluid to be compressed.

46. In combination, a rotating or revolving vessel containing liquid, an inlet for a fluid to be compressed in the central portion of said vessel, means for transferring said fluid outward in said liquid, an inlet for motive fluid in an outer portion of the said vessel, and means for transferring the said motive fluid toward the axis of rotation, or revolution of the liquid body, the said means for transferring the motive fluid being operatively connected with the said means for transferring the fluid to be compressed.

47. In combination, a vessel adapted to contain a rotating, or revolving, body of liquid in which a central air space is formed within the liquid body, and receptacles for transferring a less dense fluid from one portion to another of the said contained liquid, the said receptacles being constrained to move substantially in unison with said liquid, the said receptacles having also an additional movement whereby they are caused to enter the central air space, and to then re-enter the liquid mouth outward, thereby entrapping the said less dense fluid in the said receptacles.

48. In combination, a rotating or revolving body of liquid and its container, and receptacles for transferring a less dense fluid from one portion to another of the said contained liquid, each receptacle comprising a main body portion and an air inlet extending ahead of the said main body portion.

49. In combination, a rotating or revolving vessel containing liquid and receptacles for transferring a less dense fluid from one portion to another of the said contained liquid, each receptacle comprising a main body portion and an inlet duct, the said inlet duct being arranged to re-enter the liquid substantially in advance of the said main body portion.

50. In combination, a vessel adapted to contain a rotating or revolving body of liquid, receptacles for carrying a less dense fluid from one point in said contained liquid to another point in said liquid more distant from the center of rotation or revolution, and a receiver for the said fluid at the more distant point, the said receptacles being constrained to move out to a point beyond the said receiver, and to then discharge said fluid into said receiver by a turning action of the said receptacles.

51. In combination, a vessel adapted to contain a rotating or revolving body of liquid, and receptacle for transferring a less dense fluid from one portion to another of the said contained liquid, each receptacle comprising a main body portion, an inlet for fluid to be compressed in the forward part of the said main body portion, and a side outlet from said main body portion.

52. In combination, a rotating or revolving body of liquid and its container, and receptacles for transferring a fluid of different density than said liquid between one portion of the said contained liquid, the said receptacles having substantially the form of tubes.

53. In combination, a vessel adapted to contain a rotating or revolving body of liquid, and receptacles for transferring a less dense fluid between one portion and another of the said contained liquid, the said receptacles having substantially the form of tubes for at least a portion of their length, and the said tubelike portion of said receptacles having a substantially sidewise motion through the said liquid.

54. In combination, a vessel adapted to contain a rotating or revolving body of liquid, and whereby a central air space is formed between the surface of said liquid and the axis about which said liquid turns, and receptacles for transferring a less dense fluid between one portion and another of the said contained liquid, the said receptacles being arranged to move across said air-space in a direction substantially at right angles to the axis of rotation or revolution of the said liquid.

55. In combination, a vessel adapted to contain a rotating or revolving body of liquid, and receptacles for transferring a fluid of different density than said liquid, between one portion and another of the said contained liquid, the said receptacles being arranged to move across the axis about which the liquid body turns, and in a direction substantially at right angles to the said axis.

56. In combination, a vessel adapted to contain a rotating or revolving body of liquid, and receptacles for transferring a less dense fluid from an outer to a more central portion of the said liquid body, the said receptacles comprising a main body portion, and an exhaust duct extending in arrears of the said main body portion.

57. In combination, a vessel adapted to contain a rotating or revolving body of liquid, and which liquid is adapted to leave an exhaust space between the surface of said liquid and the axis about which the liquid turns, and receptacles for transferring a less dense fluid from an outer to a more central portion of the said liquid body, the said receptacles comprising a main body portion and an exhaust duct, the said exhaust duct being arranged to enter the said exhaust space substantially in arrears of the said main body portion.

58. In combination, a vessel adapted to contain a rotating or revolving body of liquid, and receptacles for transferring a motive fluid from an outer to a more central portion of the said contained liquid, the said receptacles comprising a main body portion, an exhaust duct extending in arrears of the said main body portion, and a side opening into the said main body portion for intake of the motive fluid.

59. In combination, a vessel adapted to contain a rotating or revolving body of liquid, and rotary conveying means for transferring a less dense fluid from one portion to another of the said contained liquid, the axis of said rotary conveying means being at an angle to the axis about which the said liquid body turns.

60. In combination, a vessel adapted to contain a rotating or revolving body of liquid, and rotary conveying means for transferring a fluid of less density from one portion to another of the said contained liquid, the axis of said rotary conveying means being approximately at right angles to the axis of rotation of said liquid.

61. In combination, a vessel adapted to contain a rotating or revolving body of liquid, and rotary conveying means for transferring a less dense fluid from one portion to another of the said contained liquid, the axis of said conveying means being at an angle to the axis of said liquid body, and the center of mass of the said conveying means being located substantially near to the said axis of rotation or revolution of the said liquid body.

62. In combination, a vessel adapted to contain a rotating or revolving body of liquid, and rotary conveying means for transferring a less dense fluid from one portion to another of the said contained liquid, the axis of the said conveying means being substantially at right angles to the axis of rotation or revolution of said liquid body, and the center of mass of the said conveying means being located substantially near to the said axis of the said liquid body.

63. In combination, a vessel adapted to contain a rotating or revolving body of liquid, and rotary conveying means for transferring a less dense fluid from one portion to another of the said contained liquid, and receptacles carried by the said conveying means, each of said receptacles comprising a main body portion, and an inlet duct extending ahead of the said main body portion.

64. In combination, a vessel adapted to contain a rotating or revolving body of liquid, and rotary conveying means for transferring a less dense fluid between one portion and another of the said contained liquid, and receptacles carried by the said conveying means, each of said receptacles comprising a main body portion, an inlet duct extending ahead of the main body portion, and a side outlet from the said main body portion.

65. In combination, a vessel adapted to contain a rotating or revolving body of liquid, and rotary conveying means for transferring a less dense fluid between one portion and another of the said liquid body, and receptacles carried by the said conveying means and adapted to contain the said less dense fluid during the time of transfer of said fluid, each of said receptacles comprising a main body portion and an inlet duct, the said inlet duct being arranged to re-enter the liquid substantially in advance of the said main body portion.

66. In combination, a vessel adapted to contain a rotating or revolving body of liquid, rotary conveying means for transferring a less dense fluid from one portion to another of the said contained liquid, and receptacles carried by the said conveying means, the said receptacles having substantially the form of tubes for at least a portion of their length.

67. In combination, a vessel adapted to contain a rotating or revolving body of liquid, rotary conveying means for transferring a less dense fluid between one portion and another of the said contained liquid, and receptacles carried by the said conveying means, the said receptacles having substantially the form of tubes for at least a portion of their length, the said tube-like portion of said receptacles being carried by said conveying means in a direction at an angle to the length of said tube-like portion.

68. In combination, a vessel adapted to contain a rotating or revolving body of liquid, rotary conveying means for transferring a less dense fluid from one portion to another of the said contained liquid, and receptacles carried by the said wheel, the said receptacles having substantially the form of tubes for at least a portion of their length, the said tube-like portion of said receptacles being carried by said conveying means in a direction approximately at right angles to the length of said tube-like portion.

69 In combination, a vessel adapted to contain a rotating or revolving body of liquid, rotary conveying means for transferring a less dense fluid from one portion to another of the said contained liquid, and receptacles carried by the said conveying means and adapted to contain the said fluid during its time of transfer, the said receptacles having substantially the form of tubes or troughs, an end of each of said tubes or troughs being inclined towards the axis of said rotary conveying means.

70. In combination, a vessel adapted to contain a rotating or revolving body of liquid, and a rotary conveying means for transferring a less dense fluid from one portion to another of the said contained liquid, the said rotary conveying means comprising a spheroidal shell, ribs arranged on the surface of said shell and dividing the said surface into segments, and a cover over said ribs, thereby forming end-opening receptacles between said ribs.

71. In combination, a vessel adapted to contain a rotating or revolving body of liquid, and a rotary conveying means for transferring a less dense fluid from one portion to another of the said contained liquid, the said rotary conveying means comprising a spheroidal shell, ribs arranged on the surface of said shell and dividing the said surface into segments, and a cover over said ribs, thereby forming tubular receptacles between said ribs.

72. In combination, a vessel adapted to contain a rotating or revolving body of liquid, and rotary conveying means for transferring a less dense fluid between one portion and another of the said contained liquid, the said rotary conveying means comprising a spheroidal shell, ribs arranged on the surface of said shell and dividing the said surface into segments, and a cover over said ribs, thereby forming approximately tubular receptacles between the said ribs, the ends of said tubular receptacles being inclined inwardly toward the axis of the said rotary conveying means.

73. In combination, a vessel adapted to contain a rotating or revolving body of liquid, rotary conveying means for transferring a less dense fluid from an outer to a more central portion of the said contained liquid, and receptacles carried by the said wheel, the said receptacles having substantially the form of tubes for at least a portion of their length.

74. In combination, a vessel adapted to contain a rotating or revolving body of liquid, and mechanical means for transferring a less dense fluid from one point in said contained liquid to another point in said liquid more distant from the axis of rotation of said liquid, and a receiver at the more distant point, the said receiver being substantially an open mouthed vessel facing outward and away from the axis of rotation, or revolution of the liquid.

75. In combination, a vessel adapted to contain a rotating or revolving body of liquid, receptacles for transferring a less dense fluid from one point in said contained liquid to another point in said liquid more distant from the axis about which said liquid body turns, and a receiver at the more distant point, the said receiver being substantially an open mouthed vessel facing outward and away from the said axis about which the liquid body turns.

76. In combination, a vessel adapted to contain a rotating or revolving body of liquid, rotary conveying means for transferring a less dense liquid from one point in said contained liquid to another point in said liquid more distant from the axis about which the liquid body turns, and a receiver for the said fluid at the more distant point, the said receiver being substantially an open mouthed vessel facing outward and away from the said axis about which the liquid body turns.

77. In combination, a rotating or revolving vessel containing liquid, rotary conveying means for transferring a less dense fluid from one portion to another of the said contained liquid, and a receiver for the said less dense fluid, the said receiver being carried in and by the said vessel.

78. In combination, a vessel adapted to contain a rotating or revolving body of liquid, rotary conveying means for transferring a less dense fluid from one portion to another of the said contained liquid, and a receiver for the said fluid located in substantially the axial line of the said rotary conveying means.

79. In combination, a rotating vessel containing liquid, an inlet for a less dense fluid in the central portion, rotary conveying means for transferring said fluid to a point in said liquid more distant from the axis of rotation of said vessel, an axial member for said rotary conveying means and carried by the said rotating vessel, a receiver for the said fluid carried by said axial member, and an outlet for said fluid through the axial line of the said rotating vessel.

80. In combination, a vessel adapted to contain a rotating or revolving body of liquid, and mechanical means for transferring a less dense fluid from one portion to another of the said contained liquid, a shaft mounted in approximately the axial line of the said rotating body of liquid, a planetary pinion carried by the said shaft, a planetary gear meshing with said planetary pinion, the said planetary gear being operatively connected with the said mechanical means for transferring the said less dense fluid.

81. In combination, a rotating or revolving vessel containing liquid, and mechanical means for transferring a less dense fluid from one portion to another of the said contained liquid, a shaft mounted in approximately the axial line about which the said vessel turns, a planetary pinion carried by the said shaft, and a planetary gear meshing with the said planetary pinion, the said planetary gear being operatively connected with the said mechanical means for transferring the said less dense fluid.

82. In combination, a vessel adapted to contain a rotating or revolving body of liquid, and receptacles for transferring a less dense fluid from one portion to another of the said contained liquid, a shaft mounted in approximately the axial line about which the liquid body turns, a planetary pinion carried by the said shaft, and a planetary gear meshing with the said planetary pinion, the said planetary gear being operatively connected with the said receptacles for transferring the said less dense fluid.

83. In combination, a rotating or revolving vessel containing liquid, and receptacles for transferring a less dense fluid from one portion to another of the said contained liquid, a shaft mounted in approximately the axial line about which the said vessel turns, a planetary pinion carried by the said shaft, and a planetary gear meshing with the said planetary pinion, the said planetary gear being operatively connected with the said receptacles for transferring the said less dense fluid.

84. In combination, a vessel adapted to contain a rotating or revolving body of liquid, and rotary conveying means for transferring a less dense fluid between one portion and another of the said contained liquid, a shaft mounted in approximately the axial line about which the said liquid body turns, a planetary pinion carried by the said shaft, and a planetary gear meshing with the said planetary pinion, the said planetary gear being operatively connected with the said rotary conveying means.

85. In combination, a rotating or revolving vessel containing liquid, and rotary conveying means for transferring a less dense fluid from one portion to another of the said contained liquid, a shaft mounted in approximately the axial line about which the said vessel turns, a planetary pinion carried by the said shaft, a planetary gear meshing with the said planetary pinion, the said planetary gear being operatively connected with the said rotary conveying means.

86. In combination, a vessel adapted to contain a rotating or revolving body of liquid, and mechanical means for transferring a less dense fluid between one portion and another of the said contained liquid, a stationary shaft mounted in approximately the axial line about which the said liquid body turns, a planetary pinion carried by the said shaft, and a planetary gear meshing with the said planetary pinion, the said planetary gear being operatively connected with the said mechanical means for transferring the said less dense fluid.

87. In combination, a vessel adapted to contain a rotating or revolving body of liquid, and rotary conveying means for transferring a less dense fluid between one portion to another of the said contained liquid, a stationary shaft mounted in approximately the axial line about which the said liquid body turns, a planetary pinion carried by the said shaft, and a planetary gear meshing with the said planetary pinion, the said planetary gear being operatively connected with the said rotary conveying means.

88. In combination, a vessel adapted to contain a rotating or revolving body of liquid, and mechanical means for transferring a less dense fluid between one portion and another of the said contained liquid, a planetary pinion mounted in approximately the axial line about which the said liquid body turns, and a planetary gear meshing with the said planetary pinion, the said planetary gear being operatively connected with the said mechanical means for transferring the said less dense fluid.

89. In combination, a vessel adapted to contain a rotating or revolving body of liquid, and rotary conveying means for transferring a less dense fluid between one portion and another of the said liquid body, a planetary pinion mounted in approximately the axial line about which the liquid body turns, and a planetary gear meshing with the said planetary pinion, the said planetary gear being operatively connected with the said rotary conveying means.

90. In combination, a rotating or revolving vessel containing liquid, and mechanical means for transferring a less dense fluid from one portion to another of the said contained liquid, a planetary pinion mounted in approximately the axial line about which the said vessel turns, a countershaft journaled in said vessel, a planetary gear carried by the said countershaft and meshing with the said planetary pinion, the said planetary gear being operatively connected with the said mechanical means for transferring the said less dense fluid.

91. In combination, a vessel adapted to contain a rotating or revolving body of liquid, and mechanical means for transferring a less dense fluid between one portion and another of the said contained liquid, a planetary pinion mounted in approximately the axial line about which the liquid body turns, a disconnecting device for the said planetary pinion, and a planetary gear meshing with the said planetary pinion and being operatively connected with the said mechanical means for transferring the said less dense fluid, the said disconnecting device being operatable to permit the said planetary pinion to turn freely with the said vessel and its contained liquid.

92. In combination, a vessel adapted to contain a rotating or revolving body of liquid, and a rotary conveying means for transferring a less dense fluid from one portion to another of the said contained liquid, a planetary gear train operatively connected with the said rotary conveying means, and a disconnecting device for the said planetary gear train.

93. In combination, a vessel adapted to contain a rotating or revolving body of liquid, and rotary conveying means for transferring a less dense fluid between one portion and another of the said contained liquid, the said rotary conveying means being centrostatically lighter than the liquid it displaces.

94. In combination, a vessel adapted to contain a rotating or revolving body of liquid, and rotary conveying means for transferring a less dense fluid between one portion and another of the said contained liquid, the said rotary conveying means having float chambers formed therein for the purpose of reducing the unbalanced weight of the said conveying means.

95. In combination, a rotating or revolving body of liquid and its container, and rotary conveying means for transferring a less dense fluid between one portion and another of the said liquid body, substantially equal masses of the said conveying means being oppositely disposed relative to the axis about which the said liquid body turns.

96. In combination, a vessel adapted to contain a rotating or revolving body of liquid, and mechanical means for transferring a less dense fluid between one portion and another of the said contained liquid body, approximately equal masses of the said mechanical means being oppositely disposed relative to the axis about which the said liquid body turns.

97. The herein described method of varying the amount of gas compressed by a compressor of the class described, which method consists in varying the area of the central air space of the said described compressor, whereby the intake action of the said compressor is thereby more or less restricted.

98. The herein described method of varying the amount of gas compressed by a compressor of the class described, which method consists in injecting a stream of liquid into the liquid containing space of the said compressor while permitting the excess liquid to flow away, and in then varying the proportion of inflow to outflow of the said injected liquid, whereby the central airspace of the said described compressor is thereby caused to increase or decrease in diameter, and thereby vary the intake capacity of the compressor.

99. The herein described method of varying the amount of gas compressed by a compressor of the class described, which method consists in injecting a stream of liquid into the liquid containing space of the said compressor while permitting the excess liquid to flow away, and in then throttling more or less the outlet for the excess liquid, whereby the central air space of the said compressor is thereby caused to increase or decrease in diameter, and thereby vary the intake capacity of the compressor.

100. In a fluid compressor, the combination of a vessel adapted to contain a rotating body of liquid, the said liquid upon rotation being adapted to leave a central air space surrounding the axis of rotation, means for varying the diameter of the said air space, and mechanical means for transferring a less dense fluid from one portion to another of the said contained liquid.

101. In a fluid compressor, the combination of a vessel adapted to contain a rotating or revolving body of liquid, means for transferring a gas to be compressed from one portion to another of the said contained liquid, means for varying the amount of gas taken in by the said compressor, a reservoir for the compressed gas, a receptacle in communication with the said reservoir, a float operating in said receptacle, the said float being operatively connected with the said means for varying the amount of gas taken in by the compressor.

102. In combination, a vessel adapted to contain a rotating or revolving body of liquid, and rotary conveying means for transferring a less dense fluid between one portion and another of the said contained liquid, the axis of said conveying means being at an angle to the axis about which the said liquid body turns, tubular receptacles carried by the said conveying means, the ends of said tubular receptacles converging toward the axis of the said conveying means, and a receiver for compressed fluid located substantially inside the converging ends of the said tubular receptacles.

103. In combination, a vessel adapted to contain a rotating or revolving body of liquid, and rotary conveying means for transferring a less dense fluid between one portion and another of the said contained liquid, the axis of rotation of the said conveying means being at an angle to the axis about which the liquid body turns, tubular receptacles carried by the said conveying means, the said tubular receptacles converging toward the axis of said conveying means, a receiver for compressed fluid located substantially inside the converging ends of the said tubular receptacles, and an inlet for the said fluid in the interior of the said rotary conveying means.

104. In combination, a vessel adapted to contain a rotating or revolving body of liquid, a rotary conveyor for transferring a less dense fluid from one portion to another of the said contained liquid, the axis of rotation of the said conveyor being at an angle to the axis about which the liquid body turns, tubular receptacles carried by the said conveyor, the ends of the said tubular receptacles converging toward the axis of the said conveyor, and a planetary gear train operatively connected with the said rotary conveyor.

105. In combination, a vessel adapted to contain a rotating or revolving body of liquid, and a compound rotary conveyor for transferring less dense fluids between different portions of the said contained liquid, the said compound rotary conveyor comprising a motor conveying means rigidly connected with a compressing conveying means.

106. In combination, a vessel adapted to contain a rotating or revolving body of liquid, and a compound rotary conveyor for transferring less dense fluids between different portions of the said contained liquid, the said compound rotary conveying means comprising a motor conveying means rigidly connected with a compressing conveying means, the axis of the said compound conveyor being at an angle to the axis about which the liquid body turns.

107. In combination a vessel adapted to contain a rotating or revolving body of liquid, and a compound rotary conveying means for transferring fluids of less density between different portions of the said contained liquid, the said compound conveying means comprising a motor conveying means rigidly connected with a compressing conveying means, and the axis of the said compound rotary conveying means being substantially at right angles to the axis of rotation or revolution of the said liquid body.

108. In combination, a vessel adapted to contain a rotating or revolving body of liquid, and a compound rotary conveyor, for transferring less dense fluids between different portions of the said contained liquid, the said compound conveyor comprising a motor conveying means rigidly connected with a compressing conveying means, the center of mass of the said compound rotary conveyor being located substantially near to the axis about which the said liquid body turns.

109. In combination, a vessel adapted to contain a rotating or revolving body of liquid, and concentric rotary conveyors for transferring less dense fluids between different portions of the said contained liquid, the said compound conveyors comprising a motor conveying means rigidly connected with a compressing conveying means.

110. In combination, a vessel adapted to contain a rotating or revolving body of liquid, and a compound rotary conveyor, for transferring less dense fluids between different portions of the said contained liquid, comprising an outer motor conveying means, and an inner compressing conveying means, the said motor conveying means being concentrically disposed relative to the compressing conveying means.

111. The herein described process of developing power from the expansion of a gas, which process consists in putting a body of liquid into rapid circular motion, injecting motive fluid into the outer portions of the said liquid body, and in then absorbing, on a suitable mechanism, the buoyant effect of the motive fluid as it is forced toward the axis about which the liquid body is turning.

112. In combination, a vessel adapted to contain a rotating or revolving body of liquid, a rotary conveyor adapted to transfer a less dense fluid from one portion to another of the said contained liquid, a mercury pool in a peripheral portion of the said liquid body, and a portion of the said rotary conveyor being normally in contact with the mercury of the said pool.

113. In combination, a rotating or revolving vessel containing liquid, a rotary conveyor for transferring a less dense fluid between one portion and another of the said contained liquid, a cup in an outer portion of the said vessel, and mercury in the said cup, and a portion of the said rotary conveyor being normally in contact with the mercury in the said cup.

114. In a fluid compressor, the combination of a vessel adapted to contain a rotating or revolving body of liquid, mechanical means for transferring a less dense fluid between one portion and another of the said contained liquid, and means for utilizing centrifugal force for maintaining the said mechanical means in a position of stable equilibrium in said vessel.

115. In combination, a rotating or revolving vessel containing liquid, and receptacles for transferring a less dense fluid between one portion and another of the said contained liquid, the said receptacles forming a fixed portion of the said containing vessel.

116. In combination, a rotating or revolving vessel containing liquid, and receptacles for transferring a less dense fluid between one portion and another of the said contained liquid, the said vessel having a turning movement around a first axis, and also a second movement around a second axis, the said second axis being at an angle to the said first axis.

117. In combination, a rotating or revolving vessel containing liquid, and receptacles for transferring a less dense fluid between one portion and another of the said contained liquid, the said receptacles having a turning movement about a first axis, and also an additional movement about a second axis, the said second axis being approximately at right angles to the said first axis.

118. In combination, a rotating or revolving vessel containing liquid, and receptacles for transferring a less dense fluid between one portion and another of the said contained liquid, the said receptacles forming a fixed portion of the said containing vessel, the said rotating vessel having a turning movement around a first axis, and also an additional movement around a second axis, the said second axis being at an angle to the said first axis.

119. In combination, a rotating or revolving vessel containing liquid, and receptacles for transferring a less dense fluid between one portion and another of the said contained liquid, the said receptacles forming a fixed portion of the said containing vessel, the said vessel having a turning movement around a first axis, and also an additional movement around a second axis, the said second axis being substantially at right angles to the said first axis.

120. The hereindescribed method of lubricating the gear wheels of a fluid compressor or expansor comprising, a containing vessel, a compressing element consisting of a body of liquid, mechanical means for transferring a fluid of less density from one point to another in said liquid, and gears for driving the said mechanical means, the said gears being located near to the axial line of the said liquid body, the said method of lubricating the said gears consisting in floating an inner layer of oil on the inner surface of the said compressing element, the said gears being lubricated by the said inner floating layer of oil.

121. In combination, a containing vessel, a compressing element consisting of a rapidly rotating or revolving body of liquid, and mechanical means for transferring a fluid of less density between one portion and another of the said liquid body, the said mechanical means being constrained to turn substantially in unison with said vessel about the axis of rotation or revolution of the said liquid, the said liquid body consisting of an inner layer of oil and an outer layer of denser liquid.

122. In combination, a vessel adapted to contain a rotating or revolving body of liquid, and a rotary conveyor adapted to transfer a less dense fluid between one portion and another of the said contained liquid, and bearings for the said rotary conveyor, the said bearings comprising an inner cup-like oil retaining member opening away from the axis about which the said liquid body turns, and an outer bearing member projecting into the said cup-like oil retaining member.

123. In combination, a vessel adapted to contain a rotating body of liquid, and a rotating member adapted to convey a less dense fluid between one portion and another of the said contained liquid, approximately equal masses of the said rotating member being oppositely disposed relative to the axis of rotation of the said liquid body.

124. In combination, a vessel adapted to contain a rotating or revolving body of liquid, and a rotating member adapted to convey a less dense fluid from one portion to another of the said contained liquid, the said rotating member being rotatable about an axis that extends at an angle to the axis of rotation of the said liquid body.

125. In combination, a vessel adapted to contain a rotating or revolving body of liquid, and a rotating member adapted to convey a less dense fluid from one portion to another of the said contained liquid, the said rotating member being rotatable about an axis that is approximately perpendicular to the axis of rotation or revolution of the said liquid body.

126. In combination, means for rotating a body of compressor liquid, means for admitting fluid to be compressed to the interior of the said body of liquid, and means rotatable about an axis that is approximately perpendicular to the axis of rotation of the liquid body for conducting the fluid from the interior of the said body to the exterior of the said body of compressor liquid.

127. In combination, a vessel adapted to contain a rotating or revolving body of liquid, and a rotating member adapted to convey a less dense fluid from one portion to another of the said contained liquid, the said rotating member being adapted to turn about the axis of rotation or revolution of the said liquid, and also about a second axis that extends at an angle to the axis of rotation or revolution of the liquid body, and approximately equal masses of the said rotating member being oppositely disposed relative to the axis of rotation or revolution of the said liquid body.

128. In combination, a vessel adapted to contain a rotating or revolving body of liquid, and a rotating member adapted to transfer a less dense fluid between one portion and another of the said contained liquid, the said rotating member being adapted to turn about the axis of rotation of the said liquid body, and also about a second axis that is approximately perpendicular to the said axis of rotation or revolution of the liquid body.

129. In combination, a vessel adapted to contain a rotating or revolving body of liquid, and a rotating member adapted to convey a less dense fluid from one portion to another of the said contained liquid, a planetary pinion, and a planetary gear meshing with the said pinion and operatively connected with the said rotating member, the said rotating member being adapted to turn about the axis of the liquid body and also about a second axis that extends at an angle to the said axis of rotation or revolution of the liquid body.

130. In combination, a rotating or revolving vessel containing liquid, a rotating member journaled in said vessel and adapted to convey a less dense fluid from one portion to another of the said contained liquid, a planetary pinion, and a planetary gear meshing with said pinion and operatively connected with the said rotating member, the said rotating member being adapted to turn about the axis of rotation or revolution of the liquid body, and also about a second axis that extends at an angle to the said axis of the liquid body, and approximately equal masses of the said rotating member being oppositely disposed relative to the axis of rotation of the said liquid.

131. In combination, a vessel adapted to contain a rotating or revolving body of liquid, a rotating member, and spiral impelling means carried by the said member and adapted to convey a less dense fluid between one portion and another of the said contained liquid, the center of mass of the said rotating member being substantially near to the axis of rotation or revolution of the said liquid body.

132. In combination, a vessel adapted to contain a rotating or revolving body of liquid, a rotating member journaled in the said vessel, and spiral impelling means carried by the said member and adapted to convey a fluid of different density than said liquid between one portion and another of the said contained liquid, the said rotating member being adapted to turn about the rotation or revolution axis of the liquid body, and also about a second axis that extends at an angle to the said axis of rotation or revolution of the liquid body.

133. In combination, a vessel adapted to contain a rotating or revolving body of liquid, and spiral impelling means adapted to transfer a fluid of different density than said liquid between one portion and another of the said contained liquid, the said spiral impelling means being constrained to turn about the axis of rotation or revolution of the liquid body, and also about a second axis that extends at an angle to the said axis of rotation or revolution of the liquid body.

134. In combination, a rotating or revolving vessel containing liquid, a rotating member journaled in said vessel and rotatable about an axis that extends at an angle to the axis of rotation or revolution of the vessel, and means for utilizing centrifugal force for maintaining the said rotating member in a position of stable equilibrium in said vessel.

EDWIN J. CREEL.